April 2, 1935. O. B. BROWN ET AL 1,996,272
METHOD OF AND APPARATUS FOR MANUFACTURING AND TREATING STRAND MATERIAL
Filed March 26, 1930   28 Sheets-Sheet 2
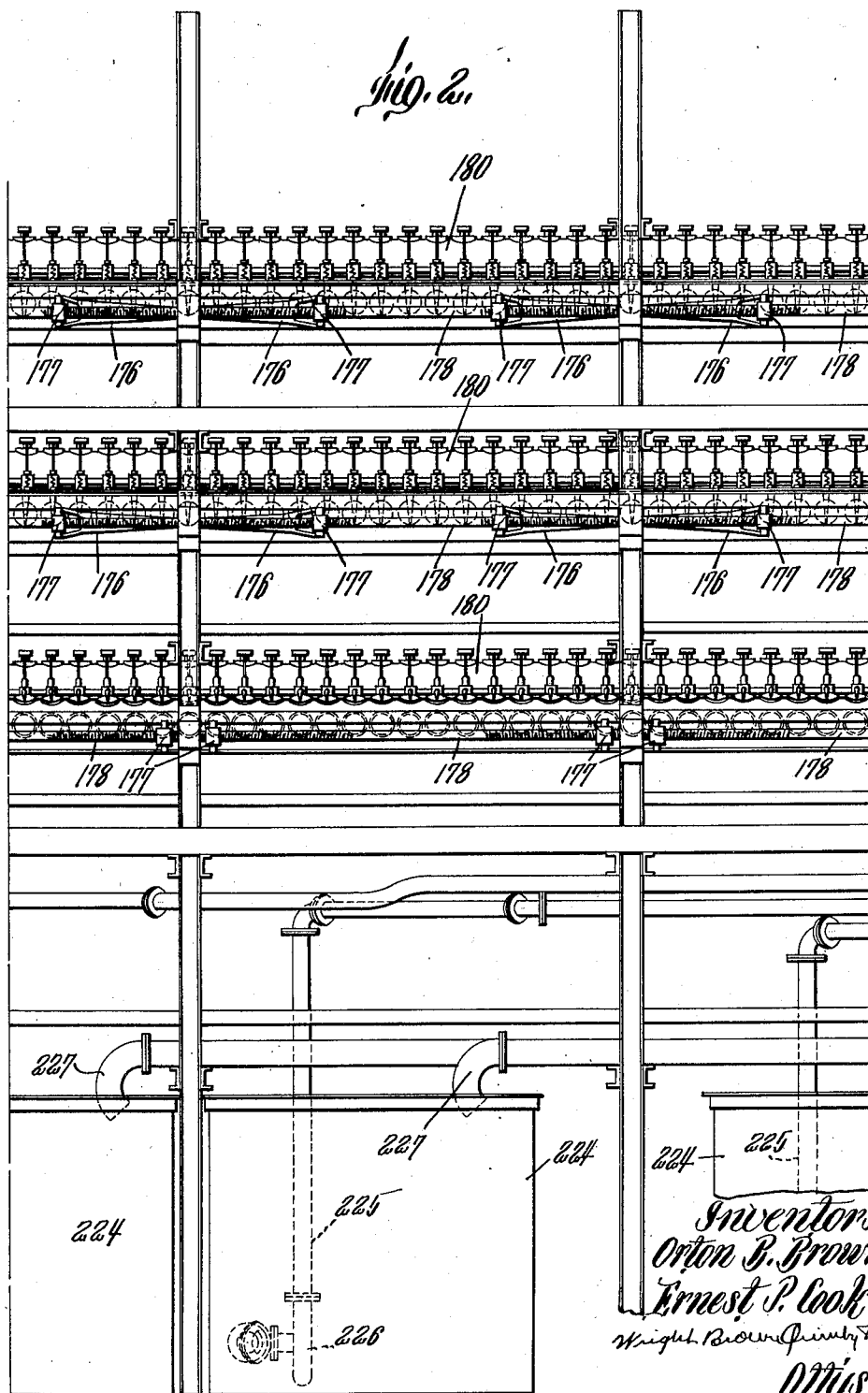

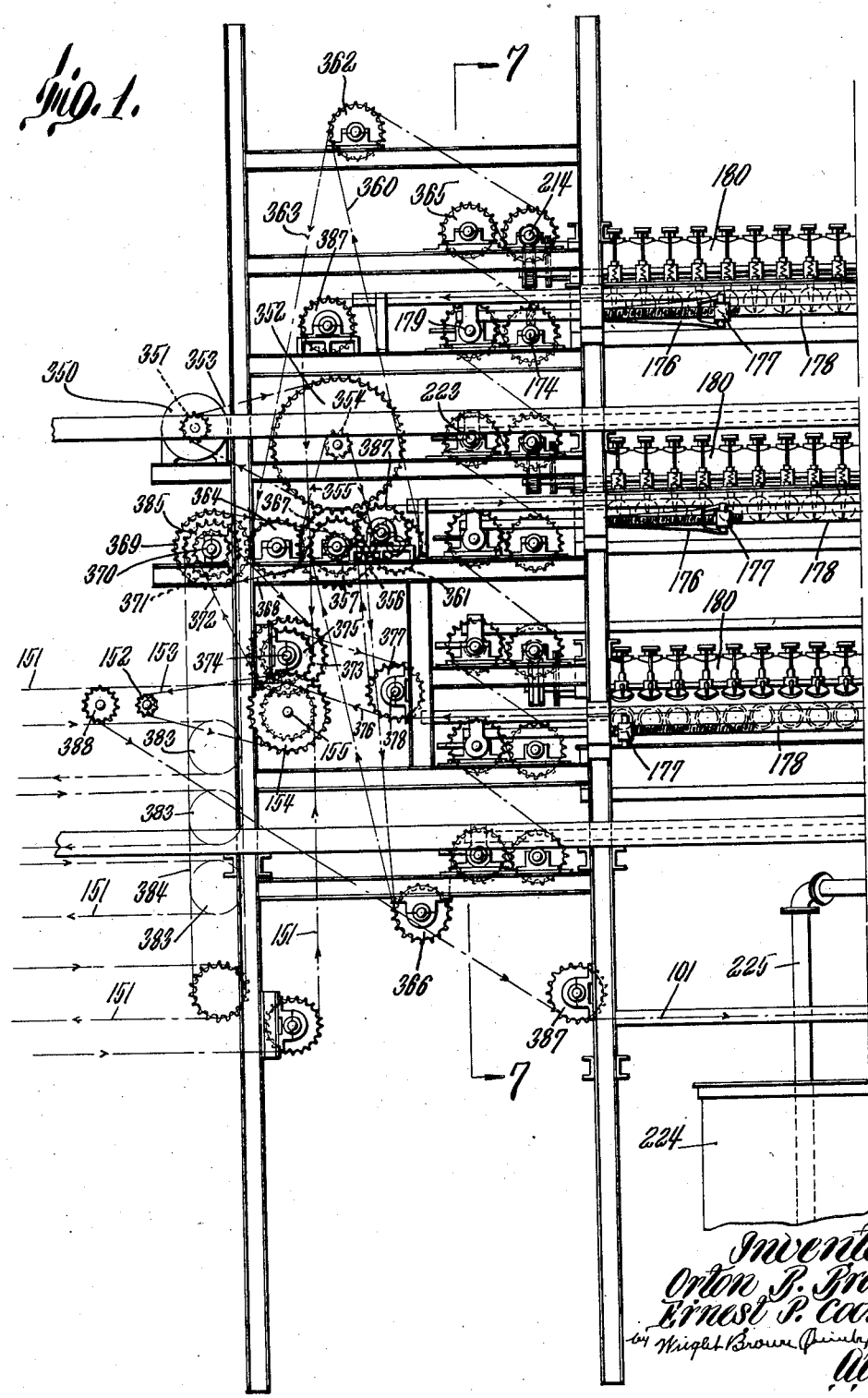

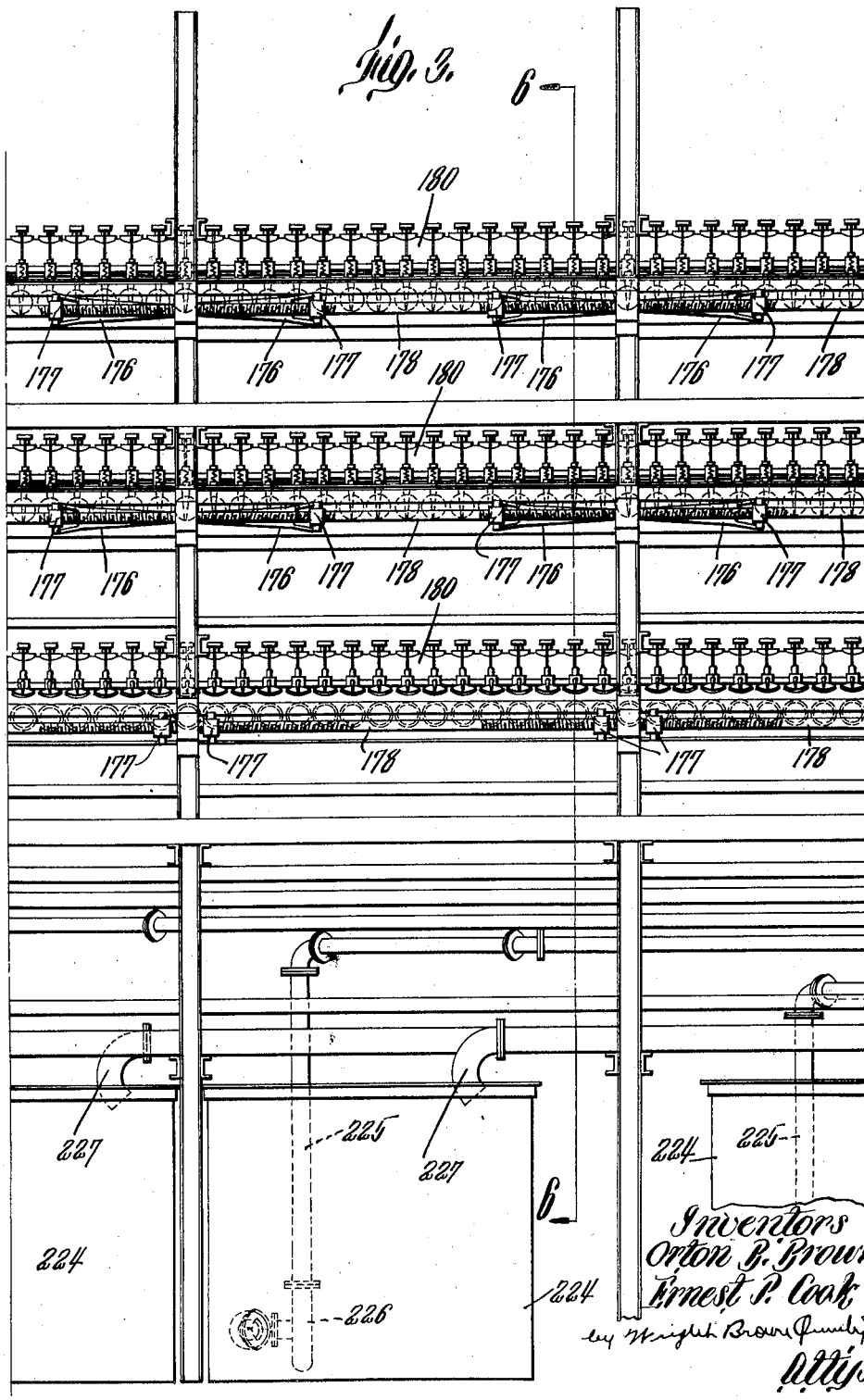

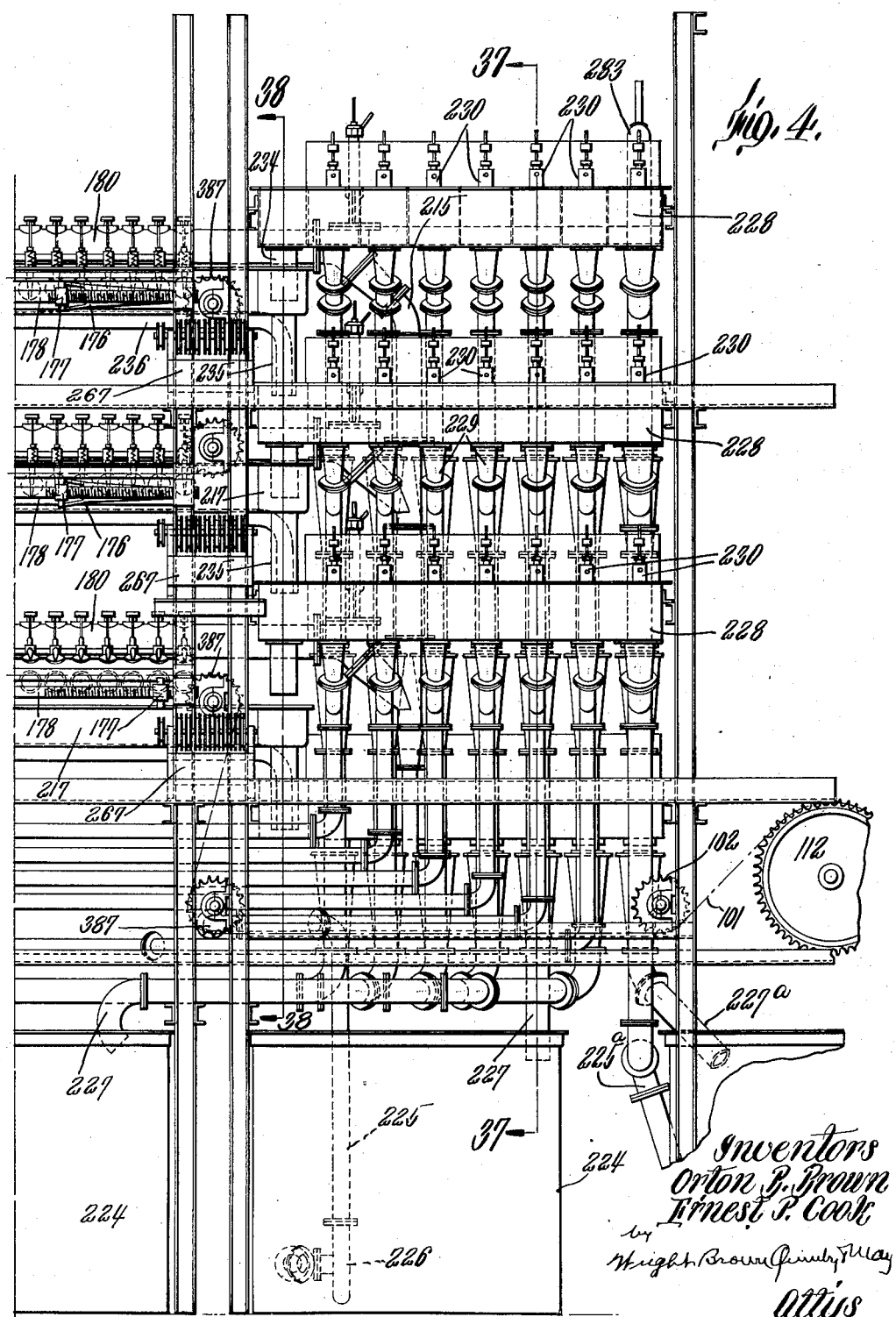

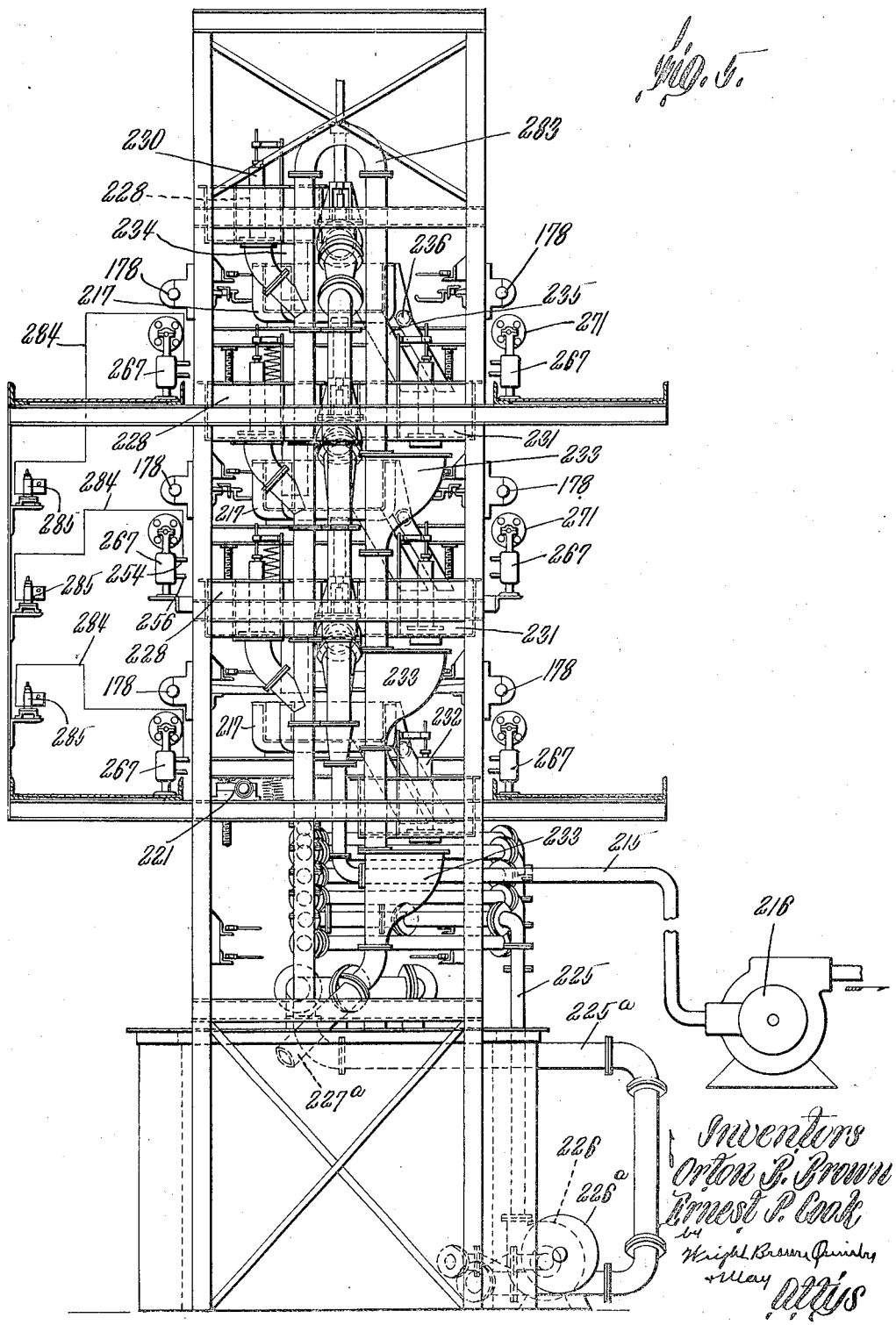

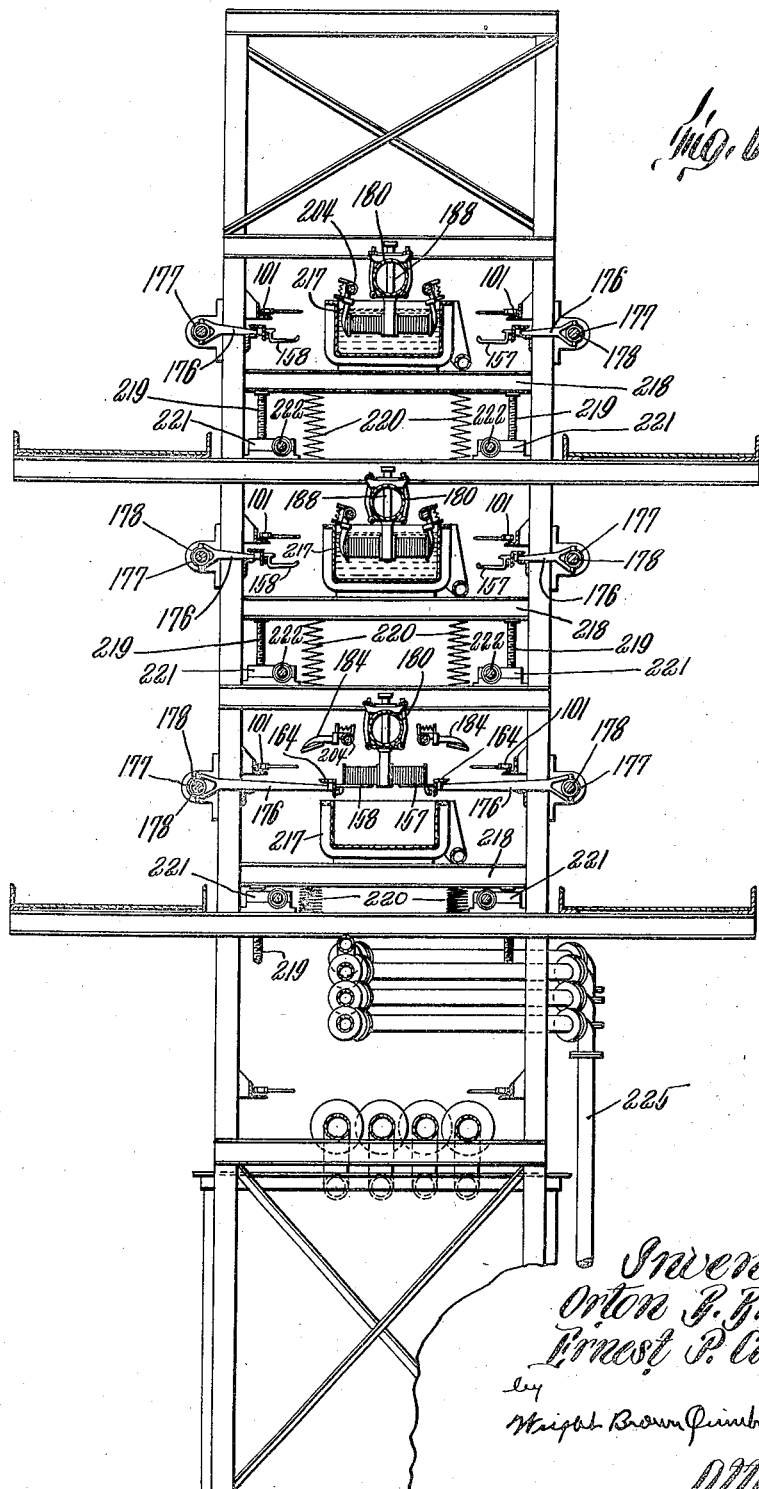

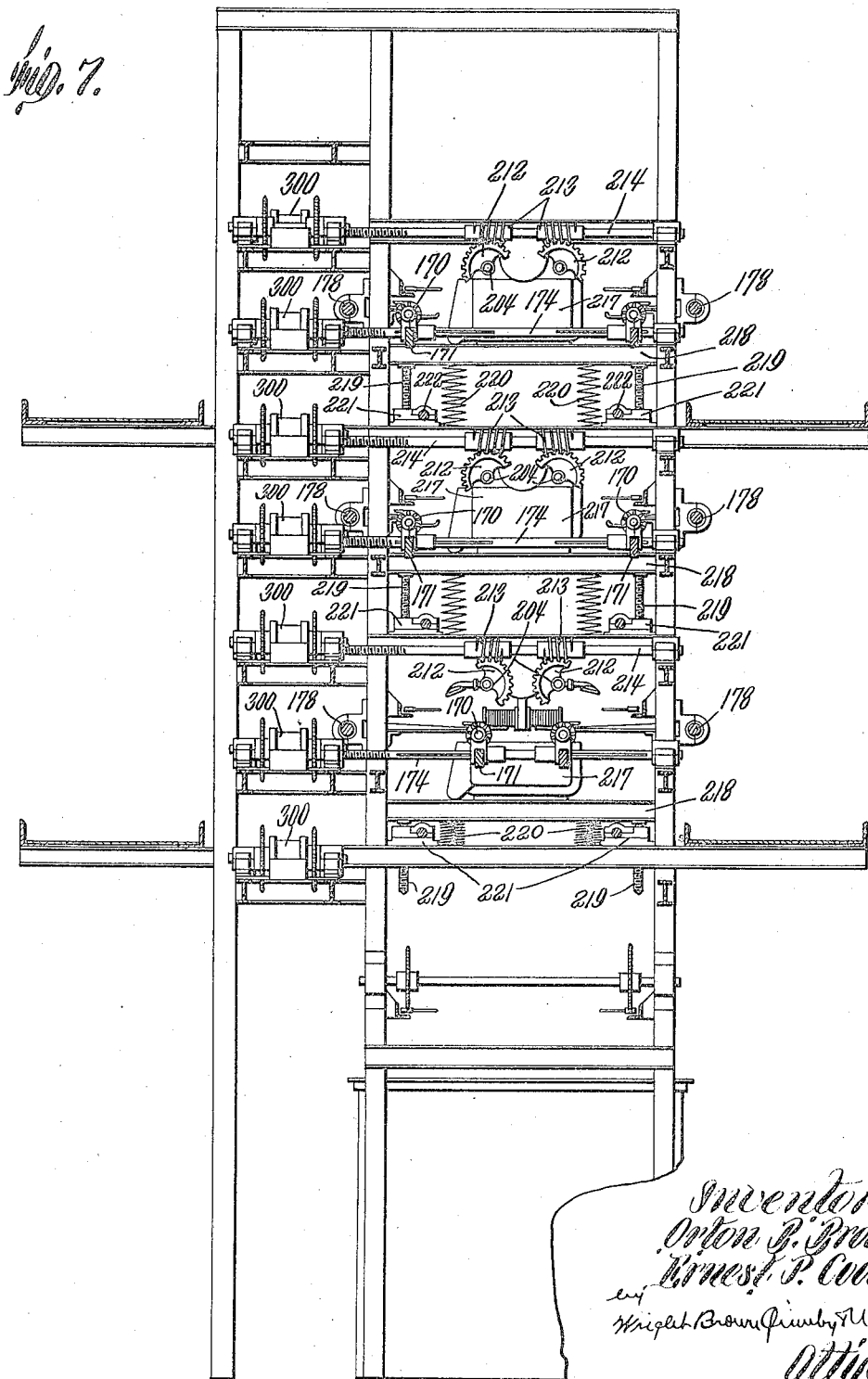

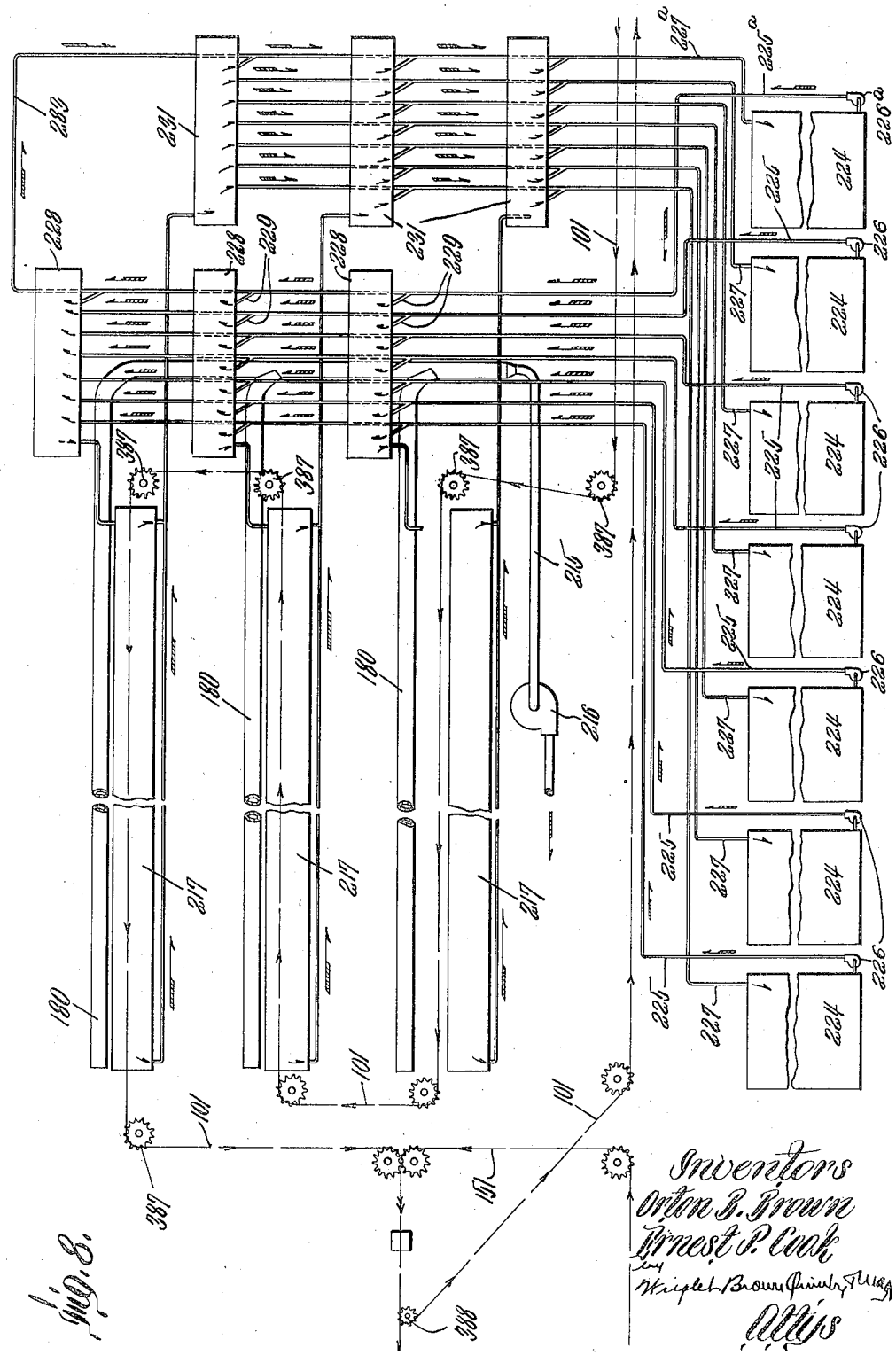

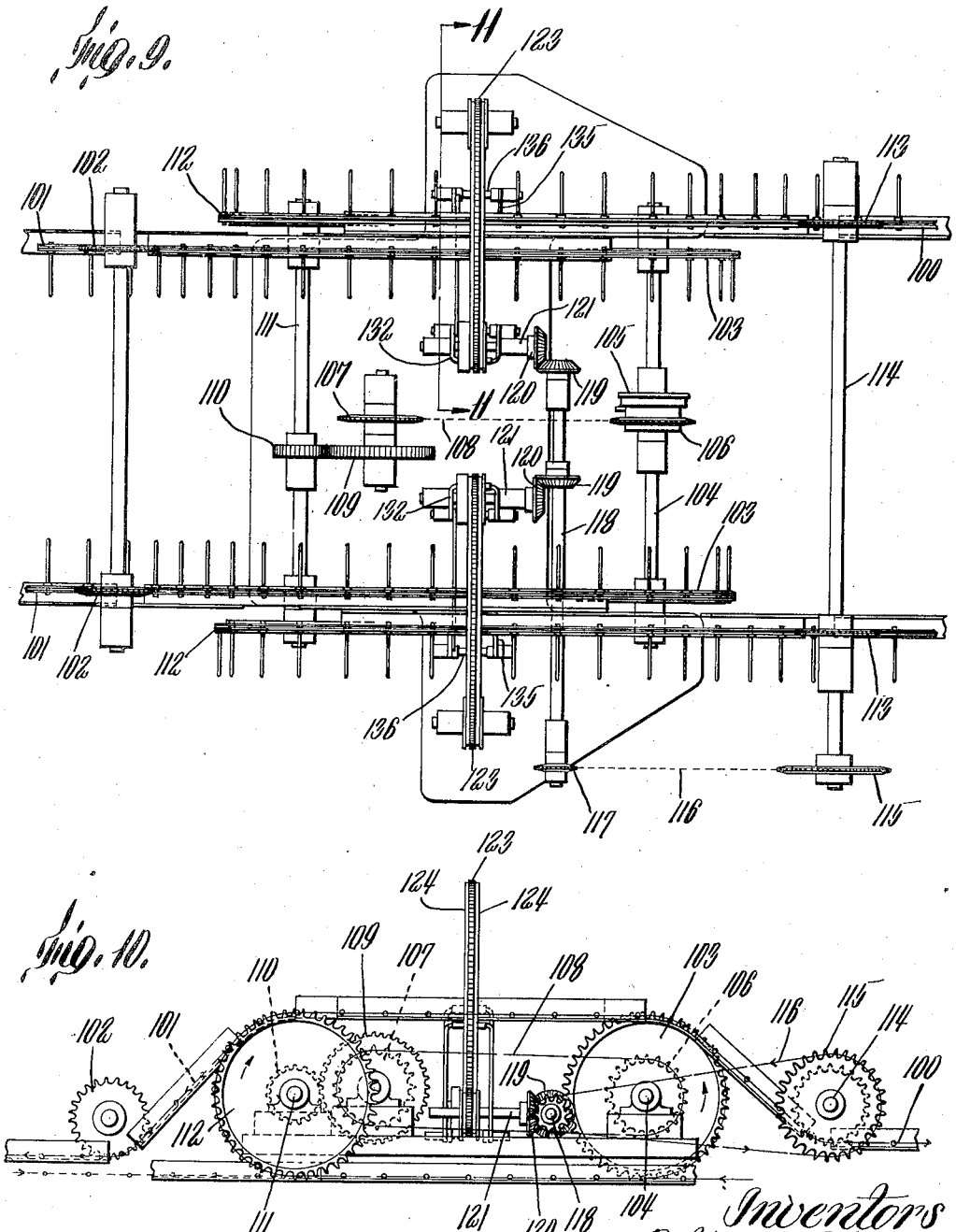

April 2, 1935.  O. B. BROWN ET AL  1,996,272
METHOD OF AND APPARATUS FOR MANUFACTURING AND TREATING STRAND MATERIAL
Filed March 26, 1930    28 Sheets-Sheet 10
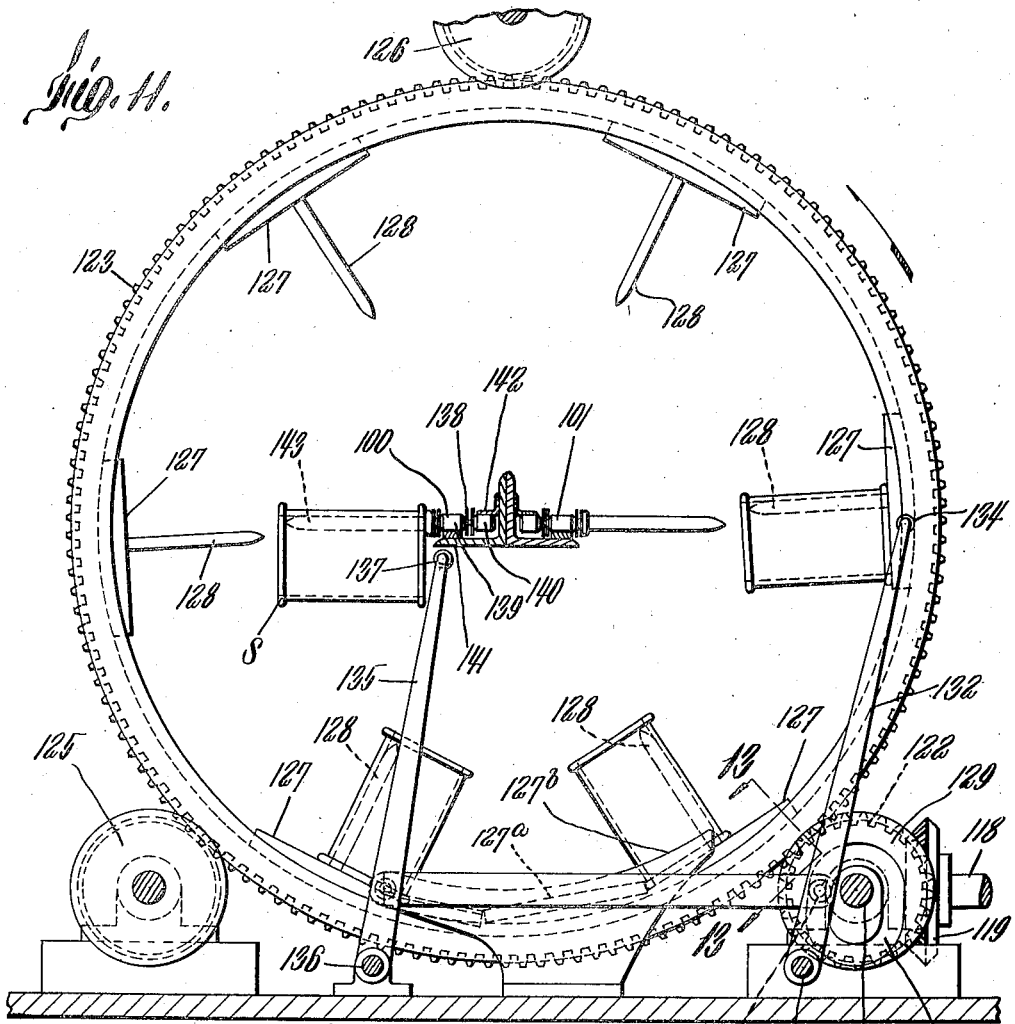
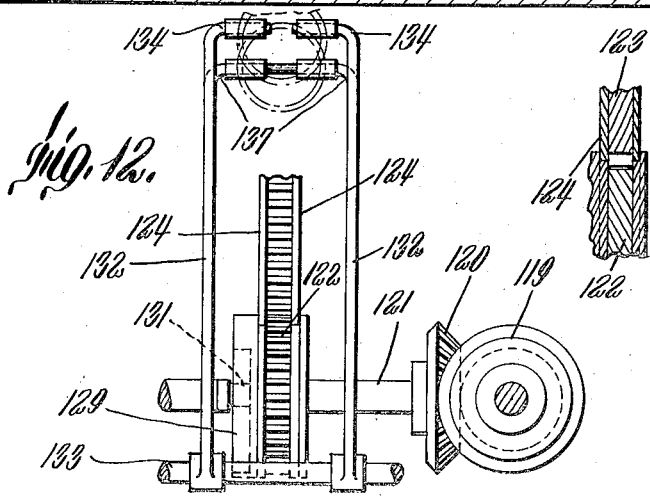

April 2, 1935. O. B. BROWN ET AL 1,996,272
METHOD OF AND APPARATUS FOR MANUFACTURING AND TREATING STRAND MATERIAL
Filed March 26, 1930 28 Sheets-Sheet 11
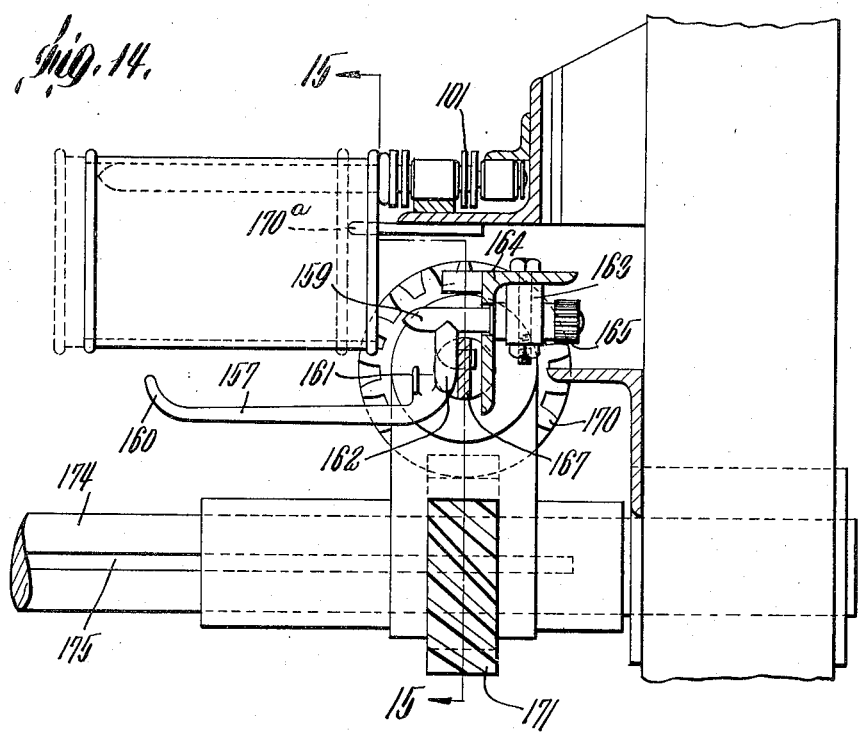
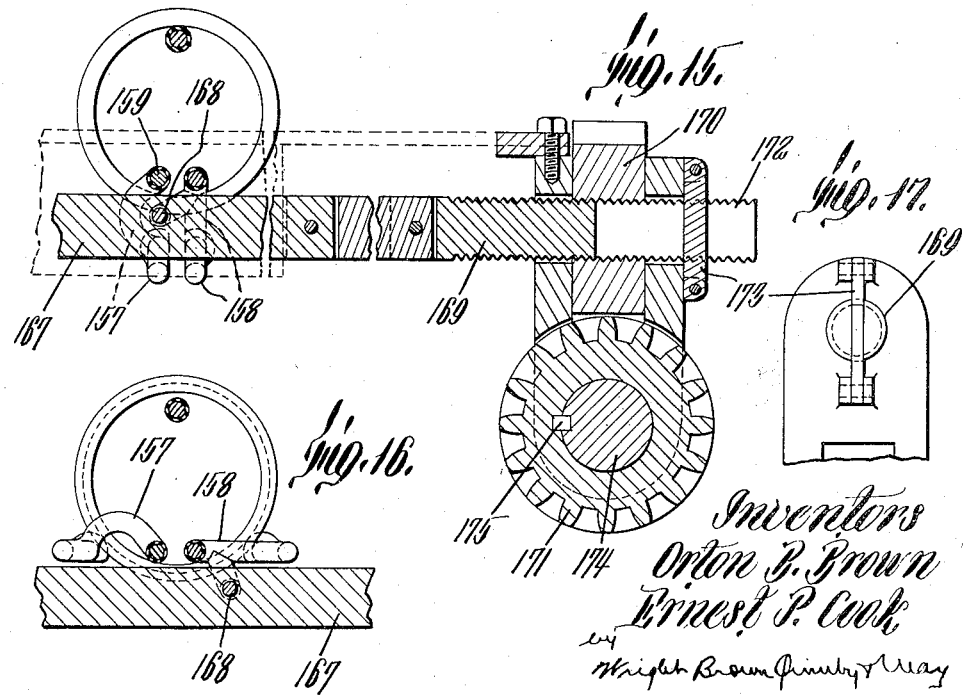

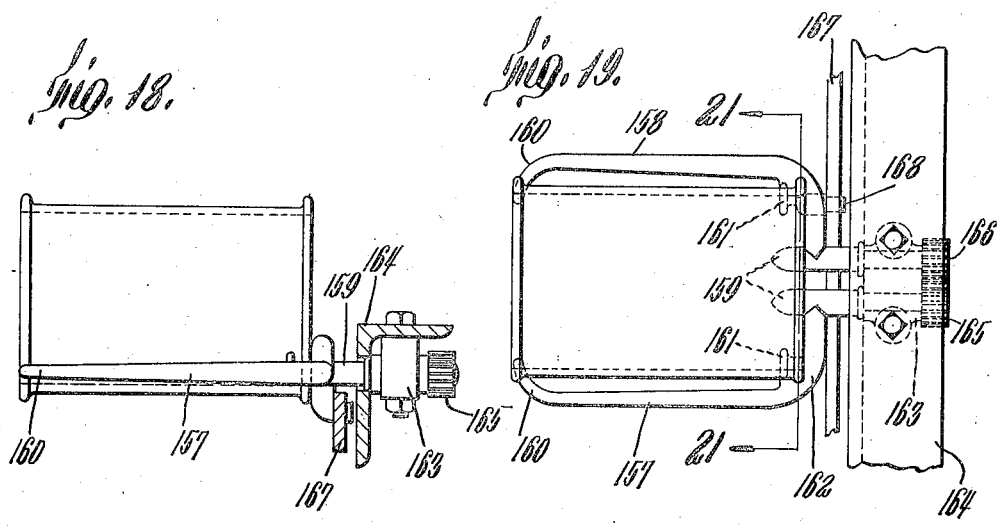
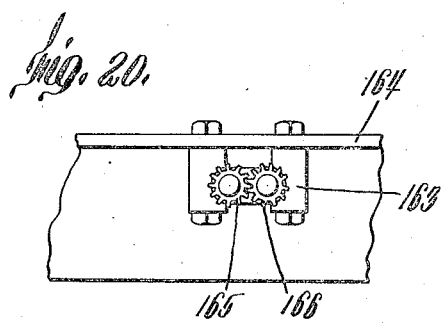
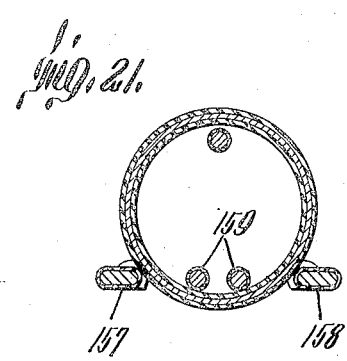

April 2, 1935. O. B. BROWN ET AL 1,996,272
METHOD OF AND APPARATUS FOR MANUFACTURING AND TREATING STRAND MATERIAL
Filed March 26, 1930 28 Sheets-Sheet 13
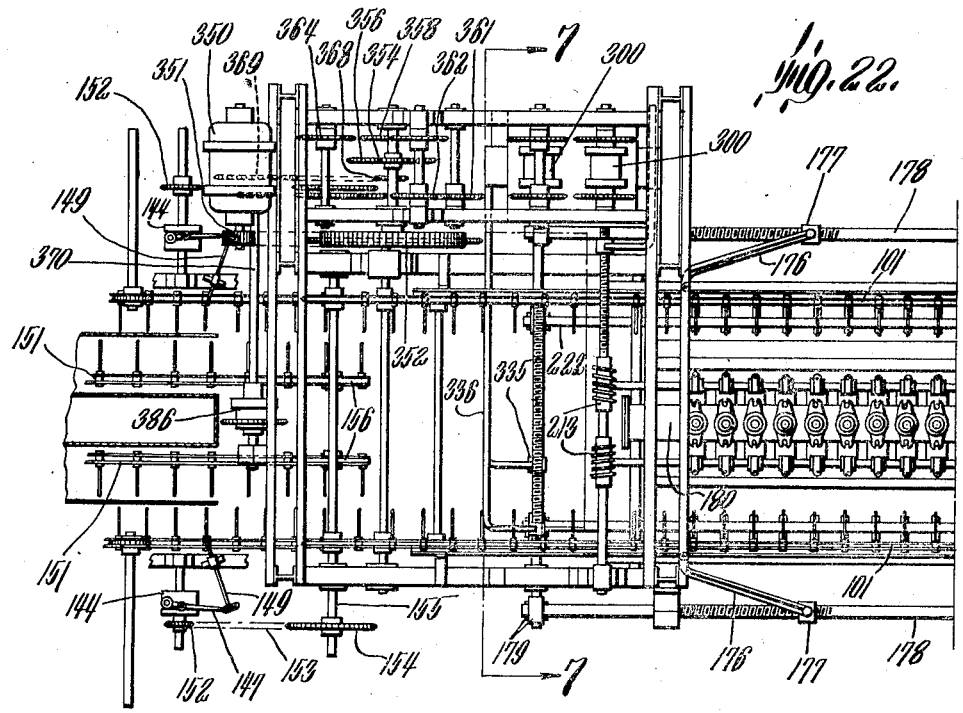
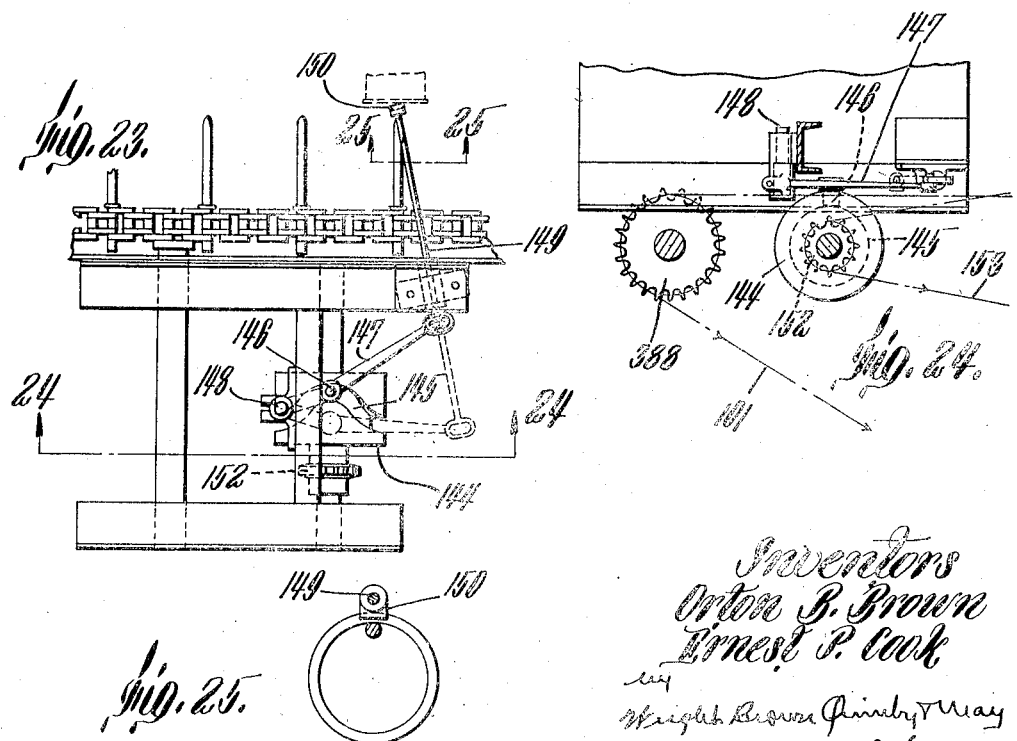

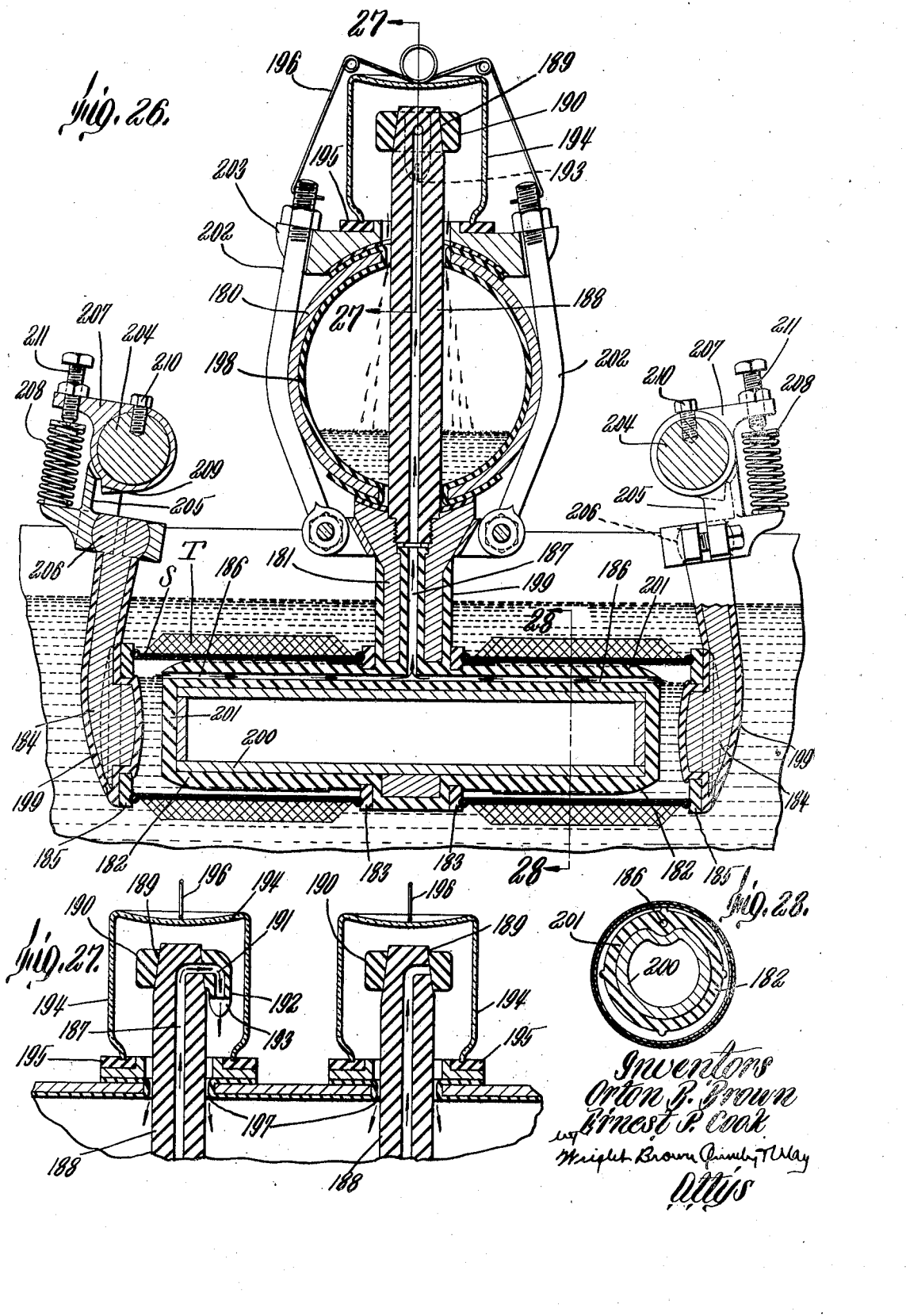

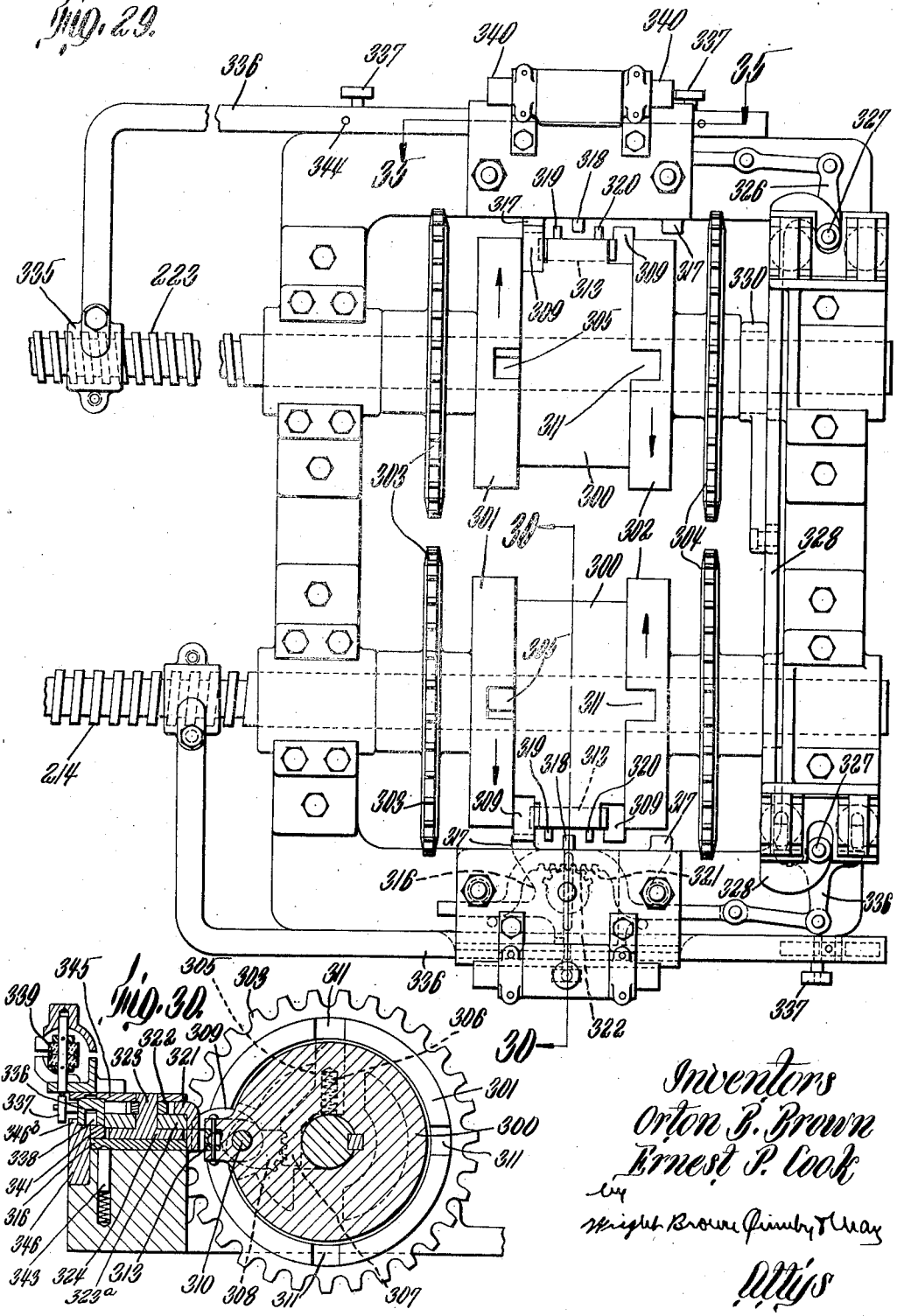

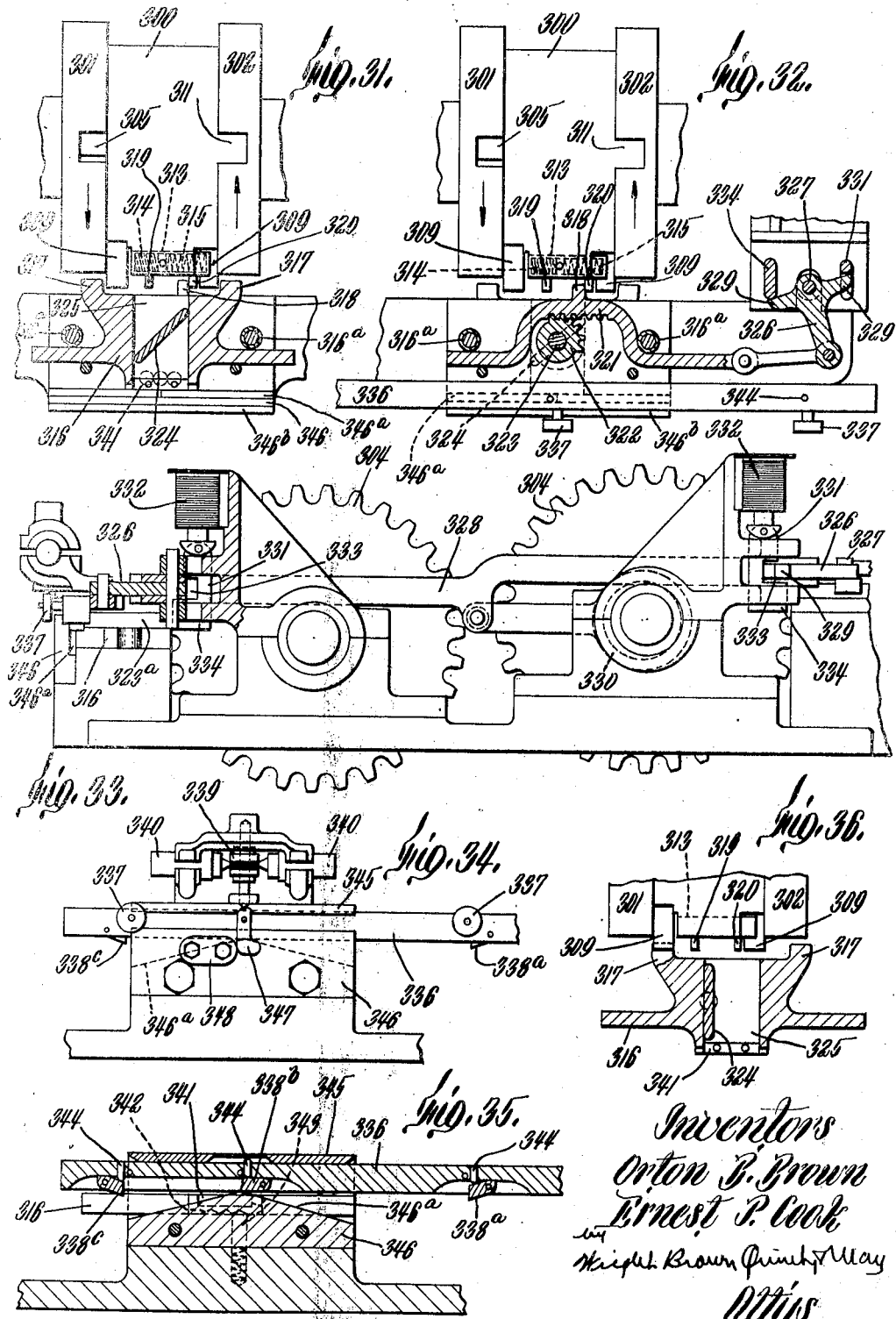

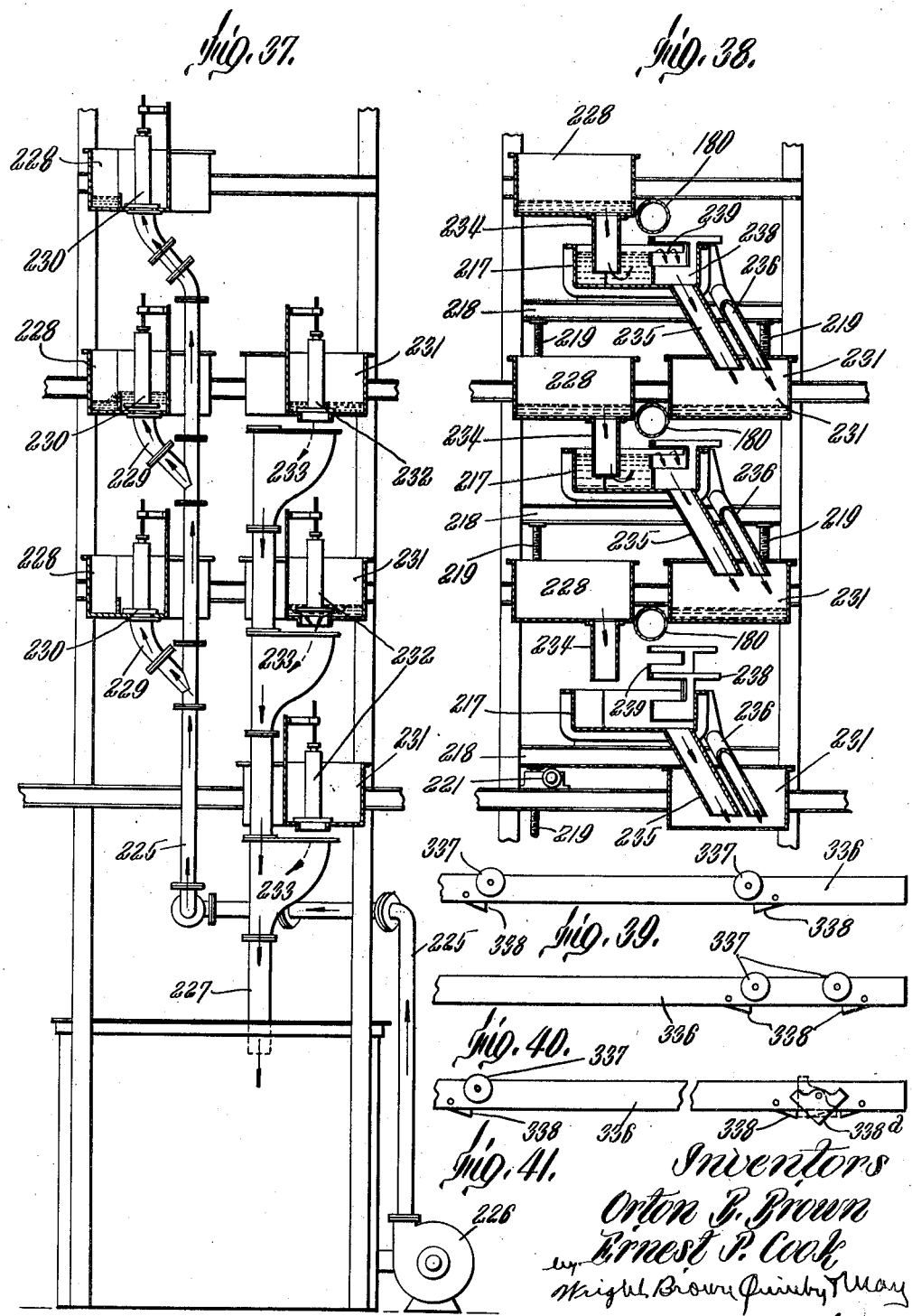

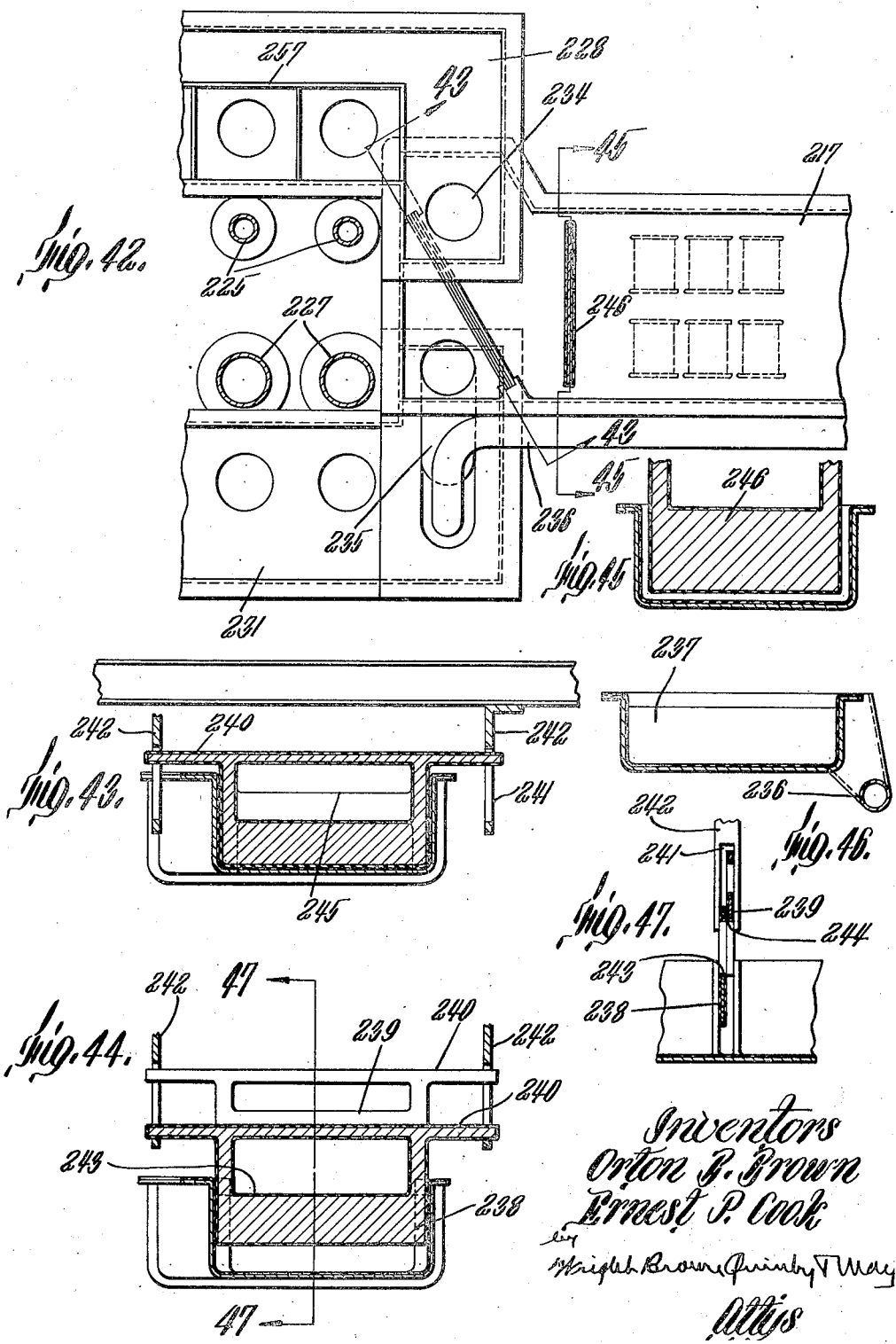

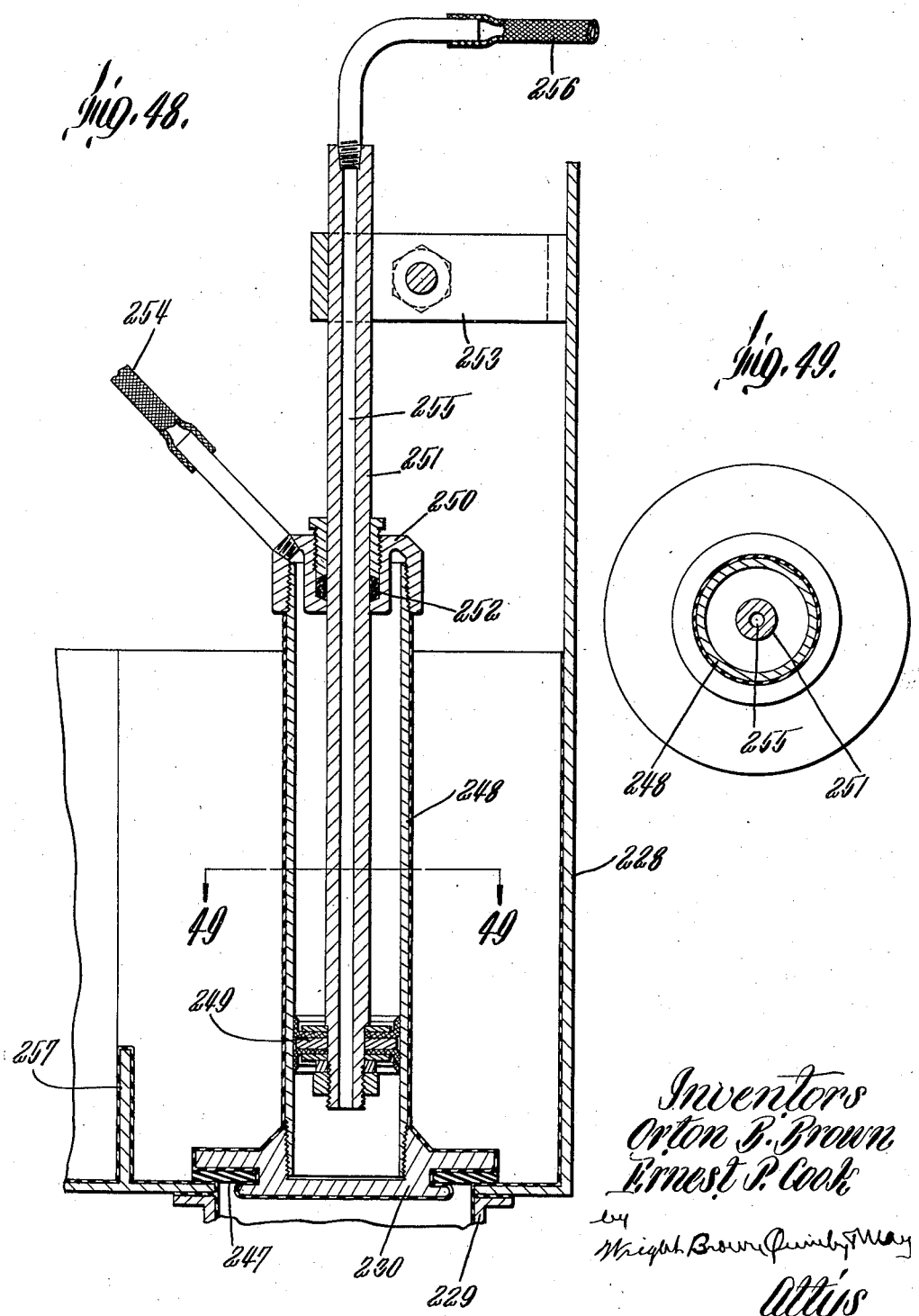

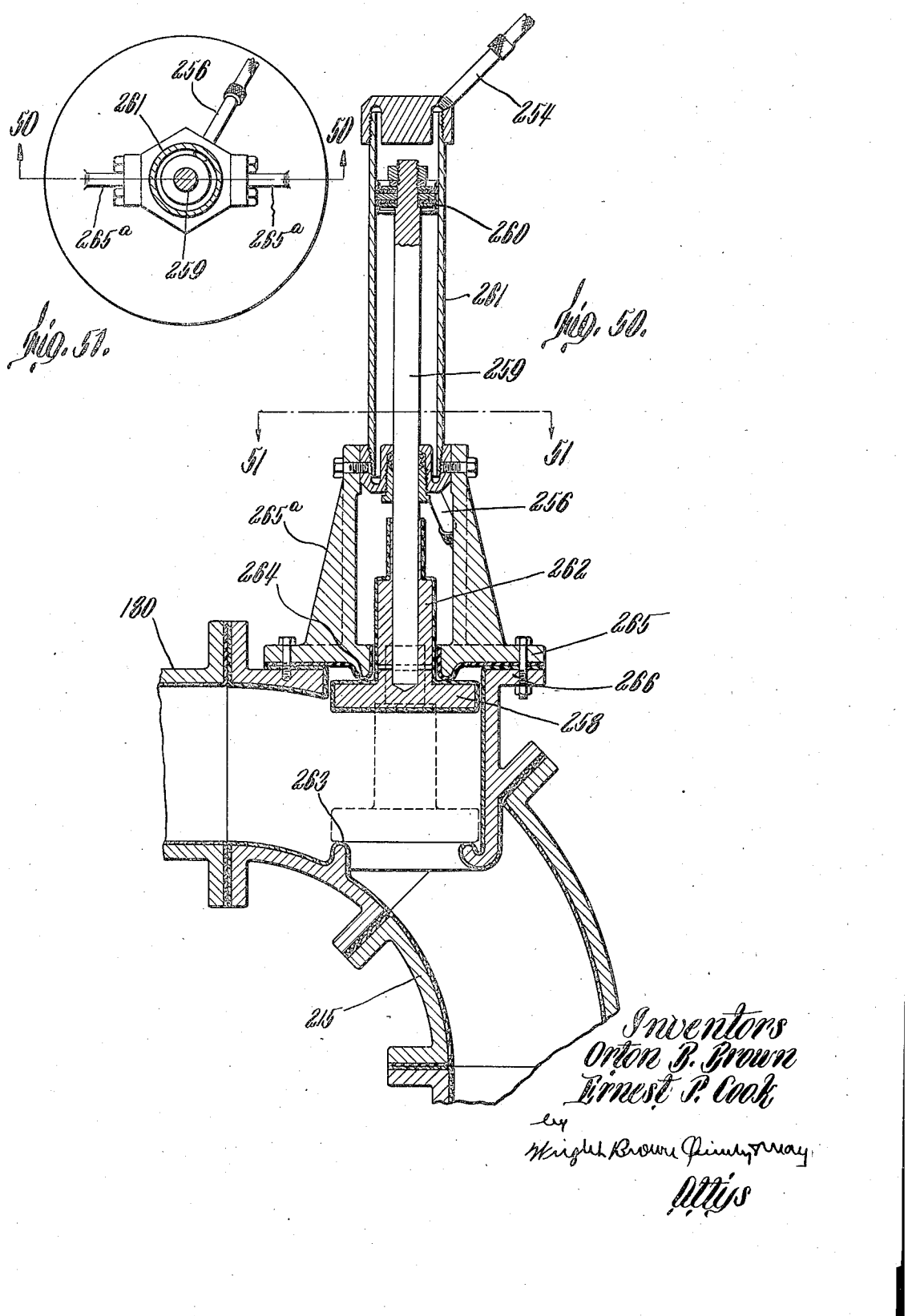

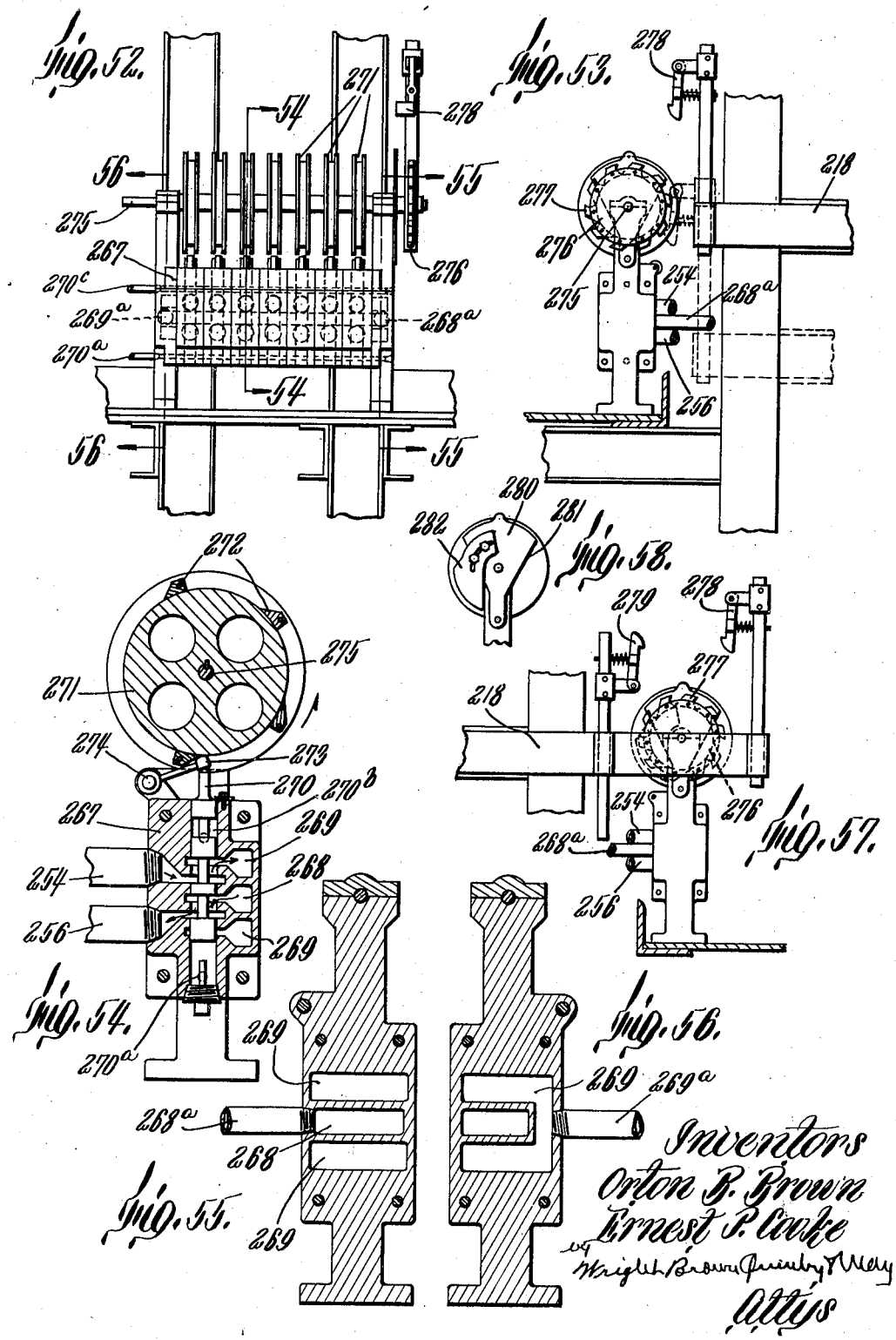

April 2, 1935.  O. B. BROWN ET AL  1,996,272
METHOD OF AND APPARATUS FOR MANUFACTURING AND TREATING STRAND MATERIAL
Filed March 26, 1930    28 Sheets-Sheet 22

Inventors
Orton B. Brown
Ernest P. Cook
by Wright, Brown, Quinby May
Attys

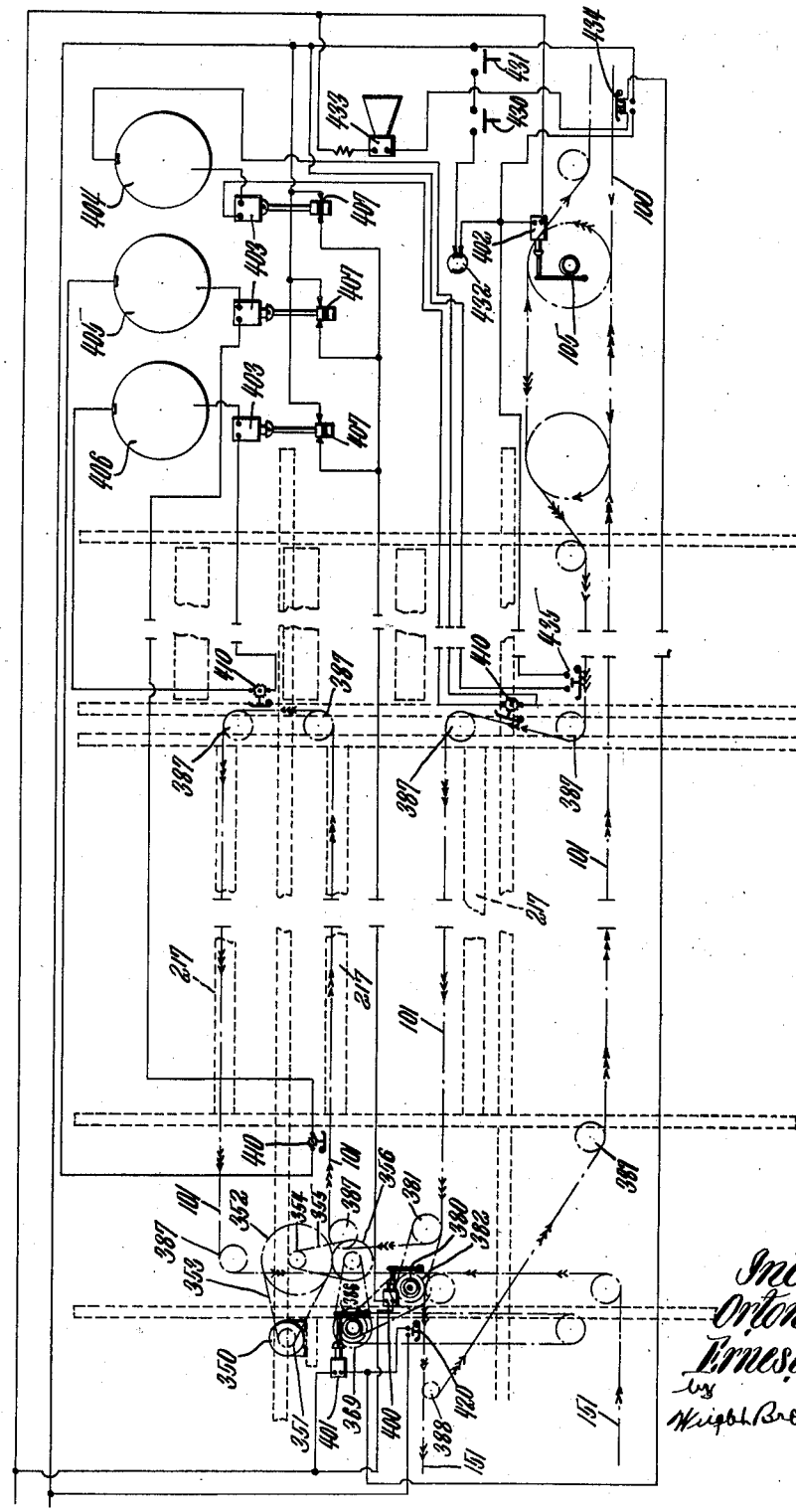

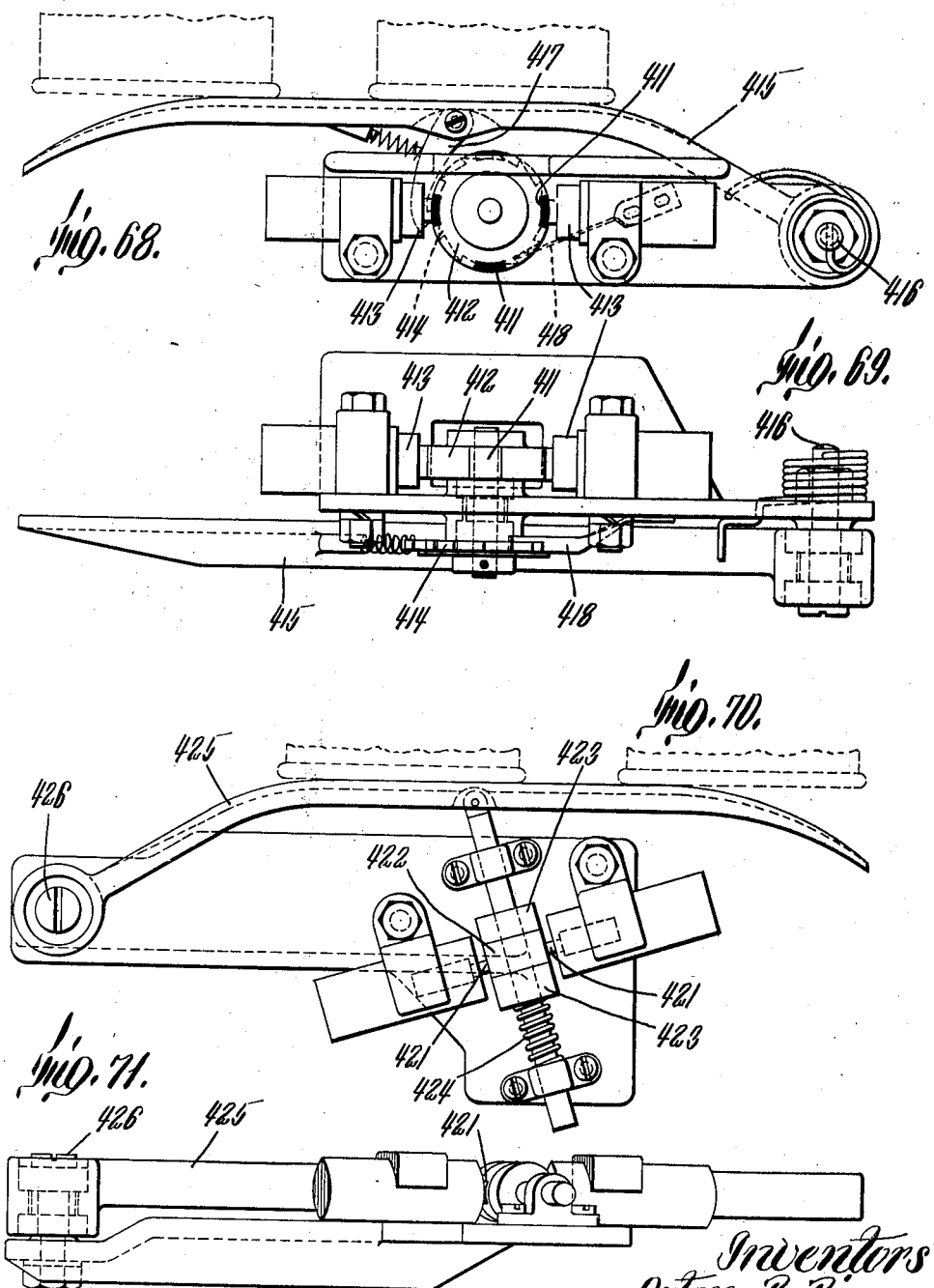

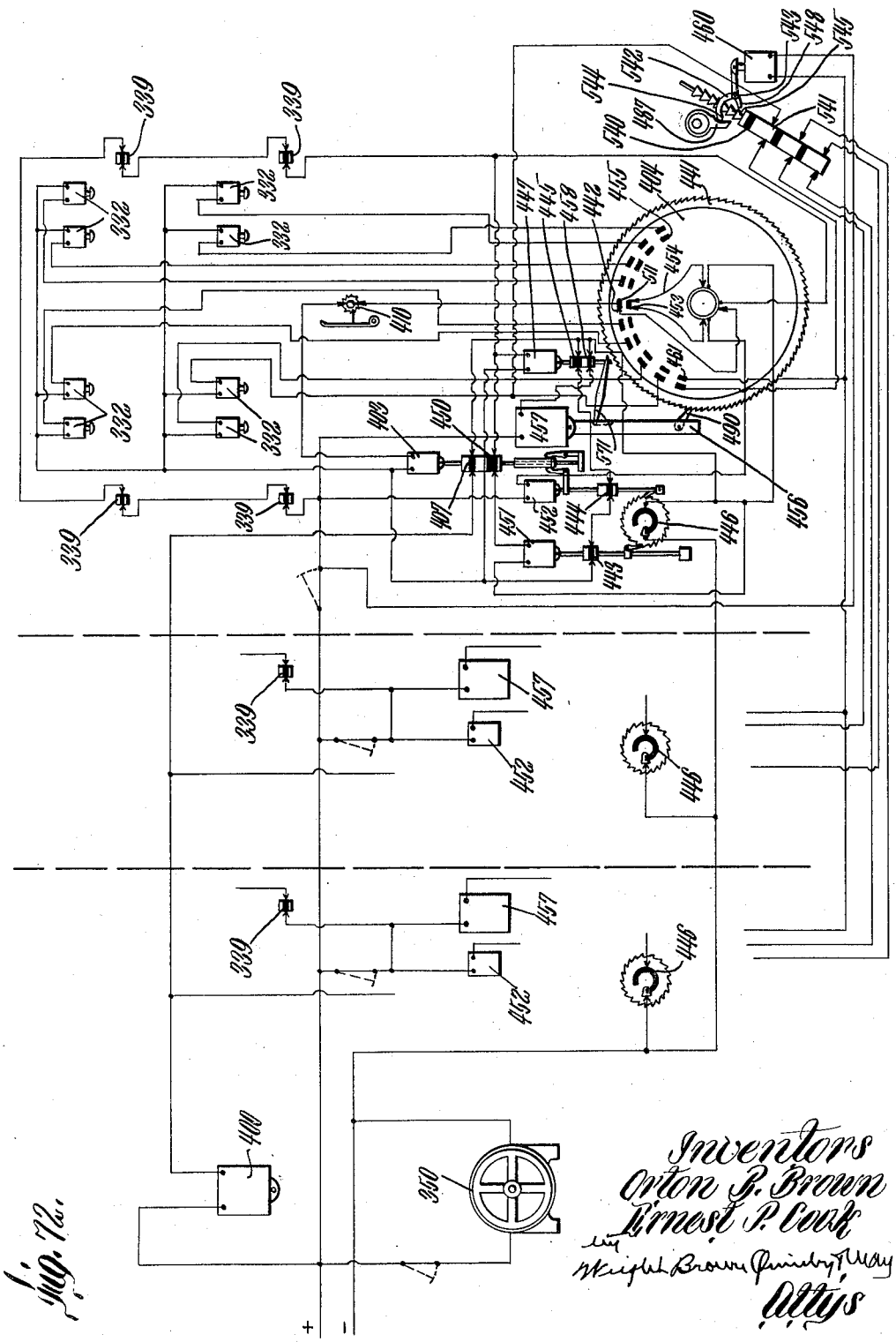

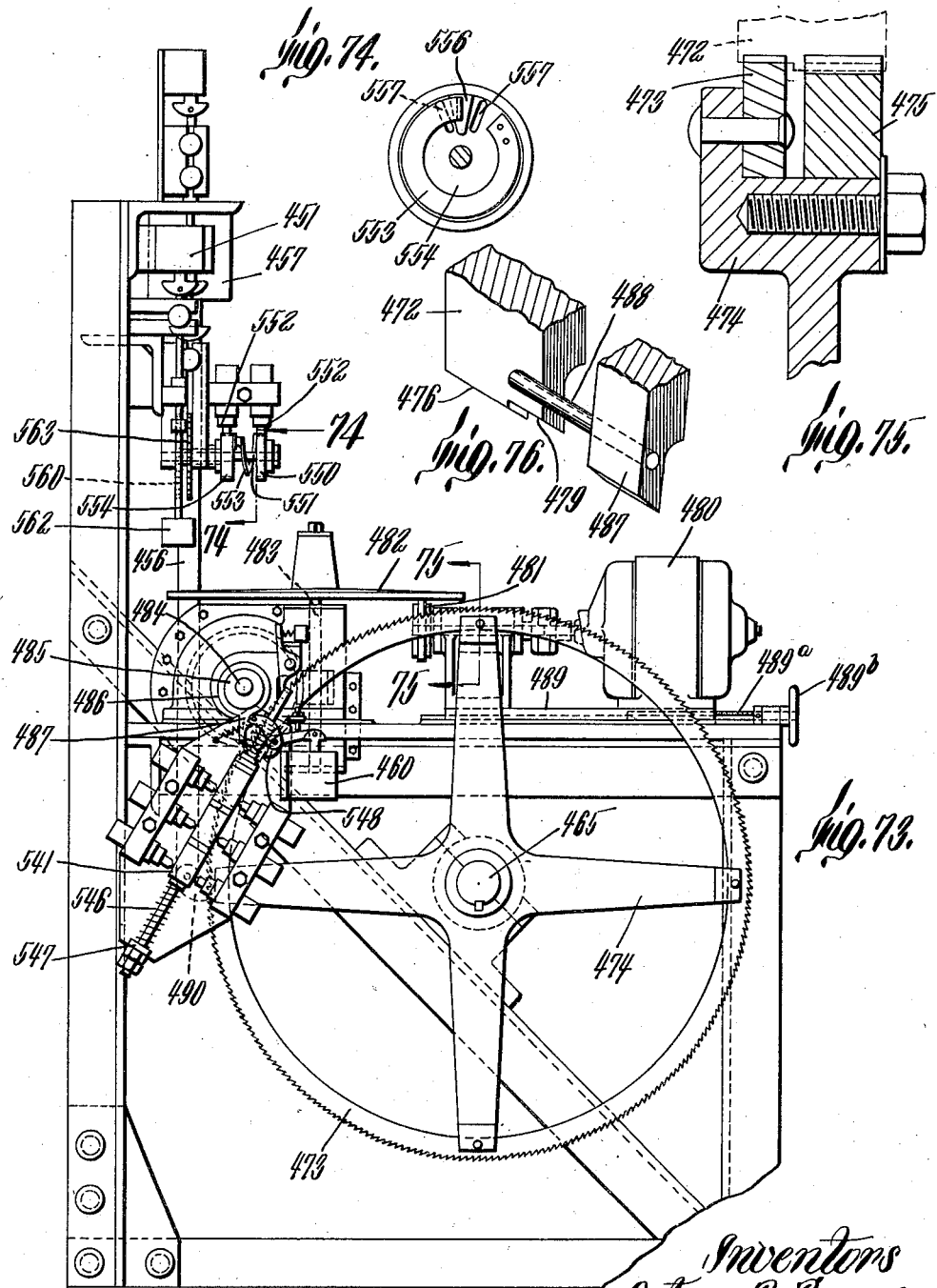

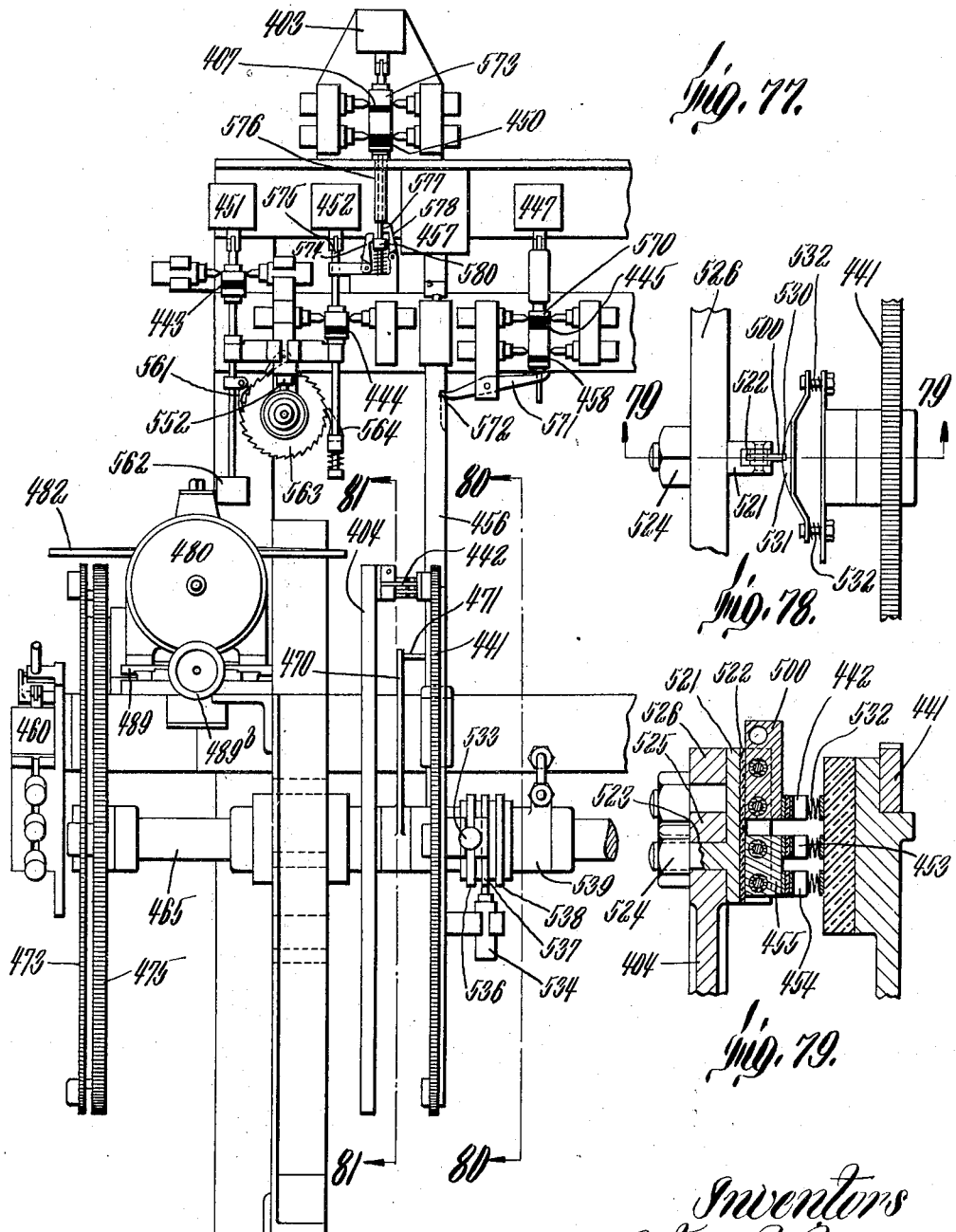

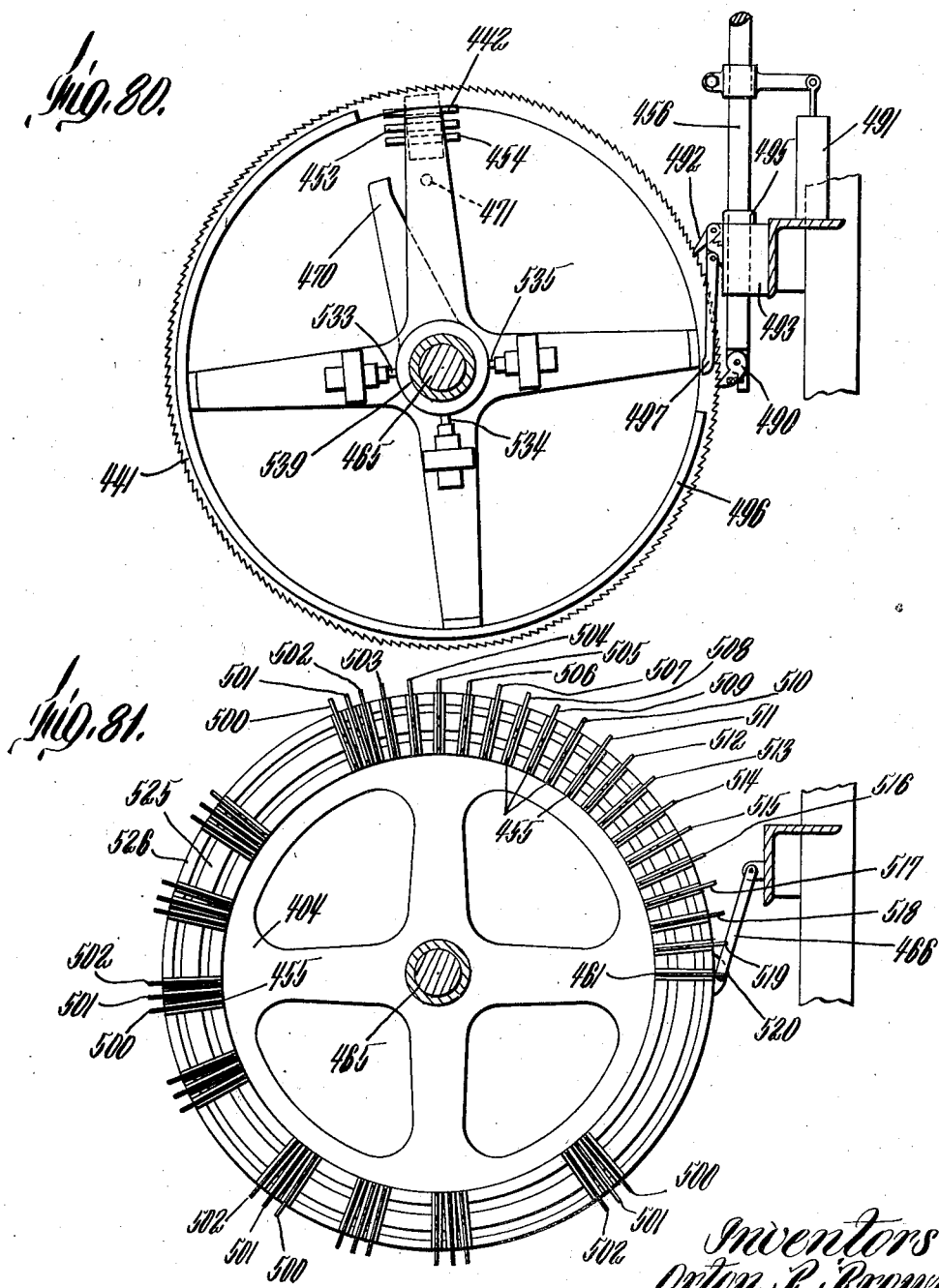

Patented Apr. 2, 1935

1,996,272

UNITED STATES PATENT OFFICE 1,996,272

METHOD OF AND APPARATUS FOR MANUFACTURING AND TREATING STRAND MATERIAL

Orton B. Brown and Ernest P. Cook, Berlin, N. H., assignors to Brown Company, Berlin, N. H., a corporation of Maine Application March 26, 1930, Serial No. 439,053

51 Claims. (Cl. 18—8)

This invention relates to the manufacture and treatment of strand material and apparatus for carrying out the same, and, while more particularly concerned with the manufacture and finishing of rayon or other so-called artificial silks, it is to be understood at the outset that our invention is not restricted thereto, but may be applied to the treatment of textile yarns or other strand material with chemical solutions, dyes, or other liquid reagents.

There are various ways of making artificial silk, classified generally as "dry-spinning" or "wet-spinning" methods, but each of these methods involves forcing a solution or syrup of a suitable cellulose derivative through fine orifices into a medium which serves to set the fine jets as filaments. These filaments are brought together as a thread or yarn, which are accumulated as on spools or in a spinning pot, in the latter case the yarn being twisted during the accumulating operation. In the so-called dry-spinning methods, a volatile solvent is employed and the cellulose derivative solution is "spun" into a warm atmosphere, which serves to evaporate the solvent and thus to produce filaments of the cellulose derivative. When nitrocellulose is the derivative, it is customary practice to denitrate the filaments by treatment with suitable chemical solutions. In the so-called wet-spinning methods, the spinneret is immersed in a bath which serves to precipitate the solution in filamentary form as it emerges from the orifice of the spinneret. Viscose-rayon, which is an example of a wet-spun artificial silk, is produced by spinning an aqueous solution of cellulose xanthate, known as viscose syrup, into an acid setting bath, which serves to precipitate or regenerate the cellulose so that a cellulose yarn issues continuously from the bath. The crude yarn contains an appreciable amount of sulphur, which not only impairs its luster but renders it unstable and interferes with satisfactory fixation of dyestuffs thereon. It usually contains organic coloring impurities and does not possess the whiteness desired prior to dyeing or manufacture into white goods. It is hence customary practice to subject the crude rayon yarn to finishing treatments, including the steps of desulphurization and bleaching. These finishing treatments have sometimes been effected while the rayon is in spool form, but, as heretofore practiced, a product non-uniform in its characteristics may result, as the treating liquid must penetrate a compact mass of yarn and certain layers of the mass may receive a longer and more thorough treatment than other layers, owing to the time required for such penetration. It has also been customary to reel the crude yarn into hanks or skeins, and then to subject the skeins to the desired finishing treatments, but such processing is time-consuming and expensive.

An object of the present invention is to provide mechanism for automatically subjecting a considerable number of thread bodies accumulated on spools to the necessary or desired steps of treatment for the finishing of the thread. Another object of the present invention is to provide mechanism designed to effect a substantially uniform treatment of the thread bodies in a minimum period of time and to carry out automatically a predetermined succession of different treatments with a minimum loss of time between the treatments. While the process and apparatus of the present invention may be applied to advantage in the various methods of rayon manufacture, for the purpose of illustration we shall hereinafter deal more specifically with the manufacture and finishing of viscose-rayon. In accordance with the present invention, such rayon may be produced as usual, by spinning a suitable viscose syrup into an acid setting bath, whereupon the yarn issuing from the bath may, if desired, be increased in strength by a stretching operation, as by passing the yarn over two or more rolls rotating at progressively greater peripheral speeds. The yarn is accumulated on suitable spools and the thread bodies thus formed on the spools are thereafter subjected to further treatment for the purpose of finishing the thread thereon. By way of example, a description is hereinafter given of a method of finishing such yarn by the use of ten baths, mostly of different kinds, it being evident that the number and variety of baths, as well as the time interval and temperature assigned for each bath may be varied without exceeding the scope of the invention.

To facilitate the treatment of thread bodies wound upon spools, the spools themselves are preferably provided with a large number of perforations through which the treating liquids may be drawn entirely through the thread body on the spool. Low pressure or so-called vacuum may be employed within the spool to hasten the penetration of the treating liquids through the thread bodies. According to the invention the thread is wound upon the spool after issuing from the acid-setting bath. The acid-treated thread is then washed in cold water for about one hour to remove residual acid therefrom. The wash water may, if desired, contain a suitable amount of ammonia dissolved therein to neutralize the acid and thus to make the washing action more rapid and complete. The water may also contain a suitable amount of monopole oil soap, or the like, to soften the filaments. After the cold water wash, the second treatment consists of a bath of a suitable desulphurizing agent such as a solution of sodium sulphide, phosphate, carbonate, sulphite, or mixtures of these or similar reagents, the bath preferably being heated to a temperature of about 80° C. to accelerate desulphurization. The thread body may be subjected to this bath for a period of about fifteen minutes, soap being included in this bath if desired, according to the character of the ultimate product required. The third treatment may consist of a hot water bath at about 94° C. to finish the process of desulphurization by dissolving out the sulphur compounds formed during the preceding treatment. The fourth step may be an acid bath to neutralize any alkali which may have been left on the filaments after the second step. This acid bath may consist of a two per cent solution of hydrochloric acid at 20° C., seven minutes being allowed for this step. Following the acid bath the thread may be washed with water at 20° C. as the fifth step of the process, this washing being continued for about eleven minutes. The sixth step may be a bath of suitable bleach liquor, e. g., sodium or calcium hypochlorite bleach in the form of a solution of from one tenth to five tenths percent strength. Seven minutes may be allowed for this bleaching bath. The seventh step is a wash with water at 20° C. for seven minutes. In the eighth step anti-chlor such as sulphur dioxide or sodium disulphite may be used in solution at 20° C. for seven minutes, this being followed by a washing with water at 20° C. for about fifteen minutes as the ninth step. The tenth bath is with water and soap at 40° C. In this step monopole oil soap or other suitable textile soap may be employed to lubricate and soften the filaments. Two minutes may be allowed for this bath, after which the spools with the thread bodies thereon may be transported to a drier where the moisture therein is dried out under proper conditions. After such treatment the filaments on the spools are chemically finished and are ready for spinning into twisted thread. The periods of time allotted for the successive baths have been carefully worked out with a view to ensuring complete treatment with each step, but at the same time to avoid useless treatment beyond that required to complete the washings or the chemical changes to be brought about by each step. In the apparatus hereinafter described for automatically subjecting thread bodies on spools to the successive treatments described, a complete cycle of three hours for each batch of spools is allowed, but it is obvious that this time allowance may be lengthened or shortened as desired by simple changes in the controlling mechanism. Of this total period of three hours, a certain amount of time must be allowed to move a batch of spools from the spinning machine, where the wet elements are wound on spools, to the treating mechanism which is designed to subject the spools to the ten baths described. A certain time interval must be allowed for the changing of the baths from one step to the next. The remaining time has been allotted in accordance with the thoroughness with which each treatment or washing must be done. The invention thus includes a working out of a schedule of minimum time intervals required for a suitable treatment in the case of each of the ten steps, and apparatus for automatically subjecting successive batches of spools to the steps of treatment described and thereafter conveying the spools to a drying apparatus.

For a more complete understanding of the invention, reference may be had to the description thereof which follows and to the drawings, of which,—

Figures 1 to 4 together show a side elevation of a machine embodying the invention.

Figure 5 is an end elevation of the same at the end shown in Figure 4.

Figure 6 is a transverse section of the mechanism on the line 6—6 of Figure 3.

Figure 7 is a traverse section on the line 7—7 of Figures 1 and 22.

Figure 8 is a diagrammatic view of the liquid circulation system employed for supplying the several baths.

Figure 9 is a plan view of mechanism for transferring spools from the spinning machine conveyer to the treating tank conveyer, together with driving connections.

Figure 10 is a side elevation of the mechanism shown in Figure 9.

Figure 11 is a section on the line 11—11 of Figure 9, this figure illustrating the transfer mechanism itself on a larger scale.

Figure 12 is a side elevation of a portion of the apparatus shown in Figure 11.

Figure 13 is a section on the line 13—13 of Figure 11.

Figure 14 is an elevation of a portion of the mechanism shown in Figure 7, on a larger scale.

Figure 15 is a section on the line 15—15 of Figure 14.

Figure 16 shows a portion of the mechanism illustrated in Figure 15, the parts being in a different position of operation.

Figure 17 is an end elevation of the mechanism shown in Figure 15.

Figure 18 is a side elevation of a spool gripped by a pair of carrier fingers.

Figure 19 is a plan view of the same.

Figure 20 is an end elevation of the mechanism shown in Figures 18 and 19.

Figure 21 is a section on the line 21—21 of Figure 19.

Figure 22 is a plan view of the mechanism shown in Figure 1.

Figure 23 is a plan view of mechanism for transferring spools from the treating tank conveyer to the drier conveyer.

Figure 24 is a side elevation of the mechanism shown in Figure 23.

Figure 25 is a section on the line 25—25 of Figure 23.

Figure 26 is a transverse section of one of the suction trunks with a pair of suction heads depending therefrom, a pair of spools being shown on the heads with caps on the outer ends of the spools.

Figure 27 is a section on the line 27—27 of Figure 26.

Figure 28 is a section on the line 28—28 of Figure 26.

Figure 29 is a plan view of a pair of control clutches which are typical of the clutches used for governing the operation of the mechanism by which the spools are subjected to the successive baths.

Figure 30 is a section on the line 30—30 of Figure 29.

Figure 31 is a plan view of one of the clutches shown in Figure 29, a portion being shown in horizontal section.

Figure 32 is similar to Figure 31, the section being taken on a higher plane.

Figure 33 is an elevation of the clutch mechanism shown in Figure 29, viewed from the right hand side of that figure.

Figure 34 is an end elevation of the mechanism shown in Figure 30, viewed from the left side of the figure.

Figure 35 is a section on the line 35—35 of Figure 29.

Figure 36 shows a portion of Figure 31 with the parts in a different position of operation.

Figure 37 is a section on the line 37—37 of Figure 4.

Figure 38 is a section on the line 38—38 of Figure 4.

Figure 39 is an elevation of a portion of the control bar for controlling the operation of a cap operating clutch.

Figure 40 is an elevation of a portion for a control bar for a carrier operating clutch.

Figure 41 is an elevation of the control bar for a transfer operating clutch.

Figure 42 is a plan view of the supply end of a treating tank, showing a portion of the supply and drain channels and the control dams.

Figure 43 is a section on the line 43—43 of Figure 42.

Figure 44 is the same as Figure 43 except that the parts are shown in a different position of operation.

Figure 45 is a section on the line 45—45 of Figure 42.

Figure 46 is a transverse section of a treating tank near the end remote from the supply end.

Figure 47 is a section on the line 47—47 of Figure 44.

Figure 48 is a vertical section of one of the supply valves shown in Figure 37.

Figure 49 is a section on line 49—49 of Figure 48.

Figure 50 is a vertical section of a portion of a suction line together with a control valve thereon.

Figure 51 is a section on the line 51—51 of Figure 50.

Figure 52 is a side elevation of control mechanism for a set of outlet valves.

Figure 53 is an end elevation of the mechanism shown in Figure 52.

Figure 54 is a section on the line 54—54 of Figure 52.

Figure 55 is a section on the line 55—55 of Figure 52.

Figure 56 is a section on the line 56—56 of Figure 52.

Figure 57 is an end elevation of control mechanism for a set of inlet valves.

Figure 58 is a detail of the mechanism shown in Figure 57.

Figure 67 is a diagrammatic elevation of the treating tank conveyer, a portion of the spinning machine conveyer, and a portion of the drier conveyer, together with a wiring diagram of apparatus for controlling the operation of the three conveyers.

Figure 68 is a plan view of an automatic switch for controlling the operation of the conveyers.

Figure 69 is a side elevation of the same.

Figure 70 is a plan view of another switch used with the conveyor controlling system.

Figure 71 is an elevation of the same.

Figure 72 is a wiring diagram of control apparatus for the automatic clutches through which the treating tanks and associated apparatus are operated.

Figure 73 is a side elevation of mechanism for timing the intervals between successive operations.

Figure 74 is a section on the line 74—74 of Figure 73.

Figure 75 is a section on the line 75—75 of Figure 73.

Figure 76 is a fragmentary perspective of a pair of pawls for operation with the ratchet wheels and delay mechanism shown in Figure 73.

Figure 77 is an end elevation of the mechanism illustrated in Figure 73.

Figure 78 is an elevation of contact elements illustrated in Figure 77.

Figure 79 is a section on the line 79—79 of Figure 78.

Figure 80 is a section on the line 80—80 of Figure 77.

Figure 81 is a section on the line 81—81 of Figure 77.

Figure 59:
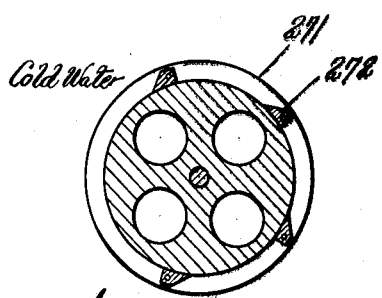
Figures 59 to 66 are sections of the cam wheels shown in Figure 52, illustrating an arrangement of cams on the several wheels for controlling the operation of the liquid supply systems for a tank.
Figure 60:
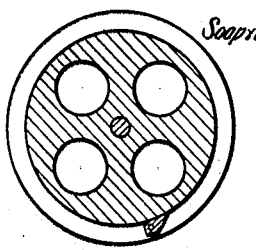
Figure 61:
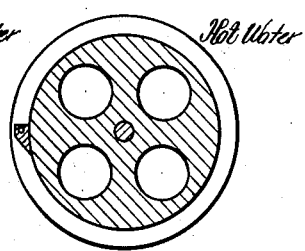
Figure 62:
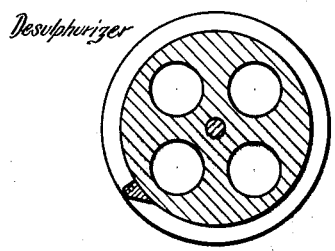
Figure 63:
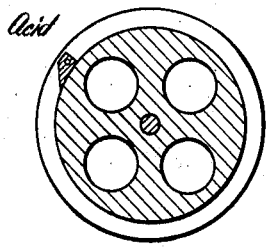
Figure 64:
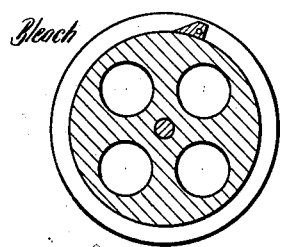
Figure 65:
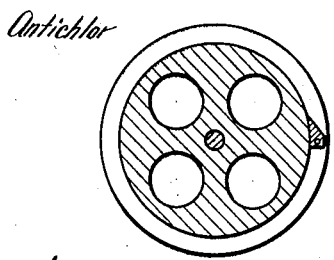
Figure 66:
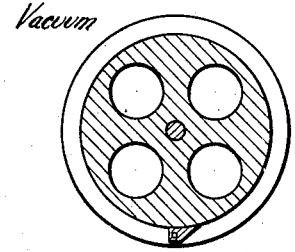

*Brief description of the apparatus as a whole*

The mechanism hereinafter described in detail is designed to remove spools from a conveyer hereinafter referred to as the "spinning machine conveyer", to transfer these spools to a second conveyer, known as the "treating tank conveyer", to convey the spools to positions opposite suitable suction heads, to transfer the spools from the conveyer pins to the suction heads, to clamp caps over the outer ends of the spools when on the suction heads, to apply vacuum or suction to the interior of the spools, to subject the spools to a succession of baths, to remove the caps from the ends of the spools, to transfer the spools back to the treating tank conveyer, and to convey the spools to a third transfer mechanism by which they are shifted to a "drier conveyer." The filaments which are formed by the spinnerets in the acid bath are wound on suitable spools, there being as many spools wound simultaneously as can be accommodated on the spinning machine, the size of which may be determined by available space or conditions of operation. The mechanism herein described and illustrated is designed to handle batches of 160 spools, these spools being arranged in two rows of 80 each. The spinning machine conveyer is normally at rest, a conveyer pin being conveniently above each spool-supporting spindle on the spinning machine. As the thread bodies on the spools are completed, an operator removes the filled spool from each spindle and transfers it manually to a pin of the spinning machine conveyer, the spool thus removed being at once replaced by an empty spool so that the winding operation is continued without appreciable interruption. When all the pins which are directly above the spindles are provided with a filled spool, this batch of spools is ready for further treatment. The treating mechanism as a whole is so designed that it will be ready for each successive batch of spools at about the time when the batch has been transferred from the spindles to the spinning machine conveyer for further treatment. The spinning machine conveyer is thereupon started and is driven in synchronism with a treating tank conveyer, the latter being used to convey each successive batch of spools to one of a number of suitable treating tanks in which they receive further steps of treatment. In the apparatus illustrated three such tanks are provided, but it is obvious that more or less may be provided according to requirements.

In the present instance the number of tanks selected is guided by the comparative intervals of time required for the winding of the filaments on the spool and the subsequent treatment in the tanks. Since it takes about one hour to wind a thread body on a spool, and three hours are allowed for the treating of the thread bodies in the tanks, three tanks are provided for simultaneous operation so that each time a batch of thread bodies is completed, one of the three tanks will be ready to discharge a treated batch of spools and to receive a fresh batch in its place for treatment. The spools to be treated are transferred one by one from the pins of the spinning machine conveyer to the pins of the treating tank conveyer and are thereupon conveyed to the three tanks successively, the conveyer stopping automatically when the spools are opposite the tank which is ready for them. The spools are then transferred simultaneously from the pins of the treating tank conveyer to suction heads arranged over the tank. A tight cap is clamped over the outer end of the spool so that when suction is applied the bath liquid will be drawn through the thread body and the perforations of the spool. According to the apparatus described, the spools are immersed in the tanks by raising the tanks rather than by lowering the spools. An automatically controlled fluid system is supplied for each tank whereby, when a tank is raised, the motion of the tank itself operates valves to permit the circulation of the desired liquid through the tank. When the tank starts to descend, the supply of liquid is cut off and that which is within the tank is permitted to drain back to the storage tank from which it came. As soon as the tank is empty, the liquid for the next successive bath is thereupon supplied as the tank is raised again.

During the entire series of baths constituting the treatment, a vacuum is maintained on the inside of the spools so that the action of drawing through the successive liquids is practically continuous. The relatively small quantities of liquid which are drawn through the spools are carried to the sewer or otherwise suitably disposed of. At the end of a cycle of baths, the vacuum is automatically relieved, the caps are removed from the ends of the spools, and the spools are transferred back to the treating tank conveyer pins, this conveyer being then automatically started in operation to convey the treated spools for transfer to the drier conveyer. As the spinning machine conveyer is arranged to be driven through the treating tank conveyer, the former is ready to be started at any time after the treating tank conveyer automatically starts. The spinning machine conveyer is preferably started manually to ensure that all the spools of a batch are in place on the pins of the spinning machine conveyer before it is connected to the treating conveyer to be driven thereby.

*Mechanisms for transferring spools from one conveyer to another*

Figures 9 to 13 illustrate in detail mechanism by which the spools carried by pins on the spinning machine conveyers 100 are transferred one by one to the treating tank conveyers 101. As indicated in several of the figures, including Figure 9, the apparatus is designed to handle two series of spools in parallel and hence there are two spinning machine conveyers 100, two treating tank conveyers 101 and two drier conveyers which receive the spools from the treating tank conveyers after the treatment has been completed. The treating tank conveyers 101 are at rest most of the time and are set in motion by mechanism to be hereinafter described. When the last operation of spool treatment has been completed for any one of the three treating tanks, the treating tank conveyers are thereupon set in motion to deliver the treated thread bodies to the drier. The spinning machine conveyers 100 may be driven from the treating tank conveyer by apparatus illustrated in Figure 9.

As shown, the treating tank conveyers 101 may pass beneath idle sprocket wheels 102 and thence around a pair of sprocket wheels 103 which are mounted on a common shaft 104. On the same shaft 104 is also mounted an automatic clutch 105 by which a sprocket wheel 106, loosely mounted on the shaft 104, may be operatively connected to the shaft to be driven thereby. The clutch 105 is of the type illustrated in Figure 30 and hereinafter described, and is controlled by a suitable solenoid which may be energized to throw the clutch members into engagement. If the energizing current is maintained the clutch members will remain in engagement until the solenoid is deenergized, whereupon the driven clutch member completes the remainder of its revolution and is disconnected from the driving member at the same point from which it started so that the sprocket wheel 106 always makes one or more complete revolutions and stops in the same position each time. From the sprocket wheel 106 are driven the spinning machine conveyers 100. To this end the sprocket wheel 106 may be connected to a sprocket wheel 107 by a suitable chain 108, the sprocket wheel 107 being mounted on the hub of a gear 109 which meshes with another gear 110 mounted on a shaft 111 on which are mounted a pair of sprocket wheels 112. The spinning machine conveyer 100 passes around the sprocket wheels 112 and under a pair of idle sprocket wheels 113 mounted on a common shaft 114. On this shaft is also mounted a third sprocket wheel 115 connected as by a chain 116 to a sprocket wheel 117 which is mounted on a shaft 118 with a pair of bevel gears 119. These gears respectively mesh with companion gears 20 mounted on shafts 121, each of which also carries a gear wheel 122 in mesh with a gear ring 123 (Figures 11 and 13). The gear ring 123 is provided with a pair of peripheral flanges 124 which lap over both sides of the gear 122. The ring 123 is supported by the gear 122 and by a roller 125, a second roller 126 being mounted above the ring as a guide to keep it in position. Within the ring 123 are mounted a number of resilient pads 127 from each of which a suitable pin 128 projects radially inwardly. The pins 128 are of sufficient size to receive and support a spool S. The ring 123 is of such a size, as shown in Figure 11, as to allow sufficient clearance between the inner tips of the pins 128 for the conveyers 100 and 101 with their respective spool supporting pins.

Mounted on the shaft 121 is a cam wheel 129 having in a face thereof a cam slot 130 in which rides a roller 131 or other suitable cam follower. The roller 131 is carried on a lever arm 132 which may be mounted, together with a similar arm, on a shaft 133. The arms 132 are disposed on opposite sides of the plane of the ring 123 and, as shown in Figure 12 may be turned inwardly as at 134 to engage an end of a spool when the arm is swung on the axis of the shaft 133. A pair of similar arms 135 may be mounted as shown in Figure 12, these arms being mounted on a common rock-shaft 136 and provided at their upper ends with inturned portions 137 which are adapted to engage the end of a spool on a pin of the spinning machine conveyer 100. The arms 132 and 135 are thus swung back and forth by means of the motion of the cam follower 131 in the cam slot 130. The latter is so arranged as to cause the arms to rest in the position illustrated in Figure 11 for an appreciable period of time to permit a spool to move into position to be transferred. The arms are then rocked quickly by the cam to the opposite end of their stroke which causes a quick transfer of a spool from a pin of the spinning machine conveyer 100 to one of the pins 128. Simultaneously a spool on the opposite pin 128 is kicked across to a pin of the treating tank conveyer 101. The spool which is kicked from the spinning machine conveyer to a pin 128 is prevented from rebounding from the resilient pad by a brief dwell of the arms at the end of their kicking stroke. This spool is thereafter carried through half a revolution of the ring 123, whereupon it is in position to be kicked over to the treating tank conveyer. Thus the spools are successively transferred from one conveyer to the other, the motion of the two conveyers, the ring 123 and the rocker arms 132 and 135 being all synchronized by their mechanical connection with a common driving source.

The conveyers themselves may be of any suitable construction. As indicated in Figure 11, they may comprise a series of links 138, the links being held together by suitable transverse pins in a manner well known in the art. Certain of these pins may extend outwardly from both sides of the chain, such pins being uniformly spaced from each other. On these longer pins may be mounted a pair of rollers 139 and 140, the roller 139 being adapted to ride on a suitable track 141 which supports the conveyer, the roller 140 being adapted to bear on the under face of a guide member 142. The portion of the pin which extends from the chain 138 on the side opposite from the roller 140 is provided with a spool supporting member 143. The guide rail 142 prevents the member 143 from tilting downwardly and thus retains the spool thereon. As indicated in Figures 1 and 67, the treating tank conveyer follows a tortuous path which leads first over the lower treating tank, then over the second treating tank, and finally over the third treating tank. As a batch of freshly wound spools is being led up to be stopped at one of the three tanks, the treated spools from the same tank are being carried on by the conveyer to the transfer mechanism by which they are shifted to the drier conveyer.

This transferring apparatus is illustrated in Figures 22 to 25 and may comprise a cam member 144 of cylindrical shape having in the periphery thereof a cam slot 145 in which rides a follower 146 mounted on an arm 147 which is rockable about an axis 148. The outer end of the arm 147 is connected to the end of a sliding rod 149 having a button 150 on the further end adapted to strike the end of a spool carried by the treating tank conveyer and to kick the spool over to an opposite pin on the drier conveyer 151 which is arranged to run parallel with the treating tank conveyer at this point and in the same direction. The cam member 144 may be mounted on a common shaft with a sprocket wheel 152 which, in turn, is connected by a chain 153 to a sprocket wheel 154, the latter being mounted on a shaft 155 which also carries a pair of sprocket wheels 156 driven by the drier conveyer 151, so that the drier conveyer is driven in synchronism with the reciprocation of the kicker rod 149. As is hereinafter described, the drive of the drier conveyer and the treating tank conveyer is likewise synchronized so that whenever the rod 149 is reciprocated the adjacent pins of the two conveyers are substantially alined. As indicated in Figure 22, the pins on the drier conveyer 151 may be more widely spaced than those on the treating tank conveyer 101. To offset this, the drier conveyer is driven at a correspondingly higher speed.

*Transfer mechanism between treating tank conveyers and suction heads*

When a batch of spools to be treated reaches a tank from which treated spools have just been removed, the line of fresh spools is automatically halted when the pins carrying these spools are opposite corresponding vacated suction heads. In order to transfer the spools from the treating tank conveyer 101 to the respective suction heads, a pair of carrier fingers 157, 158 may be provided for each spool, as shown in Figures 14 to 21. Each of these carrier fingers has a short stem 159 adapted to project a short distance within a spool supported on the conveyer 101, and an elongated arm having an end portion 160 adapted to move into contact with the opposite end of the spool and to support it. Adjacent to the stem 159 on each of the carrier fingers is provided a flange 161 spaced from the portion 162 of the finger immediately adjacent to the stem 159, so as to form therewith a channel or recess adapted to fit against the edge of a spool flange. As shown in Figure 19, when the stems 159 are moved to project into the spool the fingers may be swung around on the axes of their stems so as to hold one of the end rims of the spool between the portion 162 of the arm and the flange 161. Thus, as shown in Figure 16, the spool may be gripped by the fingers 157, 158 and may be lifted clear of the conveyer pin. The fingers 157, 158 are, as shown in Figure 18, journaled in a support 163 secured to a suitable angle bar 164. This bar extends the entire length of the treating tank and serves as a support for all the carrier fingers on one side of a tank. The stems 159 of the fingers 157, 158 are connected as by a pair of pinions 165, 166, so that the fingers 157, 158 swing simultaneously. The swinging motion of the carrier fingers may be brought about by means of an actuator bar 167 which is connected to each finger 158 as by a pin 168 journaled therein. Reciprocation of the bar 167 relatively to the angle iron 164 in which the fingers are journaled swings the fingers back and forth between the positions illustrated in Figures 15 and 16. The reciprocation of the bar 167 may be effected by a screw threaded extension 169 on one end thereof which is threaded through a pinion 170 having helical gear teeth meshing with a similar pinion 171. In the particular construction and arrangement of parts illustrated in Figure 14, a small portion of the pinion 170 projects into the path of the spools traveling on the conveyer 101. A plate 170ª may be provided to engage passing spools and move them outwardly on the conveyer pins to clear the pinion 170. The extension 169 of the bar may be slotted as at 172, a key member 173 being provided, as shown in Figures 15 and 17, to prevent rotation of the bar 167, but to permit longitudinal reciprocation thereof to swing the fingers 157, 158. The pinion 171 is slidably mounted on a shaft 174 but is driven therewith as by a suitable spline 175. The shaft 174 is directly controlled by one of the several control switches illustrated in Figures 1, 7 and 22 and hereinafter more fully described.

It is apparent from Figure 6 that the carrier fingers 157, 158 must be moved bodily in a direction parallel to the pins of the conveyer 101 to transfer the spools from the conveyer to the suction heads. To this end the angle iron 164 may be supported on a number of horizontal arms 176 and pivotally secured to said arms, the opposite ends of these arms being attached to suitable nuts 177 which are in threaded engagement with a shaft 178. The arrangement of the nuts 177 on the shaft 178 is such that when the shaft 178 is rotated, the arms 176 are swung to move the angle iron 164 in or out, as shown in Figure 6. This arrangement is indicated in Figures 2 and 3. The shafts 178 may be connected by suitable helical gears to a transverse shaft 179 (Figure 22) which is directly driven by one of the automatic clutches.

When the fingers 157, 158 are employed to transfer spools from the conveyor 101 to the suction heads, they are first advanced a short distance by rotation of the shaft 178 to remove the stems 159 from the position shown in Figure 14 into the near end of the spools. Then the bar 167 is moved to swing the fingers to grip their respective spools, as in Figure 16. This lifts the spools from the conveyor pins. The shaft 178 is again rotated to advance the fingers with their spools until the latter are on their respective suction heads. The fingers are then swung back by the bar 167 to release the spools. The shaft 178 is rotated to return the fingers to their initial position.

In like manner when a set of spools is ready for removal from the suction heads, after completion of the treatment, the shaft 178 is rotated to advance the fingers to positions under the spools, then the bar 167 is moved to swing the fingers to gripping position. The shaft 178 is rotated to retract the fingers with the spools until the latter are on respective pins of the conveyor. Then the bar 167 is moved to swing the fingers to release the spools. This leaves the spools supported by the conveyor pins. The fingers are retracted a short distance to the position shown in Figure 14 to clear the spools. The conveyor can then be started.

*Suction mechanism*

When a set of spools are removed from the fingers of the treating tank conveyer 101 by the carrier fingers 157, 158, they are thereupon transferred to supports through which suction may be applied to the interior of each of the spools. A support is mounted over each of the treating tanks, one of these supports being illustrated in detail in Figure 26. As therein shown, it includes a pipe 180 to which is secured by a clamp or other suitable means a number of T-shaped members. Each member comprises a downwardly extending portion 181 from which a pair of suction heads 182 extend in opposite directions. Each of these heads is adapted to receive a spool, suitable rubber gaskets 183 being provided to furnish a tight joint with one end of each spool. A cap 184 having a gasket 185 is adapted to fit over the opposite end of each spool and to press the spool against the gasket 183 so as to seal both ends of the spool. In this way, suction which is applied within the spool tends to draw through the thread body T on the spool any fluid which may surround the thread body when suction is applied. Each suction head 182 is provided with a duct 186 extending inwardly from the end thereof and disposed near the upper portion thereof so as to maintain a liquid level in the spool as high as possible to prevent unequal penetration through the upper and lower portions of the thread body T which might result from a greater pressure difference through the lower portion of the thread body due to the head of liquid on the outside of the spool. These ducts meet in an upwardly extending duct 187 which leads through the member 181 and through an extension 188 of the member 181 which projects downwardly through the pipe 180. The upper end portion of the extension 188 may be slightly tapered as at 189 to receive a cap 190. As shown in Figure 27, the duct 187 is made to open out on the lateral surface of the tapered portion 189, the cap 190 being adapted to fit over and to close the orifice at the end of the duct 187. The cap 190 is, however, provided with a passage 191 adapted to register with the upper end of the duct 187 and to provide an outlet for this duct when the cap is correctly positioned. The cap 190 is provided with a downwardly extending nipple 192 having therein a narrow slot 193 communicating with the passage 191, whereby liquid which passes through the passage 191 from the duct 187 is emitted in a flat stream convenient for inspection.

The upper portion of the extension 188 which projects above the top of the pipe 180 is enclosed in an inverted glass cup 194, the mouth of the cup being clamped to a suitable gasket 195 as by a spring 196. At the point where the extension 188 passes through the upper wall of the pipe 180, a clearance 197 is left through which may pass liquid which has been drawn through the duct 187 from the suction heads 182. The liquid thus enters the suction pipe 180 through the several heads 182 and is drawn off by means hereinafter described.

Any suitable material may be employed in the construction of the suction mechanism. As shown in Figure 26, the suction pipe 180 may be of metal having a lining 198 of rubber or the like. In like manner the stem 181 of the T member and the caps 184 may be made of metal with rubber coatings 199 to protect them from the liquids used in the baths. The suction heads may have a hollow metal core 200 to save weight, this core being surrounded by a layer of rubber 201 through which the ducts 186 extend. The T member may be clamped to the pipe 180 as by a pair of bolts 202 extending about the sides of the pipe 180 and being connected with an upper block 203 which carries the gaskets 195, on which the cups 194 rest. The spring 196 is preferably arranged to be quickly removed so that in the case of failure on the part of any suction head or its spool to function properly, the corresponding cup 194 can be quickly removed by the operator and the cap 190 turned so as to close off the duct 187 and thus to prevent loss of suction in the pipe 180 and waste of chemical.

The caps 184 may be mounted on a shaft 204 on each side of each suction pipe 180. In order to provide for a firm yielding pressure of the cap against the end of the spool, the cap is mounted in such a manner as to permit a limited rocking movement with respect to its shaft 204. To this end each cap is adjustably secured to a member 205 by a ball and socket joint 206. The member 205 has a portion loosely mounted on the shaft 204. Fixed on the shaft is an associated member 207. A suitable compression spring 208 is carried between a pair of projecting portions of the members 205 and 207, the arrangement being such that the spring 208 tends to rock the cap 184 toward the end of the spool. The relative motion of the cap in this direction is limited by a suitable stop 209 against which a portion of member 205 engages. A set screw 210 may be provided to prevent the member 207 from slipping on the shaft 204. The compression of the spring 208 may be regulated by a suitable set screw 211. The shaft 204 is rocked by suitable mechanism to swing the caps 184 into and out of engagement with the ends of spools which have been placed on the suction heads, as shown in Figure 6. To this end each pair of shafts 204 may be provided with a worm sector 212 (Figure 7), these worm sectors being meshed with suitable worms 213 mounted on a shaft 214. Each shaft 214 is rotated in suitable directions at suitable times by one of the automatic clutches, hereinafter described.

The suction pipes 180 are connected through suitable control valves to a common suction trunk 215 which leads to a suction pump 216 and thence to a sewer or other proper point of disposal for the liquids drawn through the thread bodies.

*Liquid supply mechanism*

When a batch of spools has been conveyed from the spinning machine and has been transferred to a set of suction heads, the corresponding caps are clamped down over the outer ends of the spools, suction is applied to the pipe 180 and the spools are now ready to be immersed in a bath of treating liquor. To this end a tank 217 is provided for each suction pipe 180. In the embodiment of the invention illustrated in the drawings, three tanks 217 are thus provided so that three sets of spools may be simultaneously treated, these treatments being in different phase, so that the times for replacement of sets of treated spools by fresh spools to be treated are staggered for the several sets of spools.

In order to facilitate the immersion of a set of spools in one of the tanks 217, means is provided for elevating the tank so as to bring the liquid therein into contact with the spools so that the spools will be submerged therein. To this end the tanks may be supported by a series of cross bars 218, these bars being spaced at suitable intervals along the tank. The tanks themselves are elongated to receive simultaneously all the spools of any set, the number for which the tanks are designed in the present instance being 160 spools in two rows of 80 each. On account of their length, each tank is preferably secured at one end only to one of the bars 218, to permit thermal expansion. Automatic mechanism, hereinafter described in detail, is provided for raising and lowering each tank for each successive bath provided for the treatment of the spools. In order to raise and lower the tanks, each supporting cross bar 218 is carried by a pair of threaded shafts 219, a pair of compression springs 220 also being provided if desired to take some of the weight of the tank and its contents off the screw shafts 219. The shafts 219 are not rotatable, but are in threaded connection with spiral gears held against axial displacement by suitable supports 221 and rotated by a gear connection with horizontal shafts 222 (Figure 6). Each pair of shafts 222 may be connected by suitable spiral gears to a transverse shaft 223 operated directly from one of the automatic clutches hereinafter described.

Each tank 217 is automatically filled and drained for each successive bath to which the spools are subjected. The liquids which are thus supplied and removed may be controlled automatically by any suitable mechanism. As shown on the drawings, the control of liquid supply and discharge is operated by the movement of the tank itself. In treating thread bodies in the manner hereinbefore described by way of example, seven different liquids are used for ten successive baths, four of these baths being cold water baths. A separate supply tank is provided for each of the seven different liquids. It is obvious that if a greater variety of liquids be employed, a larger number of tanks may be accordingly provided. As shown in Figures 1 to 4, seven tanks 224 are provided, each tank being supplied with a feed pipe 225 extending through a corresponding pump 226 by which the liquid may be supplied selectively to any one of the three treating tanks through a suitable system of control valves. The liquid which is not sucked through the thread bodies and discharged through the suction pump 216, is returned during and at the termination of the bath to its respective tank 224 by a suitable return pipe 227.

The apparatus for controlling the supply of liquids to the several tanks and the drainage of the tanks before the operation of each step of treatment is diagrammatically illustrated in Figure 8, this mechanism being also shown in Figures 4, 37, 38 and 42 to 47. Each tank 217 may be supplied through a suitable supply reservoir 228. There is one such reservoir provided for each of the three tanks shown. As indicated in Figure 8, each of the supply lines 225 is provided with branches 229 leading to the bottom of each supply reservoir 228. Each branch pipe 229 is controlled by a suitable automatic valve 230. These valves are raised one at a time at proper times during the treatment of the spools to admit the different liquids successively for the baths in their proper sequence. In like manner, a discharge reservoir 231 is provided for each tank 217, each discharge reservoir 231 being provided with outlets controlled by valves 232, through which outlets the several liquids are discharged into hoppers 233 (Figure 5) communicating with respective return pipes 227. The hoppers 233 are spaced below the reservoirs 231, so that a failure on the part of any valve 232 can be easily detected. During the progress of each bath, the corresponding liquid is continually supplied to the tank, the overflow being returned through the corresponding return pipe 227. As shown in Figures 42 to 47, a system of dams is supplied to ensure the maintenance of the proper level for the liquid in the tank during a treatment. As shown in Figures 5 and 38, the supply reservoir 228 is supported above its respective tank 217, so that liquid therein may flow by gravity into the tank regardless of whether the tank is in its raised or lowered position. Liquid in the tank 228 may flow through a short pipe 234 into an end of the tank 217. The discharge reservoirs 231 are placed at a lower level than their respective tanks, so that a liquid in the tank may flow through a short pipe 235 into the discharge reservoir for any position of the tank. In order to maintain a gentle circulation of the liquid in the bath along the tank, an additional discharge pipe 236 may be provided for each tank, this pipe leading from the end of the tank remote from the supply and discharge reservoirs.

Adjacent to the remote end of the tank a suitable fixed dam 237 is provided to maintain the proper level of liquids in the tank. At the end of the tank adjacent to the supply and discharge reservoirs a dam is provided to control the liquid level within the tank. This dam, as shown, may consist of two relatively movable parts, a lower dam member 238 and an auxiliary dam member 239 adapted to cooperate with the member 238 to form a higher dam. Both dam members are provided with a head piece 240 having end portions extending into slots 241 in a pair of fixed brackets 242. The lower portion of the slots 241 is wide enough for the head piece 240 of the dam member 238 only. The upper end of each slot 241 is widened, forming a shoulder to support the head piece of the member 239, so that this member is not permitted to descend lower than the position indicated in Figures 43, 44 and 47, whereas the dam member 238 is vertically movable from its low position as shown in Figure 44, to its high position, as shown in Figure 43, both dam members being movable a little higher than the positions shown in Figure 43. When the tank is in its lowermost position, as in Figure 44, there is a clearance of about three inches between the lower edge of the dam member 238 and the bottom of the tank. As is hereinafter described, when the tank starts to rise it is raised about three inches, that is, a distance sufficient to bring its bottom in contact with the lower edge of the dam member 238. At this point the upward movement of the dam is arrested for a sufficient period to permit the tank to be filled approximately to the level of the crest 243 of the dam member 238. The upward movement of the tank is then continued, the rise of the liquid level in the tank being augmented by the displacement caused by the immersion of the spools in the liquid. The purpose of the low level dam member 238 is to prevent the tank from being filled to such an extent prior to the immersion of the spools that the liquid will overflow when the spools are immersed therein. In order to maintain the normal full level in the tank after the spools have been immersed, the dam member 239 is provided. As the upwardly rising tank reaches its uppermost position, the upper edge 243 laps the lower edge 244 of the dam member 239 so that the two dam members form a continuous dam, the crest of which is the upper edge 245 of the dam member 239. Thus the proper level is maintained. During each bath an excess of liquid is constantly supplied which spills over the crest 245 of the movable dam and that of the fixed dam 237 at the further end of the tank.

In order to avoid disturbance of the thread on the spools adjacent to the supply end of the tank by turbulence of the liquid flowing into the tank through the pipe 234, a suitable baffle plate 246 may be suspended so as to project downwardly into the tank, but to leave sufficient clearance between and around its side and bottom edges to permit liquid to flow freely into the tank from the supply end to replace the liquid which is sucked through the thread bodies and spools and that which spills over the fixed dam 237 at the further end of the tank.

The inlet valves 230 and the discharge valves 232 may be hydraulically operated as by mechanism such as is illustrated in Figures 48 and 49. Taking an inlet valve 230 by way of example, this valve may comprise a disk-like member having a suitable gasket 247 fitted over the orifice of a branch supply pipe 229. A vertical cylinder 248 extends upwardly from the valve disk, this cylinder containing a piston 249 slidable therein. The top of the cylinder is suitably closed by a liquid-tight cover 250 through which slides the stem 251 of the piston 249, suitable packing 252 being supplied about the stem 251. The stem 251 is held by a suitable fixed clamp 253, the cylinder 248 with the valve disk being free to slide up and down on the stem. The piston 249 divides the closed cylinder 248 into two separate chambers, one of which communicates with a pressure line 254, the other chamber communicating through a central channel 255 in the stem 251 with a pressure line 256. Since the stem 251 is held fixed, it is clear that if pressure is supplied through the line 254 to the upper chamber in the cylinder 248, the upper end of the cylinder will be pressed upwardly and will tend to raise the cylinder and the valve from the valve seat, thus opening the valve. On the other hand, if pressure be applied through the line 256 to the lower chamber, the cylinder and valve will be pressed downwardly to close the valve. Thus the valve may be opened and closed by alternative pressure conditions in the lines 254 and 256. The stroke of the valve can be readily varied by changing the point at which the stem 251 is gripped by the clamp 253.

As shown in Figures 42 and 48, each supply valve 230 is set in a shallow well formed by partitions 257 rising from the floor of the supply reservoir 228. Thus if any of the supply valves 230 has failed to close properly, when another supply valve is opened the partition 257 prevents the liquid which is being supplied from flowing down through past the valve which has failed to close properly.

The valves for controlling the vacuum conditions in the several vacuum pipes 180 may be of the type illustrated in Figures 50 and 51. As therein shown the valve 258 is mounted on a suitable stem 259 which carries at its upper end a piston 260 slidable in a hollow cylinder 261. The cylinder 261 is closed at both ends and surrounds the upper portion of the stem 259, being divided into two chambers by the piston 260, the upper chamber communicating with a pressure line 254, the lower chamber communicating with a pressure line 256. Adjacent to the valve disk 258, the stem 259 is enlarged as at 262, this enlargement extending upwardly from the valve disk 258 a distance less than the stroke of the valve disk from the position shown in Figure 50 to its lower seat 263. In its elevated position, the valve disk 258 is adapted to rest on an upper seat 264 which is formed on the under face of a cover plate 265, the latter being secured to a suitable flat portion 266 of the elbow coupling connecting the pipe 180 with the suction trunk 215. Extending upwardly from the cover plate 265 are a pair of standards 265ᵃ which support the cylinder 261. Figure 50 illustrates the valve in the position it takes when suction is applied to the pipe 180. After the treatment of a set of spools has been completed and the spools are ready to be removed from the suction heads, the vacuum in the line 180 must be broken. To this end pressure may be supplied to the line 254, this pressure pushing downwardly on the piston 260 and thus causing the valve disk 258 to descend to its position on the lower valve seat 263, shown by dotted lines.

The enlarged portion 262 of the stem 259 has a sliding fit in the opening through the plate 265. The vacuum in the pipe 180 is not appreciably relieved by inflow of air around the stem 259 until the valve has nearly reached the seat 263 to shut off connection with the suction trunk 215. When the enlargement 262 of the valve stem clears the opening through the plate 265, the air rushes into the pipe, relieving the vacuum therein and permitting the caps 184 to be swung back from the ends of the spools. When the valve 258 is thereafter raised, the enlargement 262 substantially closes the opening in the plate 265 at once so that the suction acts on the pipe 180 promptly. The opening is then closed tightly when the valve 258 reaches its upper seat 264. When a fresh set of spools has been transferred to the suction head and the caps 184 have been swung down to seal the outer ends of the spools, suction may be applied to the pipe 180 by supplying pressure fluid to the lower chamber in the cylinder 261. This forces the piston 260 upwardly, carrying the valve 258 from its lower seat 263 to its upper seat 264. The pipe 180 is then in direct communication with the vacuum line 215 which leads to the vacuum pump 216.

The mechanism by which the up and down movements of the tank control the action of the liquid supply and discharge mechanism for that tank is illustrated in Figures 52, 57 and 58. The pressure lines 254 and 256 from the various individual valves are connected with a manifold 267 which contains a pressure channel 268 and a pair of connected drain channels 269. Pressure is maintained constantly in the channel 268 by communication with a suitable source (not shown) of water or other fluid under pressure through a pipe 268ª. The channel 269 may either be vented directly to the atmosphere or connected to an exhaust line 269ª. A control valve 270, consisting of a plunger having three valve disks formed or fixed thereon as illustrated in Figure 54, may be supplied for each pair of pressure lines 254 and 256, each control valve being operated by a corresponding cam wheel 271 having one or more cam lugs 272 on the periphery thereof. As the cam wheel 271 is rotated, the lugs depress the control valve from the position shown in Figure 54, in which the line 254 communicates with the drain channel 269 and the line 256 communicates with the pressure channel 268, to a position in which the connections are reversed, that is, in which the line 254 communicates with the pressure channel 268 while the line 256 communicates with the drain channel 269.

The slide valves 270 may be pressed upwardly against the action of the lugs 272 resiliently by any suitable means. In order to avoid the use of springs, fluid pressure, preferably water, may be maintained on the lower ends of the valve plungers through a supply pipe 270ª. Water leaking past the upper valve disks on the plungers enters a chamber 270ᵇ and is carried off by a drain pipe 270ᶜ.

In order to avoid a lateral thrust on the slide valve 270 when engaged by a cam lug 272, a wear piece 273 may be interposed between the upper end of the valve 270 and the cam surface of the wheel 271, this wear piece 273 being pivotally mounted as at 274 to permit the depression of the valve 270 by the lugs 272. When the valve 270 is in the position shown in Figure 54, pressure is on the line 256, this pressure, as shown in Figure 48, acting to hold the valve 230 tightly on its seat. When the valve 270 is moved downwardly by a lug 272, the pressure in the lower chamber of the valve cylinder 248 is relieved through the line 256 and pressure is supplied to the upper chamber through the line 254, causing the valve to move upwardly. The distance of opening of the valve 230 can be readily regulated by the height at which the piston 249 is secured by the clamp 253. Actuation of the valves 270 by means of the cam wheels 271 may be effected by mechanism illustrated in Figure 53. The cam wheels 271 may be mounted on a common shaft 275, this shaft also having mounted thereon a ratchet wheel 276. As shown, the wheel 276 is supplied with ten ratchet teeth 277, these teeth being removably set in the wheel 276 as by pins. A number of suitably spaced additional holes are provided in the wheel 276 to permit the use of a greater or less number of teeth according to the total number of steps desired in the treatment. Since, according to the example given, the treatment of the spools may comprise ten steps, ten teeth 277 are shown on the wheel 276.

The lugs 272 are in like manner removably fixed on the rims of their respective wheels 271. In the embodiment of the invention illustrated, these lugs are angularly spaced from each other by multiples of 36°, that is, tenths of a circumference. In order to rotate the wheel 276 through a tenth of a revolution, an adjacent tank support 218 is provided with a suitable pawl 278. The position of the pawl when the tank is down is illustrated in dotted lines in Figure 53. It is obvious that the first portion of the upward movement of the tank results in the rotation of the wheel 276 through an angle equal to the angular spacing between successive teeth, that is, 36°. This angle may be accurately controlled by a fixed member 280 against a side edge 281 of which the pawl 278 rides on its upward movement. The edge 281 slopes away from the center of the wheel 276 so that, at the proper point, the pawl 278 is moved clear of the tooth engaged thereby. This results in a simultaneous rotation of all the cam wheels 271 mounted on the same shaft. The lugs for controlling the action of the outlet valves 232 are so positioned that one of these valves is always open. This means that of the several slide valves 270, one is depressed by one or the other of the cam lugs 272. When the wheel 276 is rotated through 36°, the result is to cause the open valve 232 to close and at the same time to cause another of the valves 232 in the same set to open. This simultaneous closing of one valve and opening of another occurs whenever the tank starts to rise.

The mechanism for controlling the inlet valves 230 is substantially the same as that described for the outlet valves 232, except that the operation of the ratchet wheel is slightly different. As shown in Figures 57 and 58, the ratchet wheel 276 is provided with ten teeth 277 to be engaged by a downwardly depending pawl 278 carried by a support member 218 for the tank. This support member carries in addition a second pawl 279 which is adapted to engage the ratchet wheel 276 during the downward movement of the tank and to rotate it through half the unit angle, that is, through an angle of 18° in the mechanism illustrated. This angle of rotation is accurately controlled by a suitable plate 282 adjustably secured to the member 281. Against an edge of the plate 282 the pawl 279 is adapted to engage in its downward movement so as to be swung clear of the wheel 276 at the proper point. This occurs during the latter part of the downward movement of the tank. The early part of the succeeding upward movement causes the pawl 278 to rotate the wheel 276 an additional 18° to complete the 36° corresponding to one of the steps of the treatment.

The cam lugs 272 for controlling the action of the inlet valves 230 are so arranged with reference to the teeth 277 that the downward movement of the tank closes the open valve 230 without opening another valve. The next succeeding valve is opened by the upward motion of the tank. Thus when the tank is in its lowermost position, the supply valves are all shut, but one of the discharge valves is open. Thus the tank is permitted to empty itself through the discharge valve. When the tank is thereafter raised, the first portion of the upward movement closes the open discharge valve and at the same time opens a different discharge valve. Simultaneously with this action, one of the supply valves, corresponding to the newly opened discharge valve, is opened, whereby one of the liquids is supplied to fill the tank to the crest of the dam, after which the excess liquid flows continuously out through the discharge valve and back into the tank from which it was pumped until the treating tank is lowered to shut off the supply valve.

In the embodiment of the invention illustrated on the drawings, a supply pump 226 is provided for each of the several liquids supplied for the treating baths. In the case of the cold water supply, a continuous circulation is maintained upwardly through the supply line 225 and back through the discharge line 227. These two lines are connected as at 283 (Figures 4, 5 and 8) so that the circulation may be continuous regardless of whether any one of the valves 230 associated with this line is open. Thus the fresh water pump runs continuously. The same arrangement may be employed for all the other liquids used for the baths. As shown, however, there is no direct connection between the supply lines 225 and the return lines 227 for the liquids other than the cold water supply. Instead, mechanism is provided for intermittently operating the respective pumps which supply these liquids, the operation of each pump being controlled by the opening of a corresponding supply valve 230. As shown in Figure 5, each pressure line 254 may be connected as by a branch pipe 284 to a switch 285 by which the corresponding pump motor may be started and stopped. The switch 285 is of such a type as to be turned on by pressure in the line 284 and to be turned off by relief of pressure in that line. Switches of this type are well known to the trade. Thus the pumps for the various fluids are normally at rest. Whenever one of the supply valves 230 is opened by the supply of pressure through the corresponding line 254, this pressure at the same time starts the operation of the corresponding pump so that liquid is promptly supplied through the newly opened supply valve. When the pressure on the line 254 is relieved so as to close the supply valve, the pump supplying liquid through that valve is simultaneously shut down.

When a set of spools has been positioned on the suction heads of one of the suction pipes 180 and the caps have been clamped over the ends of the spools, vacuum is thereupon applied and is continued constantly until the last bath in the treatment has been completed, whereupon the vacuum is relieved to permit the removal of the spools from the suction heads.

Operating clutches

For the operation of the three conveyers, the tanks, the caps, the spool carriers and the carrier transferring mechanism, automatic clutches are provided. Nearly all of these clutches are located at the end of the machine shown in Figure 1. These clutches are all similar in action, being of a type wherein a normally retracted bolt is permitted to engage a constantly moving part of the clutch so as to throw the clutch into engagement, this engagement continuing until the bolt is retracted at the end of one or more complete revolutions of the normally stationary clutch member. By way of example, one automatic clutch is described herein in detail, the others being identical therewith or similar thereto.

Referring to Figures 29 to 36, each automatic clutch may comprise a normally stationary drum 300 fixed on the shaft to be driven. Of the two clutches illustrated in Figure 29, the upper is for operating the mechanism for raising and lowering one of the tanks 217, through a shaft 223. The lower is connected to a shaft 214 for operating one set of caps 184. The drums 300 are fixed to these shafts respectively. Cooperating with each drum 300 are a pair of driving members 301, 302 on the hubs of which are fixed respectively a pair of sprocket wheels 303 and 304, these hubs being loosely mounted on the shaft to which the drum 300 is fixed. By means hereinafter described, the sprocket wheels 303 and 304 are constantly driven in opposite directions, so that by operatively connecting the drum 300 with one or the other of the members 301, 302, the shaft on which the drum is mounted may be driven in either direction as desired. As shown in Figure 30, the drum 300 contains therein a radially slidable bolt 305 pressed outwardly as by a spring 306. The bolt 305 is provided with an extension 307 having teeth cut therein to mesh with a gear segment 308 which is a part of a trigger 309 loosely mounted on a pin 310 within the drum 300. As long as the trigger 309 is held in the position shown in Figure 30, the bolt 305 is held in its retracted position clear of the rotating disk 301. If the trigger 309 is released, the spring 306 is free to push the bolt 305 outwardly so as to engage any one of a number of notches 311 in the flange of the driving member 301 which projects over the bolt 305. Any desired number of notches 311 may be provided, four being employed in the members shown in Figure 30. When the bolt 305 engages in a notch 311, the drum 300 is thus positively connected to the constantly moving sprocket wheel 303 and is driven thereby until the trigger 309 is rocked in a clockwise direction to retract the bolt 305 from the notch and thus to disconnect the drum 300 from the driving member 301. A similar bolt and trigger is provided for engagement with the oppositely rotating disk 302, the trigger being rocked in the opposite direction from the trigger 309 in order to permit its bolt to engage in a notch 311 of the flange on the driving member 302.

The two triggers 309 in the drum 300 are both mounted on the same pin 310 in such a way that a locking slide 313 may be interposed between them. This slide is provided with a pair of internal springs 314 and 315 which tend to keep it centered, in which position one end of the slide is in engagement with one trigger 309, while the other end of the slide is engaged with the other trigger 309. Thus both triggers are held in neutral position by the slide 313 when the clutch is disconnected. In order to throw in the clutch so as to operate the drum 300 in one direction or the other, the slide 313 may be moved in one direction or the other to clear one of the triggers 309, as shown in Figures 31 and 32. By this motion the opposite end of the slide is retained in engagement with the other trigger 309 so that only one trigger can be released at a time. In order to throw out the clutch, a trip stop 316 is provided, this member having a pair of lugs 317 adapted to be moved alternatively into the path of one or the other of the triggers 309. In order to move the slide 313 in one direction or the other from its central position for the purpose of throwing in the clutch, a lug 318 is provided, this lug being between a pair of pins 319 and 320 carried by the slide 313, so that by moving the lug 318 in one direction or the other, as shown in Figure 32, it will engage the pin 319 or 320 and move the slide 313 so as to clear one or the other of the triggers 309. The lug 318 may be carried on a rack 321, this rack being in mesh with a gear segment 322 rockably mounted on a shaft 323, on which is also mounted a flipper 324 which swings in a recess 325 formed in the trip stop 316, so that when the lug 318 is moved to one side or the other to release one of the triggers 309, this motion is accompanied by a sufficient rotation of the gear segment 322 and the flipper 324 to center the trip stop 316, as shown in Figures 31, 32, both lugs 317 of the trip stop being clear of their respective triggers when the trip stop is in its centered position.

The motion of the lug 318 to throw the clutch into engagement may be brought about by any suitable mechanism. As shown the rack 321 which carries the lug 318 may be connected to a rocker 326. This rocker is pivotally mounted as at 327 on a reciprocating rod 328, the rocker being provided with a pair of arms 329 which extend at right angles to the direction of the reciprocating motion. The reciprocating bar 328, as shown in Figure 33, is connected to an eccentric strap 330 mounted on the hub carrying the sprocket wheel 304. Thus the constant rotation of the sprocket wheel 304 is accompanied by the constant reciprocation of the bar 328. In the path of motion of the two arms 329 are a pair of dogs 331, each dog being controlled by a suitable solenoid 332. Each dog is formed with a recess 333 normally in the path of the adjacent arm 329 so that as the arm reciprocates it enters the recess 333, but does not contact with the dog 331. The lower portion of the dog projects forwardly, as at 334, so that if one of the dogs be raised to bring the projection 334 into the path of one of the arms 329, as shown in Figure 32, the reciprocation of the rocker 326 causes the rocker to rock on its pivot 327 and thus to move the lug 318 to the right or left, according to which dog 331 is raised by its solenoid. Thus the clutch may be thrown into engagement for rotation in one direction or the other by energization of one or the other of the two solenoids associated therewith.

As it is desirable to stop each clutch after it has operated to move the apparatus to which it is connected through a given distance, control mechanism is provided for shifting the trip stop 316 at the proper times. To this end the driven shaft which is connected with the drum 300 is provided with a threaded portion on which is mounted a travelling nut connected to a control bar. By way of example, a control bar for stopping the operation of the treating tank mechanism is illustrated in Figures 29, 32 and 33. On a threaded portion of the shaft 223 is mounted a travelling nut 335 from which extends a control bar 336. This bar carries on its upper edge a number of upwardly extending projections which may be in the form of rollers 337, and projecting below its lower edge a number of pawls 338. The function of the upper projection 337 is to operate a switch member 339 which closes a circuit through a pair of contacts 340 for a purpose hereinafter set forth. The pawls 338 are adapted to engage the trip stop 316 at the proper times and to shift it so as to move one of the lugs 317 into the path of the released trigger 309, thus rocking the trigger 309 when the latter comes into contact with it so as to throw out the clutch and stop the rotation of the drum 300.

A suitable block 341 of hardened steel is attached to the trip stop 316, this block being so arranged that its ends are in the path of motion of the pawls 338. The bottom face of the trip stop 316 is provided with a row of three conical recesses 342 adapted to receive a conical upper end of a spring-pressed anchor pin 343. When the clutch is operating, the pin 343 is engaged in the middle one of the three recesses 342 and thus yieldingly holds the trip stop 316 in its neutral position.

When the clutch is operating, the driven shaft 223 is being rotated so that the nut 335 travels along the shaft. This results in the ultimate arrival of one of the pawls 338 in contact with the end of the block 341. Engagement of the pawl with the end of the block is assured by a pin 344 which extends down through the bar 336 and may be moved downwardly by contact with the under surface of a cover member 345 over a portion of the bar. In the case of the treating tank, it is desired to raise the tank in two stages and to lower it in one stage, the first rise being to bring the bottom of the tank up to the lower dam 238 for the purpose of permitting the tank to fill up to the crest 243. After an interval for filling has been allowed, the tank is thereupon raised to its uppermost position. To this end the two pawls 338$^a$, 338$^b$ are provided to stop the upward motion at successive points. The pawl 338$^b$ shown in Figure 35 is located so as to stop the tank after it has risen the first three inches of its upward travel. In order to render this pawl inoperative after it has accomplished the first stopping of the tank, a sloping cam surface 346 is provided on which the lower edge of the pawls 338 may ride.

When, for example, the pawl 338$^b$ engages the cam surface 346, it rides up on it until the edge of the pawl clears the upper edge of the block 341 which it has been pushing. The parts are arranged so that this takes place when the trip stop 316 has been moved so as to interpose one of its lugs 317 into the path of the corresponding trigger. The completion of the revolution of the clutch to bring the trigger into engagement with the lug moves the pawl 338b further up the cam surface 346 so as to be entirely clear of the block 341, as shown in Figure 35. This leaves the trip stop free to be moved again to release its clutch. A spring-pressed pin 343 with a conical upper end may be arranged to enter shallow recesses in the bottom of the trip stop 316, as shown in Figure 35, to hold the trip stop yieldingly in any one of its three operating positions, until the trip stop is positively pushed into another of its positions. When the clutch is again operated for the second stage of tank rise, the action continues until the pawl 338a moves the trip stop 316 to throw out the clutch again.

During the downward movement of the tank, the bar 336 moves toward the right as in Figure 35 and the middle pawl 333b rides over the block 341 without catching thereon, so that the downward movement is uninterrupted until the pawl 338c stops the clutch when the tank is in its lowermost position. As it is not desirable to close the switch 339 during the downward movement of the tank until it reaches its lowermost position, the intermediate switch-operating member may be in the form of a pivoted latch 347 instead of a roller 337. A fixed block 348 is provided to engage the lower end of the latch 347 when the bar 336 is moved toward the left as in Figure 34. This motion toward the left occurs when a tank is rising, and since the tank is stopped at an intermediate point of its rise, it is desirable to close the switch 339 at that point. This is accomplished by engagement of the upper end of the latch 347 with the contact member 339 which causes the latter to rise and thus to close the switch. On the reverse travel of the bar 336 toward the right, however, the latch 347 is rocked so as to pass under and clear of the switch 339 so that it is not closed until engaged by the left hand roller 337 when the tank reaches its lowermost position.

Since each portion of the apparatus which is driven through the automatic clutches has a type of motion peculiar to itself, control bars for stopping the respective clutches are provided accordingly with individual arrangements of rollers 337 and pawls 338. Figure 39 illustrates a control bar for the clutch through which the caps 184 are driven. Since these caps are simply moved to open or shut position in one operation, a pair of opposed pawls are provided, suitably spaced apart, together with corresponding rollers 337 to operate the switch 339 at the proper times.

In like manner the clutch for the carrier fingers may be stopped by a control bar such as is illustrated in Figure 40. Figure 41 illustrates the control bar for the clutches operating the carrier transfer. The arrangement of the pawls 338 on this bar is such as to cause the transfer to advance the carriers a short distance to a position in which they are ready to grasp spools on the treating tank conveyer 101. Thereafter the carrier transfer mechanism is operated to move the carriers with the spools over to the suction heads where the carrier fingers release the spools. The transfer is then operated in the reverse direction to restore the carriers to their normal position out of the way of the caps and tank.

*Driving connections*

As illustrated in Figures 1 and 22, the entire mechanism may be driven from a single prime mover such as an electric motor 350. As shown, this motor may be connected as by a sprocket wheel 351 to a larger sprocket wheel 352 by a chain 353. Mounted on a common shaft with the sprocket wheel 352 is a smaller wheel 354 which is connected by a chain 355 to a larger sprocket wheel 356. Fixed to a common shaft with the sprocket wheel 356 are a pair of sprocket wheels 357 and 358, these being spaced axially of the shaft on which they are mounted. A constantly driven chain 360 meshes with the sprocket wheel 357, this chain leading about an idle wheel 361 adjacent to the wheel 357 and upwardly over one of a pair of idle wheels 362. In like manner a second constantly driven chain 363 meshes with the sprocket wheel 358 and passes around an idle wheel 364, leading thence upwardly to the other of the pair of idle wheels 362. It is evident from Figure 1 that the driven chains 360 and 363 travel in opposite directions over their respective idle wheels 362. These two chains both follow a parallel zig zag path carrying them successively over each of the twelve pairs of sprocket wheels 303, 304 which turn loosely on the various shafts through which the mechanisms for raising the tanks, operating the transfers, etc., are operated. In conjunction with the sprocket wheels 303 and 304 for the various clutches, a pair of idle wheels 365 may be provided in the upper portion of the mechanism, a second pair of idle wheels 366 being mounted at the lower portion of the mechanism to give proper leads to the driven chains 360 and 363. From the idle wheels 366, these chains lead back respectively to the driving sprocket wheels 357 and 358, so that each pair of clutch sprocket wheels 303 and 304 are constantly driven in opposite directions as long as the motor 350 is operated.

The three spool conveyers are necessarily driven intermittently, the conveyers being stationary during most of the period of treatment of the spools, and operating only when the treatment of one or another set of spools has been completed. For the operation of the treating tank conveyer 101, a sprocket wheel 367 is fixed on a shaft which carries the sprocket wheel 356 and is connected as by a chain 368 with a sprocket wheel 369 which is fixed on a constantly rotating shaft 370. A sprocket wheel 371 is fixed on the shaft 370 and is connected by a chain 372 with a sprocket wheel 373 which is loosely mounted on a shaft 374. Fixed on the shaft 374 is a sprocket wheel 375 which is connected by a chain 376 to a sprocket wheel 377, the latter being mounted on a shaft 378. The shaft 374 carries a clutch, indicated as 380 in Figure 67, for connecting the shaft operatively with the driving wheel 373. The treating tank conveyer 101, as shown in Figure 67, passes about a pair of sprocket wheels 381 mounted on the shaft 378 together with the sprocket wheel 377 so that the treating tank conveyer chains are driven thereby. As these chains are of considerable length, a second driving point is provided, a pair of sprocket wheels 382 being mounted on the shaft 374 for this purpose.

The drier conveyer chains 151, as indicated in Figure 1, are led back and forth over a series of sprocket wheels 383, these sprocket wheels being mounted in pairs on suitable shafts, on one or more of which is also mounted a driving sprocket wheel connected by a chain 384 with a sprocket wheel 385 loosely mounted on the shaft 370. A clutch 386 is provided by which the drier conveyer may be operatively connected with the shaft 370, this clutch being of the same general type as those for controlling the other two conveyers.

Control of conveyer operation

As shown in Figure 67, the conveyer chains 101 for the treating tank mechanism pass over a series of idle sprocket wheels 387 by which the chains are led in three horizontal stretches opposite the successive rows of suction heads for the three treating tanks, thence downwardly past the driving sprocket wheel 382 and around an idle sprocket wheel 388 which forms a horizontal stretch opposite a portion of the drier conveyer chains 151 for the transfer of spools from the treating tank conveyer to the drier conveyer. Thence the treating tank chains 101 return to the opposite end of the mechanism where they are brought into proximity with a portion of the spinning machine conveyer 100 so as to receive the next set or batch of spools for treatment. The clutches for starting the operation of the treating tank conveyer 101, the drier conveyer 151 and the spinning machine conveyer 100 are started respectively by energization of solenoids 400, 401 and 402. When the entire apparatus is in operation, the three conveyers are at rest most of the time. When any one of the three sets of spools which are being treated completes its course of treatment, the various spool handling mechanisms are automatically operated to transfer the spools from the suction heads to the opposing pins on the treating tank conveyer chains 101. When the carrier fingers 157, 158 have released the spools so as to leave them on pins of the treating tank conveyer 101, a corresponding solenoid 403 (Figure 67) is automatically operated in a manner hereinafter described through the operation of a timing wheel operating in conjunction with a distributor wheel conventionally indicated at 404. Similar wheels 405 and 406 are provided for the others of the three treating tanks. Taking the lower tank by way of example, automatic energization of the solenoid 403 through the distributor wheel 404 closes a switch 407. This results in the energization of the solenoid 400, as is evident from Figure 67, so that the treating tank conveyer clutch 380 is thrown into engagement to drive the treating tank conveyer. The circuit through the solenoid 403 and the distributor wheel 404 also includes a switch 410 which is illustrated in detail in Figures 68, 69. As therein shown, the switch comprises a number of metal pieces 411 set in a wheel 412 of insulating material. As shown, four such metal contact pieces 411 are illustrated, these being arranged in diametrically opposed and connected pairs. The contact pieces 411 are adapted to come into contact with a pair of brushes 413 in order to complete the circuit through the distributor wheel 404 and the corresponding solenoid 403. Mounted on the wheel 412 is a ratchet wheel having teeth 414, there being three times as many teeth as there are contact pieces 411. Adjacent to the wheel 412 is an arm 415 pivoted as at 416. This arm carries a pawl 417 adapted to engage successively the teeth 414 of the ratchet wheel. A suitable detent 418 is provided to prevent reverse rotation of the wheel 412.

The arm 415 is located with reference to the path of spools on the treating tank conveyer chains 101 so that the ends of the successive spools ride against the arm and press it inwardly toward the wheel 412 for a sufficient distance to catch on the next successive tooth 414 of the ratchet wheel. The arm 415 is of such a length that before one spool leaves it, the next spool has come into engagement therewith so that when a train of spools passes the switch, the arm 415 is swung back by the first spool of the train and is not allowed to resume its normal position until the last spool of the train has passed. At this moment, the movement of the arm back to its normal position rotates the wheel 412 through an angle corresponding to one of the teeth 414. It is apparent from Figure 68 that the switch will be closed after the passage of each third set of spools thereby. As shown in Figure 67, one of these automatic switches is placed adjacent to each of the stretches of the conveyer chains 101 which are opposite the respective sets of suction heads. These switches control the stopping of the spools at the right set of suction heads, this set being the one which has just been vacated by a set of spools the treatment of which has been completed. When the solenoid 403 is energized so as to start the conveyer 101 in operation, the corresponding switch 410 must be closed at that time, the wheel 412 thus being in the position illustrated in Figure 68. When the set of freshly wound spools to be treated is transferred from the spinning machine conveyer to the treating tank conveyer, this set of spools in passing the lower switch 410, moves the arm 415 to the position shown in Figure 68. Thus the switch remains closed during the passage of the spools thereby, but just as soon as the last spool leaves the arm 415 the switch immediately opens, breaking the circuit through the corresponding solenoid 403 and thus causing the corresponding switch 407 to open, with the result that the solenoid 400 is deenergized, causing the clutch 380 to be disengaged when it completes its revolution. The completion of the final revolution is sufficient to move the spool carrying pins into positions directly opposite the suction heads of the lowest treating tank. The spools are now ready to be transferred to these suction heads for treatment.

Since there are three times as many teeth 414 as there are contact pieces 411 on the wheel 412, it is evident from Figure 68 that the next successive batch of spools conveyed from the spinning machine will rotate the wheel 412 another notch, but will not connect the contact brushes 413. The following set of spools will turn the wheel 412 another notch so as to bring a pair of contact pieces 411 into engagement with the brushes 413. At that time, however, the circuit through these brushes is open in the distributor wheel 404 so that the spools are permitted to continue until a higher treating tank is reached. The action of the automatic switches 410 for the other two tanks is identical with that described for the lowest tank.

Shortly after the treating tank conveyer is started for the transfer of spools, the drier conveyer 151 is started so as to be ready to receive the treated spools from the treating tank conveyer. To this end the solenoid 401 is energized by the operation of a suitable switch 420, the structure of this switch being illustrated in Figures 70 and 71. This switch comprises a pair of contact brushes 421 between which slides a plunger having a metal segment 422 set between a pair of fiber segments 423. A suitable spring 424 is provided to press the plunger into a position wherein one of the insulating segments 423 is in contact with the brushes 421. An arm 425 is connected to the plunger, this arm being pivoted at 426 and being engageable by the end of the spools travelling from the treating tanks on the treating tank conveyer chains 101. The action of the spools is to press the plunger against the spring 424 so as to hold the metal piece 422 in engagement with the brushes 421 and thus to close a circuit through the solenoid 401. The spools which have completed their treatment and are being carried away from the treating tank, thus operate the switch 420 to start the drier conveyer and to keep it in motion as long as the spools are passing the switch. When the last spool has passed the switch, the solenoid 401 is deenergized, permitting the clutch 386 to be disengaged when it completes its revolution, this being sufficient to finish the transfer of the last of the spools to the drier conveyer and the movement of the last spool into the drier itself which is adjacent to the transfer mechanism.

The mechanism shown in the drawings for starting the spinning machine conveyer 100 is not automatic, but must be started by hand, this provision being for the purpose of preventing premature starting of the spinning machine conveyer before the spools have been transferred manually from the spinning machine itself to the spinning machine conveyer. The apparatus illustrated is operated in conjunction with a spinning machine which is designed to be attended by a pair of operators, each operator working on a side of the machine opposite to the other. As the thread body on each spool is completed on the machine, the thread is broken and the other end is transferred to a fresh spool, the filled spool being removed manually from the spindle and placed on an adjacent pin of the conveyer 100. The circuit for energizing the solenoid 402, by which the clutch 105 is started, therefore includes a pair of finger buttons 430, 431. This circuit also includes a commutator 432 which is mounted on the shaft 104 which also carries the clutch 105. In order to notify the spinning machine operators that the treatment of a set of spools has been completed and that the treating tank conveyer chains 101 are in motion and ready to receive a fresh set of spools to be treated, a suitable signal 433, such as a bell, horn or lamp is provided, this signal being in a shunt circuit controlled by the drier clutch switch 420 so that when this clutch is closed in order to start the drier conveyer, the signal 433 is actuated. The circuit through the signal 433 likewise includes an automatic switch 434 which is similar in structure to the switch 420, but is provided with two pairs of contact brushes which are alternatively connected by a connecting piece which is movable by contact of spools on the spinning machine conveyor 100 with the arm of the switch. The switch is normally in a position to close the circuit through the signal 433. When the spools from the spinning machine reach the switch 434, it is moved by them so as to break the signal circuit and to close a circuit through the solenoid 402 which cuts out the finger buttons 430 and 431 and the commutator 432.

Thus it is necessary for the operators to hold the manual switches 430 and 431 closed only until the first spool of the series reaches the switch 434. This keeps the spinning machine conveyer 100 moving as long as the spools are passing the switch. It is necessary to continue the operation of the conveyer 100 for an additional period to effect the transfer of the last spool of the series to the treating tank conveyer. A switch 435 is, therefore, shunted around the switch 434 to keep the solenoid 402 energized after the switch 434 opens. As shown in Figure 67, the switch 435 is operated by the spools and is adjacent to the conveyer 101 at a convenient point between the transfer mechanism from the conveyer 100 and the lowest treating tank. This ensures the operation of the transfer mechanism until after the last spool of a series has been transferred to the conveyer 101 and has moved clear of the transfer mechanism.

The purpose of the commutator 432 is to ensure the starting of the spinning machine conveyer at the proper moment to bring the first spool of a series to the transfer mechanism at the right moment to be transferred to a pin of the treating tank conveyer 101 which is capable of stopping opposite the end suction head of any one of the three series. The necessity for such a commutator in the construction illustrated arises from the fact that the treating tank conveyer clutch 380 is geared to the conveyer in such a way that one revolution of the clutch results in the movement of three pins past a given point so that only every third pin is capable of stopping opposite the end suction head of each series. The spinning machine conveyer clutch 105 is geared to its conveyer in such a way that a single revolution of this clutch results in the passage of six pins past a given point. The spinning machine conveyer must thus be synchronized with the treating tank conveyer in such a way that the first spool of a series is deposited on a suitable pin capable of stopping opposite the end suction head of a series. Since the spinning machine conveyer moves a distance of six pins for one revolution of its clutch, while the treating tank conveyer moves three pins for each revolution of its clutch, there are two possible starting positions for the spinning machine clutch to synchronize with the treating tank conveyer. These positions are represented by the two contact elements on the commutator 432.

*Control circuits*

The apparatus as a whole may be controlled by a number of electrical circuits such as are illustrated in Figure 72. The mechanism associated with each treating tank is provided with a set of controls which are, for the most part, distinct from the controls provided for the other two tanks and their associated mechanisms. The control wiring for the several tanks is separated in Figure 72 by partition lines. Since the corresponding circuits for the various tanks are identical, those for one of the tanks only are illustrated in Figure 72, the circuits in the control apparatus of the other two tanks being indicated by the leading-in wires from the supply wires common to the three.

There are seven principal circuits which are employed in controlling the apparatus associated with each of the treating tanks. The first circuit may be termed the "clutch circuit", this circuit being employed for the energization of the solenoids which start the operation of the four automatic clutches through which the tank is raised and lowered, the carrier fingers are operated, the carriers are transferred toward and from the suction heads, and the caps are raised and lowered, as hereinbefore described. This circuit also controls the starting of the treating tank conveyer through which the spinning machine conveyer and the driver conveyer are operated. Referring to Figure 72, the clutch circuit may be traced from the positive lead-in wire through the four clutch switches 339, in succession, to a brush 442 carried by a rotatable timing wheel 441, hereinafter described in detail. The contact brush 442 is moved successively into contact with a number of contact elements mounted on the fixed distributor wheel 404 as the wheel 441 rotates. Each contact element on the fixed wheel is connected to a corresponding solenoid 332. From these solenoids the circuit leads to a series of switches 443, 444, 445, thence to a normally closed safety switch 446, and from this switch to the negative lead-in wire.

The second circuit may be termed the "relay circuit." This circuit extends from the positive terminal through the four clutch operated switches 339, thence to a relay solenoid 447, and thence through the three switches 443, 444 and 445, and the safety switch 446 to the negative terminal.

The third circuit may be termed the "first safety circuit", this being one of two safety circuits which serve to prevent injury to the apparatus by causing the electrical controlling circuits to become inoperative in case of the failure of any portion of the apparatus to operate satisfactorily. This circuit extends from the positive terminal through the four clutch operated switches 339, a switch 450 controlled by the solenoid 403, a safety solenoid 451, and the safety switch 446 back to the negative terminal. Cooperating with this circuit is a "second safety circuit" which extends from the positive terminal directly to a second safety solenoid 452 and thence to a brush 453 on the timing wheel 441. Adjacent to the brush 453 is another brush 454 which is connected through a safety switch 446 to the negative terminal. Thus the second safety circuit is closed whenever the brushes 453 and 454 are connected. This is accomplished by any one of a series of contact pieces 455 mounted on the distributor wheel 404. These contact pieces, as shown in Figure 81, are arranged on the same radii of the distributor wheel as the contact pieces engaged by the brush 442, so that whenever the brush 442 engages a contact on the distributor wheel the brushes 453 and 454 are at the same moment electrically connected so as to close the second safety circuit.

The fifth circuit may be termed the "drop-rod circuit", this circuit being for the purpose of raising a drop-rod 456 through the energization of a solenoid 457. This circuit extends from the positive terminal directly to the solenoid 457, thence to a switch 458, the safety switch 446, and the negative terminal.

The sixth circuit may be termed the "conveyer circuit". This extends from the positive terminal to the solenoid 400 by which the treating tank conveyer is started in operation, thence to the switch 407, the safety switch 446, and the negative terminal.

The seventh circuit may be termed the "delay circuit," the purpose of this circuit being hereinafter explained in detail. This circuit extends from the positive terminal directly to a solenoid 460, thence to a contact member 461 which is the only one of the contact members 455 thus connected, thence through the brush 454 to the safety switch 446 and the negative terminal. These several circuits are referred to hereinafter by name in describing the operation of the control mechanism as a whole.

*Timing wheel and distributor*

As indicated in Figure 67, there is a distributor wheel provided for each of the three tanks. These wheels may be mounted loosely on a common shaft 465 and held against rotation by any convenient means such as a link 466 secured at one end to the periphery of the wheel and at the other end to a fixed portion of the frame. Each distributor wheel has a timing wheel 441 associated therewith. Since the action of each distributor and its timing wheel is identical with that of the others, one such distributor with its timing wheel and other associated mechanism will be described as representative of the three similar systems.

Referring to Figures 77 to 81, the timing wheel 441 may be driven by either of two different agencies. These include an arm 470 fixed on the shaft 465 to revolve therewith. The timing wheel 441 is loosely mounted on the shaft 465 and is provided with a pin 471 projecting into the path of the arm 470 so that the arm 470 as it revolves with the shaft 465 carries with it the timing wheel 441, unless the wheel has been pushed ahead of the arm as happens during certain portions of the cycle of operation. When the arm 470 catches up with the pin 471, timed rotation of the wheel 441 is resumed. An arm 470 is provided for each of the three timing wheels 441. These arms are revolved together with the shaft 465 which, in turn, is revolved by a pawl 472 which engages successive teeth cut in the periphery of a ring 473 fixed to a wheel 474 which is mounted on the shaft 465. The rim of the wheel 474 is provided with an outer face on which a separate ring 475 is loosely mounted so as to be capable of slipping on the wheel 474. The pawl 472 is of sufficient width to engage the rings 473 and 475 simultaneously. The teeth in each of these rings are preferably three hundred sixty in number, the notches between them being of equal depth, except that each thirtieth notch is deeper than the others. The tooth-engaging end of the pawl 472 may be stepped, one edge portion 476 extending beyond the other edge portion 477. The portion 476 engages the teeth of the slidable ring 475 and usually holds the portion 477 clear of the ring 473. At each thirtieth tooth in the ring 475, where the notch is deeper, the edge 476 falls further toward the axis of the wheel by a sufficient distance to permit the edge 477 to engage a tooth of the ring 473. In the apparatus illustrated, the pawl 472 may be reciprocated regularly once every second, so that while the loose ring 475 is advanced one tooth every second, the ring 473, and hence the wheel 474, is advanced only every thirtieth second or half-minute. By this means slow motion of the timing wheels 41 is avoided, these wheels being abruptly advanced every thirty seconds, so that while the total period for a revolution of a timing wheel is three hours, the electrical contacts are made and broken with sufficient speed to avoid excessive sparking, and the moments of making and breaking of circuits through the timing wheels are not dependent on precise accuracy of their angular positions.

The pawl 472 may be driven by an electric motor 480 which is connected by a shaft to a friction wheel 481, the periphery of which engages the face of a disk 482 mounted on a vertical shaft 483. This shaft is connected by suitable means, such as a worm and gear, to a horizontal shaft 484 on which are mounted a pair of eccentrics 485. On these eccentrics respectively are a pair of eccentric straps 486, one of which carries the pawl 472, the other carrying a pawl 487 for the purpose of operating the delay mechanism hereinafter described. The pawls 472 and 487 are thus side by side and are simultaneously operated. The pawl 487 may be provided with a suitable lug 488 which bears on the pawl 472. This is adapted to restrict the pawl 487 to an operative stroke every thirty seconds when released for operation.

The motor 480 and friction wheel 481, together with the shaft connecting them, may be mounted on a carriage 489 which is adjustably slidable on the frame to move the wheel 481 radially on the face of the disk 482. For such adjusting movement a screw 489$^a$, rotatable by a convenient hand wheel 489$^b$, may be provided as shown. The speed of the motor 480 being constant, the rate of rotation of the disk 482 may be determined by adjustment of the friction wheel 481, so that the period of reciprocation of the pawl 472 and hence the period of rotation of the wheel 474 may be varied within wide limits. In the apparatus as described, the wheel 481 is set to give the wheel 474 a period of three hours, this being the time estimated as necessary for the required treatments. This period can, however, be considerably changed, if more or less time is required for the complete treatment of a batch of thread bodies, by simply turning the hand wheel 489$^b$.

The second agency for rotating the timing wheel 441 is the drop rod 456 which engages the serrated periphery of the wheel 441 by means of a suitable spring-pressed pawl 490. A separate drop rod is provided for each of the three timing wheels, but all three timing wheels are also driven from a common shaft 465. The structure of the lower portion of the drop rod 456 is illustrated in Figure 80. This rod is made of sufficient weight to be capable of turning the timing wheel 441 against whatever resistance, frictional or otherwise, the wheel may be subject to.

In order to prevent an overthrow of the wheel 441, a suitable dash-pot 491 may be provided whereby a drop rod descends slowly when released by deenergization of the solenoid 457. To prevent rearward rotation of the wheel when the rod 456 and pawl 490 are raised, a spring-pressed detent 492 may be mounted on a bracket 493. This bracket also guides the lower end of the rod 456 and limits its downward movement by acting as a stop engageable by a collar 495 fixed on the rod 456. During a certain portion of the cycle of operations, it is desirable that the drop rod rotate the timing wheel through an angle equivalent to six teeth. To this end the distance of descent of the drop rod is adjusted accordingly by means of the collar 495. At other times, however, it is desirable that the drop rod in its descent move the wheel 441 through an arc equivalent to a single tooth.

To accomplish this result an arcuate cam element 496 is mounted on the timing wheel 441. This cam is adapted to move into engagement with a spacing member 497 which may be pivotally supported from the bracket 493, and which has an outer face substantially parallel to the path of the pawl 490. As is evident from Figure 80, when the spacing member 497 rides on the cam 496, its outer face is held slightly outward beyond the tips of the teeth of the wheel 441 so that the pawl 490 during its descent rides on the member 497 and is held clear of the teeth of the wheel 441 until it nearly reaches its lowermost position, whereupon it slides off the lower end of the member 497 and is permitted to engage the wheel 441 to rotate it through an arc represented by one tooth. When the spacing member 497 is not supported by the cam 496, it is free to swing inwardly toward the axis of the wheel and permit the pawl 490 to engage the wheel early in its descent so as to move the wheel through a distance of six teeth or any other distance to which the stroke of the drop rod may be adjusted. It is during the period of operation in which the timing wheel is advanced six teeth at a time in quick succession that the timing wheel gets considerably ahead of the driving arm 470, this portion of the cycle of operations involving the removal of a set of treated spools from the suction heads and their replacement by a set of spools to be treated.

The distributor wheel illustrated in Figure 81 is held against rotation by a suitable link 466. This wheel is identical in structure with two other wheels for the other tanks. Mounted on the rim of the wheel is a series of inner contacts 455, all of which have the identical function of electrically connecting the brushes 453 and 454 of the timing wheel when the latter are moved into contact therewith. One of these contacts, indicated as 461, also has an additional function in connection with the delay apparatus hereinafter described. These contacts, as shown in Figures 78 and 79, may be copper plates clamped in such a way as to present an edge to the brushes of the timing wheel. These edges are arranged radially with respect to the distributor and on the same radii are mounted contact elements to be engaged by the brush 442 of the timing wheel 441. Each of these latter contacts is electrically connected with one or another of the various solenoids 332 by which the automatic clutches for operating the tanks and associated mechanism are started.

Referring to Figure 81, the contact elements through which the clutch for lowering the treating tank is started are indicated as 500. The contact elements for raising the tank through two successive stages are indicated as 501 and 502. Since the lowering of the tank in one stage and the subsequent raising of the tank in two stages follows the first nine of the ten baths in an identical manner, these reference characters are employed for this set of contact elements following the first nine baths. 503 represents the contact element for lowering the tank. 504 is the element for raising the caps. 505 is the element for moving the carrier transfer inwardly part way toward the suction heads. 506 is the element for moving the carrier transfer inwardly the rest of the distance to move the carriers into position to lift the spools from the suction heads. 507 controls the raising of the carrier fingers to lift the spools. 508 controls the outward motion of the carriers with the spools thereon. 509 controls the operation of the fingers to release the spools when on the pins of the conveyor 101. 510 controls the retraction of the carriers to clear the spools. 511 starts the treating tank conveyer to transport the treated spools to the drier and to replace them with a fresh batch from the spinning machine. The cycle of operations on the fresh batch of spools begins when the element 512 moves the carrier transfer inwardly a couple of inches so as to enable the carrier fingers to engage the spools for removal from the conveyer. 513 moves the carrier fingers to lift the spools from the conveyer pins. 514 moves the carrier transfer inwardly with the spools to the suction heads. 515 actuates the carrier fingers to release the spools when the latter are on the suction heads, and 516 and 517 move the carrier transfer back through two stages. 518 swings the caps down to engage the outer ends of the spools on the suction heads. 519 raises the tank its first stage for the first of the ten baths. 520 raises the tank through its second stage. After each bath except the last, a set of three contacts 500, 501 and 502 operate to lower the tank for discharge of the bath liquid, followed by a raising of the tank through two successive stages as it is being filled with the liquid for the next succeeding bath.

The details of structure of the outer contacts, such as 500 and the inner contacts 455 are illustrated in Figures 78 and 79. Each pair of contacts on a common radius may be riveted or otherwise secured to a suitable support bracket 521 from which it is insulated by a suitable lining 522. The bracket 521 is provided with a pawl 523 which carries a nut 524 by which it is clamped to the rim of the distributor wheel 404. Concentric with the rim of the wheel are a pair of rings 525 and 526. These rings and the brackets 521 act as supports to keep the structure in place. By loosening any of the nuts 524, it is obvious that the brackets 521 may be adjusted to any desired points of the periphery of the wheel. As a single bolt 523 is sufficient to hold a bracket in place, the bolts for the several brackets are arranged to project in alternation through the two circular slots between the rim of the wheel 404, the ring 525 and the ring 526. On one of the spokes of the timing wheel 441, adjacent to its periphery, the three brushes 442, 453 and 454 are mounted. Each brush may comprise a contact element 530, the face of which is flush with the rounded insulating member 531 so that it does not come into engagement with a contact element on the distributor until it is substantially in line therewith. The element 530 is yieldingly mounted as by a pair of springs 532 to allow for any irregularities of adjustment of the elements 500, etc. from the face of the distributor wheel, and to ensure a good contact between the engaging contact elements. The three brushes 442, 453 and 454 may be electrically connected, respectively, to three brushes 533, 534, 535 (Figure 80) which are in contact respectively with slip rings 536, 537 and 538 (Figure 77), these rings being mounted on a sleeve 539 which is loosely carried by the shaft 465 and is held against rotation.

*Delay mechanism*

Between the two successive stages of raising a treating tank as it is being filled with liquid for a bath, it is desirable that there be an interval of a minute and a half or so to permit the bath liquid to fill the tank up to the effective crest of the dam. This interval is obtained for all but the first of the ten baths by suitably spacing each pair of elements 501, 502. Thus when the arrival of the tank at the end of its first rising stage causes the brush 442 to move out of contact with an element 501, the brush is thereafter moved along with its wheel 441, as the latter is pushed a step ahead each half minute by the motor-driven arm 470, until the brush comes into contact with the adjacent element 502 to cause the tank to start its second stage of rise. This mode of operation is available for these baths because, during the period from the second to the tenth bath, the rotation of the timing wheel 441 is almost entirely by the arm 470 and the pin 471 is never more than one step ahead of the arm. At the conclusion of the tenth bath, however, the wheel is jumped ahead six teeth at a time by the drop-rod 456 for each of the operations required for the replacement of the treated spools on the suction heads by fresh spools to be treated, these advances of the timing wheel following each other automatically in succession as the various operations of the caps, carrier transfer, and carrier fingers are completed. By the time the brush 442 has traveled from the element 503 to the element 519, the timing wheel is considerably ahead of the slowly moving arm 470, so that the arm is not available at this time for driving the wheel 441 so as to effect a suitable brief period of delay between the rise of the tank started by contact of the brush 442 with the element 519 and the second rise started by contact with the element 520. Hence, in order to provide for a proper delay interval, when the brush 442 moves from the element 519, it is given a six-tooth stroke so as to move the brush at once into contact with the element 520. As indicated in Figure 72, this element is not directly connected with its corresponding clutch solenoid 332, but is connected therewith through a delay switch 540 which is normally open. As shown, this switch consists of a metal ring set in an axially movable plunger 541, there being three such rings for the three respective tanks. In line with the element 520 is the inner element 461 which, as previously stated, not only connects the brushes 453 and 454, but also closes the delay circuit through the solenoid 460. The energization of this solenoid rocks an arm 542 which is pivotally mounted as at 543 and carries at its outer end a pin 544 normally holding the pawl 487 in inoperative position. When the arm 542 is rocked by the solenoid 460 the pawl 487 is released for operative engagement with a toothed extension 545 of the plunger 541. Actual engagement of the pawl 487 with the teeth of the extension 545 is limited to every thirty seconds by its engagement with the pawl 472 as hereinbefore described. The downward motion of the plunger 541 is against a suitable spring 546 (Figure 73), the opposite end of which bears against a suitable bracket 547 projecting from the frame. A detent 548 is provided to cooperate with the pawl 487 by holding the plunger 541 against upward motion. Thus the energization of the solenoid 460 permits the pawl 487 to move the plunger 541 downwardly the distance of one tooth every thirty seconds. The plunger may be adjusted so that the switch contacts 540 are closed after any suitable interval of time, such, for example, as a minute and a half or two minutes. The closing of the switch 540 closes the circuit through the element 520 and its corresponding clutch solenoid and thus brings about the second stage of the tank rise for the first bath after the desired period of delay. Since the first bath is a cold water wash of an hour's duration, the arm 470 has plenty of time in this interval to catch up with the wheel 441 and to continue its motion, bringing the brush 442 into eventual contact with the element 500 which lowers the tank after the first bath.

*Safety apparatus*

The wiring of the control apparatus is designed to prevent injury to the apparatus through the failure of any portion thereof to function properly.

To this end a number of interacting switches and solenoids are employed, including the safety switch 446. The structure of this switch mechanism is illustrated in Figures 73, 74 and 77. The mechanism comprises a disk 550 of insulating material mounted on a shaft 551. A fixed brush 552 engages a metal band covering the periphery of this disk and connected with a helical element 553 of spring metal. A second disk 554 is carried by a sleeve loosely mounted on the shaft 551, so that the disks 550 and 554 are coaxial and parallel. The periphery of the disk 554 is also of metal and is engaged by a fixed brush 555. The metal periphery is in contact with a plate 556 mounted on a face of the disk 554 and engaged by the free end of the spring member 553 so that a good electrical contact is maintained therebetween. The plate 556 is in the shape of a sector of the disk face. On either side of this plate is a radial depression 557 in the face of the disk so arranged that if the contact end of the spring member 553 moves off the plate 556, in either direction, this end will spring into one of the depressions 557 so as to prevent further relative rotation of the disks 550, 554. The two disks are normally driven alternately step by step, one disk being moved a step ahead whenever an operation starts, the other disk being moved a step ahead whenever an operation stops. The contact plate 556 is of sufficient width to maintain contact between the two disks for two successive positions. If either disk is moved twice without a movement of the other disk between, the end of the spring member 553 moves off the plate 556 and drops into one of the recesses 557. Since all the circuits pass through the safety switch, the breaking of this contact will stop further operation of the apparatus.

The disk 550 is driven through a ratchet wheel 560 which is mounted on the shaft 551 and is engaged by a pawl 561 in such a manner as to rotate the wheel one tooth when the solenoid 451 is deenergized, a suitable weight 562 being provided to ensure proper rotation of the ratchet wheel. In like manner the disk 554 is rotated through a ratchet wheel 563 connected therewith, this ratchet wheel being engaged by a pawl 564 adapted to rotate the wheel a distance of one tooth when the solenoid 452 is energized. In general the starting of any of the automatic clutches controlled by the electrical circuits opens the clutch control circuit and effects the deenergization of the solenoid 451 which rotates the disk 550 one tooth. The completion of the operation of the clutch thus started is accompanied by the energization of the solenoid 452 which moves the disk 554 one tooth ahead to follow up the disk 550. If for any reason the clutch should fail before its function is carried out, and through the motion of the timing wheel a clutch should be engaged for the next successive operation, the disk 550 would thus advance two successive steps without an intermediate advance of the disk 554, thus opening the safety switch and preventing further operation of the automatic mechanism until the trouble is located and the safety switch is manually reset.

The drop rod 456 is released by its solenoid 457 to move the timing wheel brush 442 from contact with each one of the elements mounted on the distributor when the operation started by contact with that element has been completed. The drop rod in its descent moves the brush a distance either of one tooth so as to be out of contact with the element on the distributor or of six teeth so as also to bring it into contact with the next successive element. In order to provide against trouble or injury which might result from a possible failure of the rod 456 to descend properly, the solenoid 457 is not included directly in series with the clutch switch 339, but is controlled indirectly through the relay solenoid 447. As shown in Figures 72 and 77, the relay solenoid 447 controls a plunger 570 which carries the switches 445 and 458, the latter being in series with the drop-rod-actuating solenoid 457. The plunger 570 is capable of three different positions. When in its lowermost position, both the switches 445 and 458 are open. From this position it may be raised by a lever arm 571 to an intermediate position in which the switch 445 is closed but the switch 458 is still open. The plunger is moved to this position by the lever arm 571 when the drop rod 456 drops to its lowermost position, an end of the lever arm 571 engaging in a suitable recess 572 for this purpose. Since the circuit through the solenoid 447 is also through the switch 445, a failure of the drop rod to drop to its lowermost position will result in the failure of the switch 445 to close, so that the relay solenoid 447 and hence the drop rod solenoid 457 cannot thereafter be energized until the trouble is discovered and remedied. In like manner the switches 407 and 450 are carried on a common plunger 573 which is capable of three positions. In its lowermost position the switches 407 and 450 are both open. When raised to its intermediate position, the switch 450 is closed, but the switch 407 remains open. When raised to its upper position by energization of the solenoid 403, both switches are closed.

The mechanism for raising the plunger 573 to its intermediate position is illustrated in Figure 77. A suitable pawl 574 is carried by the plunger 575 which is raised by energization of the safety solenoid 452. This pawl is adapted to engage the lower end of a sleeve 576 loosely mounted on a stem 577 extending downwardly from the plunger 573. The position of the pawl 574 on the plunger 575 is such that when the solenoid 452 is energized so as to raise the pawl, the upward motion of the pawl against the sleeve 576 raises the plunger 573 to its intermediate position wherein the switch 450 is closed and the switch 407 remains open. A stationary latch 578 is mounted opposite the movable pawl 574 to catch under the end of the sleeve 576 and hold the plunger 573 in its intermediate position during the subsequent operations of the solenoid 452. When, in the cycle of operations of the apparatus, the solenoid 403 is energized for the purpose of starting the treating tank conveyer through the solenoid 400, the plunger 573 is drawn to its uppermost position to close the switch 407. This movement raises a collar 580 mounted on the stem 577 a sufficient distance to swing the pawl 574 and latch 578 clear of the lower end of the sleeve 576, permitting the latter to drop. Thus when the solenoid 403 is thereafter deenergized the plunger 573 falls to its lowermost position, opening both the switches 407 and 450. The latter switch is in the first safety circuit and is used to break that circuit for the purpose of deenergizing the solenoid 451 and advancing the plate 566 of the safety switch, so that the next energization of the safety solenoid 452 will result in a movement of the spring contact 553 to follow the movement of the plate 566 of the safety switch. The subsequent energization of the solenoid 452 not only operates the safety switch, but also raises the plunger 573 to its intermediate position, closing the switch 450. This switch thereupon remains closed until the next actuation of the treating tank conveyer to change the spools over the tank associated with this portion of the apparatus.

*Operation of the tank mechanism between successive baths*

Referring to Figures 72 and 81, the action of the switches and solenoids during the operation of a tank between two successive baths may be followed. The baths are arranged to extend over definite periods of time, these periods being determined by the spacing of the contact elements on the distributor wheel 404. As the time required for a complete revolution of the shaft 465, which carries the arms 470, is one hundred eighty minutes, the duration of the baths may be readily determined by the arcuate distance between the contact element 502 which starts the second stage of tank rise for the bath, and the following element 500 which starts the descent of the tank at the end of the bath, each degree of arc representing a half minute of time. During a bath period the brushes of the timing wheel are out of contact with the elements on the distributor. As the brushes are advanced a degree of arc each half minute, they eventually come into contact with one of the elements 500 and a corresponding element 455. Immediately prior to the making of these contacts, the four clutch operated switches 339 are all closed, the safety solenoid 451 is energized so that the switch 443 is closed, the switch 444 is open, and the switch 445 is closed. When the timing wheel brushes move into contact with the elements 500 and 455 respectively, the latter element connects the two brushes 453 and 454, thus closing the second safety circuit and energizing the safety solenoid 452 so as to close the switch 444 and to advance the element 556 of the safety switch 446. The closing of the switch 444 closes the relay circuit, since all the clutch switches 339 are closed, and thus energizes the relay solenoid 447 to close the switch 458, energizing the drop rod solenoid 457 and raising the drop-rod 456. The closing of the switch 444 in conjunction with the contact made by the brush 442 with the element 500 closes the clutch circuit through the solenoid 332 which starts the tank-operating clutch in a direction to lower the tank. When the tank starts to descend, the nut 335 (Figure 29) starts to travel along the threaded shaft 223, whereupon the roller 337 (Figure 34) moves from under the switch 339 and permits the switch to open. This immediately opens the first safety circuit, the relay circuit and the clutch circuit. The opening of the first safety circuit deenergizes the solenoid 451, opening the switch 443 and advancing the element 553 of the safety switch 446. The opening of the relay circuit deenergizes the solenoid 447, opening the switches 445 and 458. The opening of the switch 458 deenergizes the solenoid 457 and permits the rod 456 to drop, turning the timing wheel through an arc equivalent to one tooth, this arc being sufficient to move the brushes of the timing wheel out of contact with the elements 500 and 455. The descent of the rod 456 rocks the lever 471 sufficiently to close the switch 445. In case the rod 456 for any reason fails to descend so as to move the brushes out of contact with the elements 500 and 455, the switch 445 remains open, thus making further operation of the relay circuit or clutch circuit impossible until the trouble is remedied.

Movement of the timing wheel brush 442 from the contact 500 provides an additional break in the clutch circuit. Movement of the brushes 453 and 454 from the element 455 opens the second safety circuit, deenergizing the solenoid 452 and thus opening the switch 444 and operating part of the safety switch 446 to keep in step with previous operations by the first safety solenoid 451. Meanwhile the control bar 336 (Figure 34) is traveling along during the descent of the tank until the pawl 338ᶜ engages the trip stop 316 and stops the clutch 300. At the same time a roller 337 moves under the switch 339 and closes it. This closes the first safety circuit since the three clutch switches 339 and the switch 450 are already closed so that the solenoid 451 is thereupon energized to close the switch 443. At this time the switch 444 is still open so that the clutch circuit and relay circuit remain inactive until the timing wheel is advanced by the arm 470 to move the brushes into contact with the element 501 and its corresponding element 455. The time interval during which the arm 470 moves the timing wheel brushes through a sufficient arc to come into contact with the next elements on the distributor is arranged to be of sufficient duration to permit the contents of the tank to drain therefrom, so that when the brushes move into contact with the element 501 and its corresponding element 455 the tank has been completely drained. As previously described, the connecting of the brushes 453 and 454 by contact with the element 455 closes the second safety circuit, energizing the solenoid 452 to close the switch 444 and to advance the element 556 of the safety switch 446. As the four clutch switches 339 are all closed at this time, as well as the switches 443 and 445, the contact of the brush 442 with the element 501 closes the circuit through the solenoid 332 which starts the clutch for raising the tank.

The switch 444 is so arranged with reference to the safety switch 446 that if the solenoid 452 is operated twice in succession without an intermediate deenergization of the solenoid 451, the second operation of the solenoid 452 will open the safety switch 446 an instant before the switch 444 closes so that the closing of the latter cannot complete a circuit.

The starting of the tank-raising mechanism again results in the movement of the roller 337 from beneath the switch 339 associated with that clutch so that the switch opens, breaking the first safety circuit, the relay circuit and the clutch operating circuit. As previously described the breaking of the relay circuit results in the descent of the drop-rod 456 which moves the timing wheel brushes out of contact with the distributor elements. The upward motion of the tank is stopped at the end of its first stage by the engagement of the pawl 338ᵇ with the trip stop 316, whereby one of the lugs 317 is moved into the path of the released trigger 309. When the trigger reaches the lug it is rocked to retract the bolt 305 and thus to stop the clutch 300. At the same time the switch 339 is closed by engagement of the latch 347 therewith as the tank is halted at the end of its first stage of its rise. The clutch circuit remains inactive in spite of the closing of the switch 339 until the arm 470 moves the brush into contact with the element 502 and its corresponding element 455. The interval afforded by the slow advance of the arm 470 is arranged to be sufficient to permit the partial filling of the tank to the crest 243 of the dam, which is effective at that time.

When the timing wheel brushes reach the contact 502, the tank is again raised by starting the suitable clutch in a manner described, the second stage of the tank rise continuing until it is halted by engagement of the pawl 338ª with the trip stop 316. At this point the spools are entirely immersed in the bath where they remain until the tank is lowered at the termination of the bath. This cycle of operations is the same for all of the sets of elements 500, 501 and 502 engaged by the timing wheel brush 442 between successive baths.

The tenth bath in the cycle hereinbefore described is a two-minute wash in soapy water, this bath being terminated when the brush 442 reaches the element 503 on the distributor wheel and starts the clutch for lowering the tank. As this is the end of the final wash for the spools, the next succeeding steps of operation are slightly different.

*Operation of mechanism for changing spools on suction heads*

When the brush 442 is moved into contact with the element 503 the tank descends as previously described. As it starts its descent, the switch 339 associated with this clutch is opened, thus opening the first safety circuit, the relay circuit, and the clutch circuit. The solenoid 451 is thus deenergized as before, as is also the solenoid 447. The latter causes the switch 458 to open, deenergizing the solenoid 457 as before which allows the drop rod 456 to drop and rotate the timing wheel. At this point the spacing element 497 (Figure 80) is clear of the cam 496 so that when the rod 456 descends the wheel is moved through an arc equivalent to six teeth, which is just sufficient to bring the brush 442 in contact with the element 504. As the brushes 453 and 454 move from one element 455 immediately to the next in this operation, the solenoid 452 is first deenergized and then energized so that the switch 444 is momentarily open and then closed, and the element 556 of the safety switch 446 is advanced so as to be ready for the next subsequent deenergization of the solenoid 451. When the brush 442 is shifted to the element 504, the tank is still moving down and its clutch 339 is open so that the relay circuit and the clutch circuit are both inactive. When the tank is fully lowered, one of the rollers 337 carried by the control bar 336 closes the open clutch switch 339. This closes the first safety circuit, energizing the solenoid 451 and closing the switch 443. As the switches 444 and 445 are already closed, the relay circuit and the clutch circuit are thus closed so that the solenoid 447 is energized, the switch 458 is closed, and the solenoid 447 is energized to raise the rod 456. At the same time, since the brush 442 is now in contact with the element 504, the clutch for operating the caps is started.

As the operation of the caps commences, the switch 339, associated with the clutch, opens, the resulting effects on the circuits being identical with that described in connection with the operation of the tank. This includes the rotation of the wheel by the drop rod so as to shift the brush 442 from the element 504 to the element 505. Thus the operation of the various mechanisms follow each other automatically in order until the element 511 is reached. At this point the movement of the brush 442 into contact with the element 511 results immediately from the opening of the switch 339 associated with the clutch controlling the outward movement of the carrier transfer. As indicated in Figure 7, this element is connected through one of the spool-operated switches 410 with the solenoid 403. In the normal operation of the apparatus, the switch 410, which is connected to the element 511, is closed when the brush 442 reaches this element. Since the brush 442 is always in series with all four clutch switches 339 and the solenoid 403 is in series with the switch 443, which is open when the brush reaches the element 511, the contact of the brush with the element 511 does not close the circuit. The open switch 339 is subsequently closed by the completion of the movement of the carrier transfer which was started while the brush was in contact with the element 510. The closing of the switch 339 closes the first safety circuit and thus energizes the solenoid 451 which closes the switch 443 to complete the closing of the circuit through the solenoid 403. The latter thereupon closes the switch 407 in the conveyer circuit so that the solenoid 400 is energized to start the treating tank conveyer. This circuit through the solenoid 403 remains closed as long as the treating tank conveyer is in operation.

As previously described, the set of incoming spools from the spinning machine operate a ratchet on the switch 410, so that as the last spool passes the switch, the arm swings back to open the switch and thus to break the circuit through the solenoid 403. This results in the opening of the switches 407 and 450. The opening of the former switch deenergizes the solenoid 400 and thus stops the treating tank conveyer. The opening of the switch 450 deenergizes the safety solenoid 451, opening the switch 443 and advancing the element 553 of the safety switch 446. The effect of opening the switch 443 is to break the relay circuit, so that the drop rod is then permitted to descend and to shift the brush 442 from the element 511 to the element 512, whereupon the automatic operation of the various portions of the apparatus in succession is continued in the manner described until the brush 442 is shifted to the element 520, this element being connected to the solenoid 332 for operating the tank clutch to raise the tank through a delay switch 540 (Figures 72 and 73).

Due to the comparatively rapid advance of the timing wheel by the actuation of the drop rod through arcs of six teeth at a time during the automatic operation of the spool transferring mechanism, the timing wheel pin 471 has advanced a considerable distance ahead of the arm 470 by the time the spools are ready for the first bath. As previously described, it is necessary to provide a suitable interval between the two stages of tank rise so as to allow time for the tank to fill to the effective crest of the dam before the spools are immersed therein by the second stage of the tank rise. To this end the delay apparatus is provided as a substitute for the arm 470 which is not available for control of the tank rise for the first bath. Contact of the brush 442 with the element 519 brings about the raising of the tank through the first stage after the spools have been clamped onto the suction heads, in a manner previously described. As the first stage is completed, the opening of the switch 339 on the tank operating clutch releases the drop rod to shift the brush 442 to the element 520. This element is not connected directly to its solenoid 332, but through the delay switch 540 which is normally open. At the same time the brushes 453 and 454 are shifted to the inner element 461 which not only energizes the second safety circuit, but also energizes the delay solenoid 460 which renders the reciprocating pawl 487 operative to move the plunger 541 downwardly one step each half minute until the switch 540 is closed. The delay occasioned by the downward movement of the plunger 541 is sufficient to permit the tank to fill to the desired level before the second stage of tank rise is begun. After the tank rises to its uppermost position to immerse the spools therein, the drop rod descends to move the timing wheel brushes out of contact with the elements 520 and 461. The opening of the delay circuit at the element 461 deenergizes the solenoid 460, so that the detent 548 is retracted and the plunger 541 is moved back to normal position by the spring 546. The timing wheel then remains stationary until the motor driven arm 470 catches up with it and moves it along one degree every half minute until contact is eventually made with the next element 500, whereupon the operations of the circuits are repeated as described.

We claim:

1. A method of treating thread bodies, which comprises securing said body on a fixed support, applying suction to the interior of said body, forming a pool of treating liquid beneath said body, raising the level of said pool to inundate said body, circulating liquid through said pool during said inundation, lowering said pool after a predetermined interval, replacing the liquid in the pool by another treating liquid, raising the level of the pool of said other liquid to inundate said body, lowering said pool of other liquid after a predetermined interval, maintaining the suction continuously from the formation of the first pool to the removal of the last, and relieving the suction in said body.

2. A method of treating thread bodies, which comprises supporting a thread body in fixed position, applying suction to the interior of said body forming a succession of treating pools, elevating the level of each pool in succession to inundate said body, lowering each pool after a predetermined period of inundation, maintaining the suction continuously from the formation of the first pool to the removal of the last, and relieving said suction after the termination of the last of said periods of inundation.

3. The method of treating a thread body having a hollow core, which comprises mounting said body on a stationary support, closing the ends of said core, applying suction within said closed core adjacent to the uppermost point only therein, whereby the variation of pressure over the external surface due to liquid head is substantially compensated for so that the pressure gradient through the thread body is substantially equalized, and raising a pool of treating liquid from beneath said body to inundate said body.

4. The method of treating a cylindrical thread body having a hollow core, which comprises supporting said body with its axis substantially horizontal, closing the ends of said core, applying suction within said closed core adjacent to its uppermost point only, whereby the variation of pressure over the external surface due to liquid head is substantially compensated for so that the pressure gradient through the thread body is substantially equalized, and inundating said body with a pool of treating liquid.

5. In combination with a pair of flexible conveyers having parallel stretches with horizontal pins on the respective conveyers extending in opposite directions, a ring extending around said stretches, a pin mounted on said ring and extending radially inward therefrom, said ring pin being capable of approximate alignment with a pin on each of said conveyers, means for rotating said ring to bring said ring pin alternately into alignment with a pin on each of said conveyers in succession, means for transferring a spool from a pin on said one conveyer to said ring pin when aligned therewith, and means for transferring a spool on said ring pin to a pin on said other conveyer when aligned therewith.

6. In combination with a pair of flexible conveyers having parallel stretches with horizontal pins on the respective conveyers extending in opposite directions, a ring extending around both conveyers, a plurality of pins mounted on said ring and extending radially inward therefrom, said ring pins being arranged in diametrically opposite pairs capable of approximate alignment with pins on said conveyers, means for rotating said ring to bring said pairs of ring pins successively into alignment with pins on said conveyers, means synchronized with the rotation of the ring for pushing a spool from a pin of one said conveyer to a ring pin in alignment therewith and simultaneously pushing a spool from the opposite ring pin to a pin on the other said conveyer in alignment therewith.

7. A machine of the class described comprising an endless conveyer, spool-supporting pins mounted on said conveyer, a mechanism for supporting and treating thread bodies wound on spools, said mechanism being disposed adjacent to a stretch of said conveyer to receive spools therefrom, means for driving said conveyer, means controlled by spools on the conveyer for automatically stopping the conveyer when the spools are opposite said mechanism, and means for transferring spools from said stretch of the conveyor to said mechanism.

8. A machine of the class described comprising an endless conveyer, spool-supporting pins mounted on said conveyer, a plurality of mechanisms for supporting and treating thread-bodies wound on spools, said mechanisms being disposed adjacent to successive stretches of said conveyer to receive spools therefrom, means for driving said conveyer, means for automatically stopping said conveyer when a series of spools thereon are opposite a selected one of said mechanisms, said automatic means including a control switch mounted adjacent to the path of the spools carried by said conveyer and operable by engagement with said spools, and means for transferring spools from said stretches of the conveyor to adjacent treating mechanisms.

9. A machine of the class described comprising an endless conveyer, spool-supporting pins mounted on said conveyer, a plurality of mechanisms each adapted to support and treat a plurality of thread bodies wound on spools, said mechanisms being adjacent to respective stretches of said conveyer to receive sets of spools therefrom and to return sets of spools thereto after treatment of the thread bodies thereon, means associated with each of said mechanisms for transferring a set of spools thereon to the pins of the adjacent stretch of said conveyer, means for automatically starting said conveyer upon the completion of said transfer to carry the treated thread bodies away from the mechanism on which they were treated and to bring up a fresh supply of thread bodies on spools for treatment, and means for automatically stopping the conveyer when the fresh supply of spools is opposite the vacated mechanism, said stopping means including an electric switch having an arm extending into the path of the approaching spools and operable by motion of said arm when disengaged by a set of passing spools after engagement thereby.

10. Apparatus for releasably gripping a flanged hollow spool, comprising a pair of members, each having an element movable into an end of a spool adjacent to the wall thereof, and an arm projecting laterally from each said element, each arm having a recessed portion adapted to fit against the outer edge of the adjacent spool flange.

11. Apparatus for releasably gripping a flanged hollow spool, comprising a pair of members each having an element movable into an end of a spool adjacent to the wall thereof, an arm projecting laterally from each said element, each arm having a recessed portion adapted to fit against the edge of the adjacent spool flange, and means for rotating said members simultaneously to clamp said spool between the elements projecting therein and the recessed portions of said arms.

12. Apparatus for releasably supporting a flanged hollow spool, comprising a pair of members each having an element movable into an end of a spool adjacent to the wall thereof, an arm projecting laterally from each said element, each arm having a recessed portion adapted to fit against the edge of the adjacent spool flange and an extension adapted to reach to the other flange of the spool, and means for rotating said members simultaneously to clamp said spool between the elements projecting therein and the recessed portions of said arms and to move the ends of said extensions into contact with said other flange.

13. Apparatus of the class described, comprising a member adapted to enter a hollow spool, said member having a size and shape to substantially fill the interior of the spool, means for clamping a spool endwise over said member and sealing the ends of the spool, said member having a passage therein opening into the interior of the spool clamped thereon adjacent to the uppermost point only therein whereby the pressure gradient through the thread body is substantially equalized, and means for applying suction to the interior of the said spool through said passage.

14. Apparatus of the class described, comprising a vertical suction pipe, a T-member at the lower end of said pipe comprising oppositely extending brackets adapted to receive and support a hollow spool, each said bracket being of a size and shape to substantially fill the interior of a spool carried thereby, each said bracket also having a passage therein connecting with said pipe and opening out on the surface of said bracket at a point adjacent to the top only thereof, means for clamping a pair of spools on said brackets and sealing the ends of the spools, and means for applying suction through said pipe to the interiors of the spools thus clamped.

15. Apparatus of the class described, comprising a chamber having transparent walls, means for supporting said chamber, a pipe extending downwardly from the interior of said chamber, a horizontal T-member at the lower end of said pipe having oppositely extending brackets adapted to receive a pair of hollow spools, means for clamping a pair of spools on said brackets and sealing both ends of each spool, and means including said pipe for applying suction through the chamber to the interiors of spools thus clamped.

16. Mechanism of the class described comprising a treating tank for thread bodies, means for supporting a hollow thread body over said tank, means for applying suction to the interior of a thread body thus supported, and means for raising said tank to completely submerge said thread body with liquid in said tank.

17. Mechanism of the class described comprising a treating tank, means for raising and lowering said tank, means for flowing treating liquid into said tank during its elevation from its lowermost position, a bottom outlet adjacent to one end of the tank, a dam suspended over the bottom of the tank adjacent to said outlet, said dam being engageable by the bottom of the tank when the tank rises to a predetermined intermediate stage, an auxiliary dam suspended above said tank and adapted to become effective to increase the height of the first said dam when the tank rises from said intermediate stage to its uppermost position.

18. A treating tank having a bottom outlet adjacent to each end thereof, a dam mounted in said tank adjacent to one said outlet adapted to limit the maximum liquid level in the tank, means for supplying a stream of liquid to the tank near the opposite end, a second dam suspended over the bottom of the tank between said inlet and the adjacent outlet, means for raising the tank to bring the bottom into engagement with the suspended dam, and an auxiliary dam effective upon further rise of said tank to provide a crest for said suspended dam substantially on a level with the crest of said fixed dam.

19. Mechanism of the class described comprising a movable treating tank, means for raising and lowering said tank through a definite stroke, a reservoir for treating liquid, means for transferring treating liquid from the reservoir to the tank, and means for returning the liquid from the tank to said reservoir, said transferring means including a supply duct, a valve therein, and automatic means responsive to a portion of the upward stroke of the tank to open said valve and responsive to a portion of the downward stroke to close said valve, said liquid returning means comprising a return duct, a drain valve therein, and means automatically responsive to a portion of an upward stroke of the tank for opening said drain valve.

20. Mechanism of the class described comprising a movable treating tank, means for raising and lowering said tank, a reservoir for treating liquid, means for transferring liquid from said reservoir to said tank, and means for returning liquid from said tank to said reservoir, said returning means comprising a duct from said tank to said reservoir, a valve in said duct, automatic means responsive to a portion of the upward stroke of the tank to open said valve, and responsive to the same portion of the next upward stroke of the tank to close the valve.

21. Mechanism of the class described comprising a movable treating tank, means for raising and lowering said tank, a plurality of reservoirs for treating liquids, means for supplying said treating liquids successively to said tank, and means for returning said liquids to their respective reservoirs, said returning means comprising a manifold communicating with said tank, pipes extending from said manifold to each said reservoir, a valve in each pipe, and means normally holding one of said valves open and the rest of said valves closed, said last named means being responsive to upward movement of said tank to close the open valve and to open one of the closed valves.

22. Mechanism of the class described comprising a movable treating tank, means for raising said tank to operative position and lowering it to inoperative position, and means for supplying treating liquid to said tank, said supplying means including a supply duct leading to said tank, a valve in said duct, means responsive to rising movement of the tank for opening said valve, and means responsive to descending movement of the tank for closing said valve.

23. Mechanism of the class described comprising a movable treating tank, means for raising said tank to operative position and lowering it to inoperative position, and means for supplying a plurality of treating liquids to said tank in succession, said supplying means including a manifold communicating with said tank, a plurality of supply pipes leading into said manifold, a normally closed valve in each said pipe, means responsive to successive upward movements of said tank for selectively opening said valves, and means responsive to downward movement of said tank for closing the valve opened by the preceding rising movement.

24. Mechanism of the class described comprising a movable treating tank, means for raising and lowering said tank through a definite stroke, a plurality of supply tanks for holding treating liquids, means for circulating liquids between said treating tank and the several supply tanks including a supply duct and a return duct between said treating tank and each of said supply tanks, a supply valve in each said supply duct, a return valve in each said return duct, and means automatically responsive to a portion of an upstroke of the treating tank for selectively opening one of said supply valves and its corresponding return valve, said automatic means also closing any previously opened return valve, and means responsive to a portion of the down-stroke of the treating tank for closing the open supply valve.

25. Mechanism of the class described comprising a movable treating tank, means for raising and lowering said tank through a definite stroke, a reservoir for treating liquid located below said tank, a supply duct from said reservoir to said tank, means for controlling flow through said pipe including a supply valve and a pump, a return duct from said tank to said reservoir for gravity flow of liquid from the tank to the reservoir, means for controlling the return flow including a drain valve, and means responsive to a portion of the up-stroke of the tank for automatically opening both said valves, and responsive to a portion of the down stroke of the tank for automatically closing said supply valve.

26. In combination with a container for holding baths of treating liquids, means for supplying liquids successively to said container, said means including a storage tank for each said liquid, a supply manifold discharging into said container, a supply pipe from each said tank to said manifold, a valve in each said supply pipe, means operable by fluid pressure for opening and closing each said valve, and means for controlling said fluid pressure, said controlling means comprising a pressure manifold, an exhaust manifold and means for operatively and selectively connecting said valve operating means with said pressure and exhaust manifolds.

27. In apparatus having mechanisms for performing a series of operations, means for automatically controlling the starting and stopping of the several said mechanisms, said controlling means including a pair of relatively movable members, one of said members having a series of contact points thereon, the other member having a brush thereon adapted for successive engagement with said contact points by the relative movement between said members, means for holding one of said members stationary, and means for rotating the other said member, said rotating means including a driving arm adapted to engage and push the movable member, and other means for advancing said movable member ahead of said arm through predetermined angles.

28. In apparatus having a plurality of mechanisms for performing successive operations, a source of power, and means for connecting and disconnecting said mechanisms in succession with said source of power, said means including electric control circuits for connecting the several mechanisms selectively with said source of power, a distributor wheel having a separate contact point for each said circuit, a contact brush movable relatively to said wheel to contact successively with said points to close a gap in the corresponding control circuits, and means responsive to the breaking of a closed control circuit for moving said brush out of contact with the corresponding contact point.

29. In apparatus having a plurality of mechanisms for performing successive operations, a source of power and means for connecting and disconnecting said mechanisms selectively with said source of power, said means including a control circuit for each mechanism, a clutch for each said mechanism, a solenoid in each said control circuit, a clutch-control member movable with its corresponding mechanism, means actuable by energization of said solenoid to throw in its clutch and to start its corresponding mechanism in operation, means carried by each said control member for throwing out the clutch when the mechanism has finished its step of operation, means for energizing some of said solenoids immediately upon the completion of the operation of the preceding mechanism, and means for energizing others of the solenoids after a predetermined interval following the completion of the operation of the preceding mechanism.

30. In apparatus having mechanisms for performing successive operations, a source of power, a clutch for each said mechanism for connecting said mechanism with said source of power, a solenoid for each clutch, means operable by energization of each solenoid to throw in its clutch, a normally closed switch associated with each clutch, a control circuit for each solenoid, each said control circuit containing all said switches in series whereby the opening of any of said switches creates a gap in all said control circuits, a series of contact points connected respectively in the several control circuits, a contact brush connected in all said control circuits and movable into successive contact with said points to close a gap in the circuit containing the point touched, a control bar associated with each said mechanism and movable by the operation thereof, means on said bar for opening its clutch switch at the beginning of its motion, means carried by said bar for throwing out its clutch at the end of the operation of its mechanism and simultaneously closing its clutch switch, and means responsive to the opening of any clutch switch to move said brush to the next successive contact point, whereby the subsequent closing of the clutch switch closes the control circuit for energizing the clutch solenoid of the next successive mechanism.

31. In apparatus having a plurality of mechanisms for performing successive operations, means for automatically starting and stopping said mechanisms in a predetermined order and at predetermined times, said means including a shaft, a fixed circular series of contact points concentric with said shaft, a wheel loosely mounted on said shaft, a brush carried by said wheel and movable into contact with the successive points, a series of control circuits for said mechanisms, each said control circuit having therein said brush and one of said contact points, means for driving said shaft with a step-by-step motion, a drive arm mounted on said shaft and adapted to energize and push said wheel around said shaft, a circular ratchet on said wheel, and a reciprocable pawl engaging said ratchet and actuable to rotate said wheel ahead of said arm through predetermined arcs.

32. Apparatus for treating thread bodies which comprises means actuable to move a thread body into and out of position for treatment, means for holding said thread body in said position for treatment, and means for actuating said actuable means to remove the thread body from the holding means a predetermined interval after the thread body is moved into treating position.

33. Apparatus for treating hollow thread bodies comprising means for receiving and conveying to a treating zone a plurality of thread bodies, means for supporting said thread bodies in position for treatment, means for shifting said thread bodies from the conveying means to said support means, means for surrounding said thread bodies with a treating fluid, and means for automatically replacing said fluid by another fluid after a predetermined interval, said apparatus including means for removing said thread bodies from the treating zone.

34. Apparatus for treating thread bodies on spools, comprising automatic means for moving a plurality of spools simultaneously into position for treatment of the thread thereon, automatic means for simultaneously sealing the ends of all said spools, and means for surrounding the spools with a treating fluid.

35. Apparatus for treating thread bodies on spools, comprising means for conveying a plurality of spools simultaneously into position for treatment of the thread thereon, automatic means for simultaneously sealing the ends of all said spools, means for surrounding said spools with a treating fluid, means for maintaining suction within said spools while so surrounded, and means for automatically removing the sealing means from said spools after a predetermined period.

36. Apparatus for treating thread bodies on spools, which comprises automatic means for moving a plurality of said thread bodies into position for treatment, means automatically operable in response to completion of the positioning operation for sealing the ends of said spools, means for enveloping said thread bodies with a treating medium, and means for maintaining a pressure gradient from the outside inwardly through said thread bodies while enveloped by said treating medium.

37. Apparatus for treating thread bodies on spools, which comprises means for positioning a plurality of said thread bodies for treatment, means automatically operable in response to completion of the positioning operation for sealing the ends of said spools, means for enveloping said thread bodies with a treating medium, and means for maintaining a pressure gradient from the outside inwardly through said thread bodies while enveloped by said medium, said apparatus including means for automatically removing the thread bodies from the treating position at the conclusion of a predetermined period of treatment.

38. Apparatus for treating hollow thread bodies, which comprises supporting means in a treating zone, means for conveying a plurality of spools to said zone for treatment and for removing treated spools from said zone, and means for simultaneously transferring spools from said conveying means to said supporting means, said transferring means being actuable to transfer spools from said supporting means back to said conveying means.

39. Apparatus of the class described comprising an endless conveyer having spaced article carriers mounted thereon, means for driving said conveyer, means for automatically delivering a plurality of articles one by one in succession to successive carriers while the conveyer is being driven, means for automatically stopping said conveyer when the series of carriers with articles thereon reaches a predetermined position, and automatic means for simultaneously removing said articles from said series of carriers upon the stopping of said conveyer.

40. Apparatus of the class described comprising a supply point, a delivery point, a treating zone, an endless conveyer traversing said points and passing said zone, a series of spaced article carriers mounted on said conveyer, means for driving said conveyer, means for placing a group of articles to be treated on a corresponding number of said carriers one by one in succession as said carriers pass said supply point, means for automatically stopping said conveyer when the carriers bearing said group of articles are adjacent to a treating zone, means for simultaneously transferring said group of articles from said carriers to said treating zone and for transferring said articles back again to said conveyer after treatment, and means for removing said articles one by one from said conveyer at said point of delivery.

41. Apparatus of the class described comprising a plurality of supply points, a discharge point, a conveyer traversing said points, spaced article supports mounted on said conveyer, means for stopping and holding said conveyer with one of said supports registering with each said supply point, automatic means for simultaneously transferring an article at each of the supply points onto the supports respectively opposite thereto, means for automatically starting said conveyer upon completion of the transferring motion of said transferring means, and means for removing said articles one by one as they reach said discharge point.

42. Apparatus of the class described comprising an endless principal conveyer, a series of spaced article carriers mounted on said conveyer, means for driving said conveyer, an auxiliary endless conveyer, a transfer point traversed by both said conveyers, means at said transfer point for transferring articles from said auxiliary conveyer to successive carriers on said principal conveyer while the conveyers are in motion, driving connections for driving both said auxiliary conveyer and transfer means in step with said principal conveyer, and means for automatically disconnecting said driving connections after all the articles of a group have been transferred from the auxiliary conveyer to the principal conveyer.

43. Apparatus of the class described, comprising a supply point, a delivery point, a plurality of group treating stations, a conveyer traversing said points and stations, spaced article supports on said conveyer, means for driving said conveyer, means associated with each said station for transferring simultaneously a group of articles from said conveyer and for returning said group of articles simultaneously to said conveyer, means responsive to the completion of an article-returning operation of the transfer means at any of said stations for starting said conveyer driving means to remove said articles from said station, means for delivering a second group of articles at said supply point to successive supports on said conveyer while said conveyer is being driven, means for removing the articles of said first group at said delivery point, and means for stopping said conveyer when the second group reaches the station vacated by said first group.

44. Apparatus of the class described, comprising a supply point, a delivery point, a plurality of stations, a conveyer traversing said points and stations, spaced article supports mounted on said conveyer, article holders adjacent to said conveyer at said stations, means at each said station for automatically transferring a group of articles from the holders at its respective station to the supports adjacent thereto, means for driving said conveyer, means responsive to the completion of a transferring operation of any of said transfer means for starting said driving means to remove said articles from its station to said point of delivery, means for supplying a second group of articles to said conveyer, and means for automatically stopping said conveyer when said second group reaches the station vacated by said first group.

45. Apparatus of the class described comprising a supply point, a plurality of stations, an endless conveyer traversing said point and stations, spaced article supports on said conveyer, article holders adjacent to said conveyer at said stations, means for driving said conveyer, means at said supply point for placing grouped articles on corresponding groups of supports on said conveyer, and means for automatically stopping said conveyer when each successive group reaches a selected station, said stations being automatically selected in rotation.

46. Apparatus of the class described comprising a principal conveyer having spaced article supports thereon, a supply conveyer having spaced article supports thereon, means for transferring articles from supply conveyer supports to principal conveyer supports while the conveyers are in motion, means for driving said principal conveyer, driving connections for said supply conveyer, and means for controlling said driving connections, said controlling means comprising an element engageable by articles on said supply conveyer and a second element engageable by articles on said principal conveyer adjacent to said transfer means, said driving connections being operative when either of said elements is engaged by an article carried by its respective conveyer.

47. Apparatus for treating thread bodies on spools, which comprises means for forming a pool of liquid, means for moving a plurality of spools into position over said pool, means responsive to completion of the positioning operation for sealing the ends of said spools, means for raising said pool to immerse said spools therein, and means for lowering said liquid after a predetermined period.

48. Apparatus for treating hollow thread bodies, which comprises means for forming a pool of liquid, means for moving a plurality of thread bodies into position over said pool, means for maintaining a suction within said thread bodies, and means for raising said pool to immerse said thread bodies while suction is maintained therein.

49. Apparatus for treating thread bodies on spools, which comprises means for forming a pool of treating liquid, means for conveying a plurality of spools to the vicinity of said pool, means for removing said spools from said conveying means and for positioning the spools over said pool, means for sealing the ends of said spools, means for creating and maintaining suction within the sealed spools, and means for raising said pool to immerse said spools therein.

50. Apparatus for treating thread bodies on spools, which comprises a treating tank, means for conveying a plurality of spools to said tank, means for removing the spools from said conveying means and for positioning said spools over said tank, means for sealing the ends of said spools, means for maintaining suction in the sealed spools, means for filling said tank with treating liquid, and means for raising said tank to immerse the spools in said liquid.

51. Apparatus for treating thread bodies on spools, which comprises an open treating tank, means for positioning a plurality of spools above said tank, means for raising said tank to receive said spools therein, means for filling said tank with treating liquid, and control means for said filling means actuated by the rising movement of said tank.

ORTON B. BROWN.
ERNEST P. COOK.